United States Patent [19]

Yasuda et al.

[11] Patent Number: 5,751,364
[45] Date of Patent: May 12, 1998

[54] METHOD OF AND APPARATUS FOR DETECTING A MOTION OF IMAGE INFORMATION, METHOD OF AND APPARATUS FOR ENCODING IMAGE INFORMATION, IMAGE INFORMATION TRANSMITTING SYSTEM, IMAGE INFORMATION RECORDING SYSTEM AND RECORDING MEDIUM

[75] Inventors: Kazunori Yasuda; Kouichi Uchide, both of Kanagawa, Japan

[73] Assignee: Sony Corporation, Tokyo, Japan

[21] Appl. No.: 675,105

[22] Filed: Jul. 2, 1996

[30] Foreign Application Priority Data

Jul. 4, 1995 [JP] Japan .................. 7-169017

[51] Int. Cl.$^6$ .................. H04N 7/32
[52] U.S. Cl. .................. 348/416; 348/699; 386/111
[58] Field of Search .................. 348/699, 700, 348/416, 402, 401, 400, 415, 409, 390, 384; 382/236, 238, 232; 386/33, 109, 111, 112; H04N 7/137

[56] References Cited

U.S. PATENT DOCUMENTS 4,897,720  1/1990  Wu et al. .................. 348/412
5,005,078  4/1991  Gillard .................. 348/699
5,317,397  5/1994  Odaka et al. .................. 348/416

Primary Examiner—Bryan S. Tung
Attorney, Agent, or Firm—William S. Frommer; Alvin Sinderbrand

[57] ABSTRACT

A method of detecting a motion in image information includes a step of determining differential processing data by way of full search block matching, a step of processing a differential, and a step of generating differential processing data. The step of processing a differential includes a step STg1 for electing a motion vector, a step STg2 for establishing an area according to the selected motion vector, and a step STg3 for effecting full search block matching using the established area. The step of generating differential processing data includes a step STh1 for searching for a reverse region with an obtained motion vector, a step STh2 for calculating addresses of all macroblocks in the reverse region, a step STh3 for registering the differential processing data, a step STh4 for deciding whether one image frame is finished or not, a step STh5 for deciding whether there is a scene change or not, and a step STh6 for deciding whether a processing sequence is finished or not. The above method is capable of detecting an accurate motion in a short period of time, thereby increasing the efficiency of encoding image information.

29 Claims, 43 Drawing Sheets

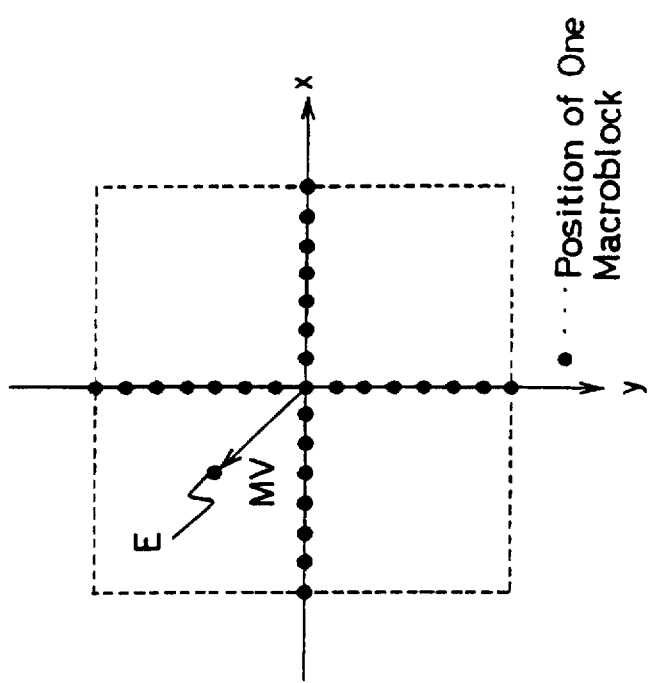
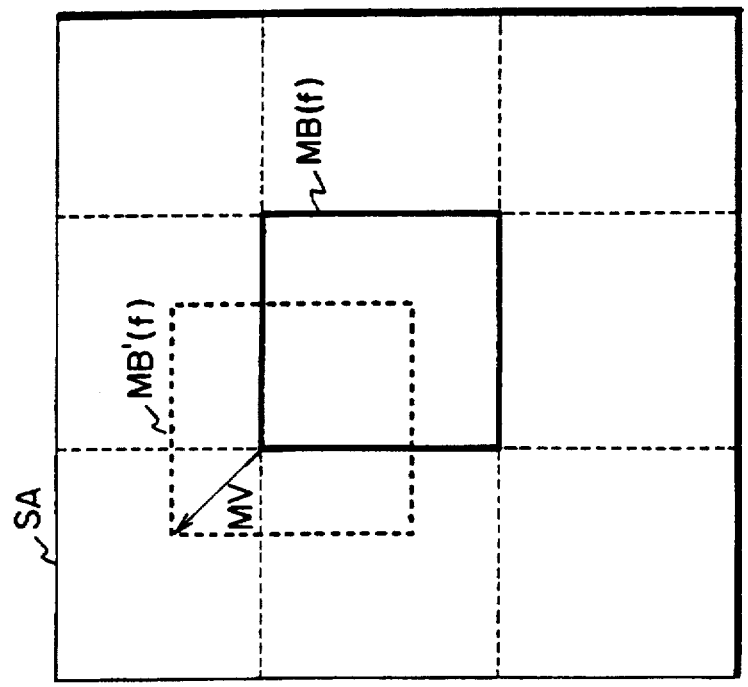
FIG. 1B
FIG. 1A

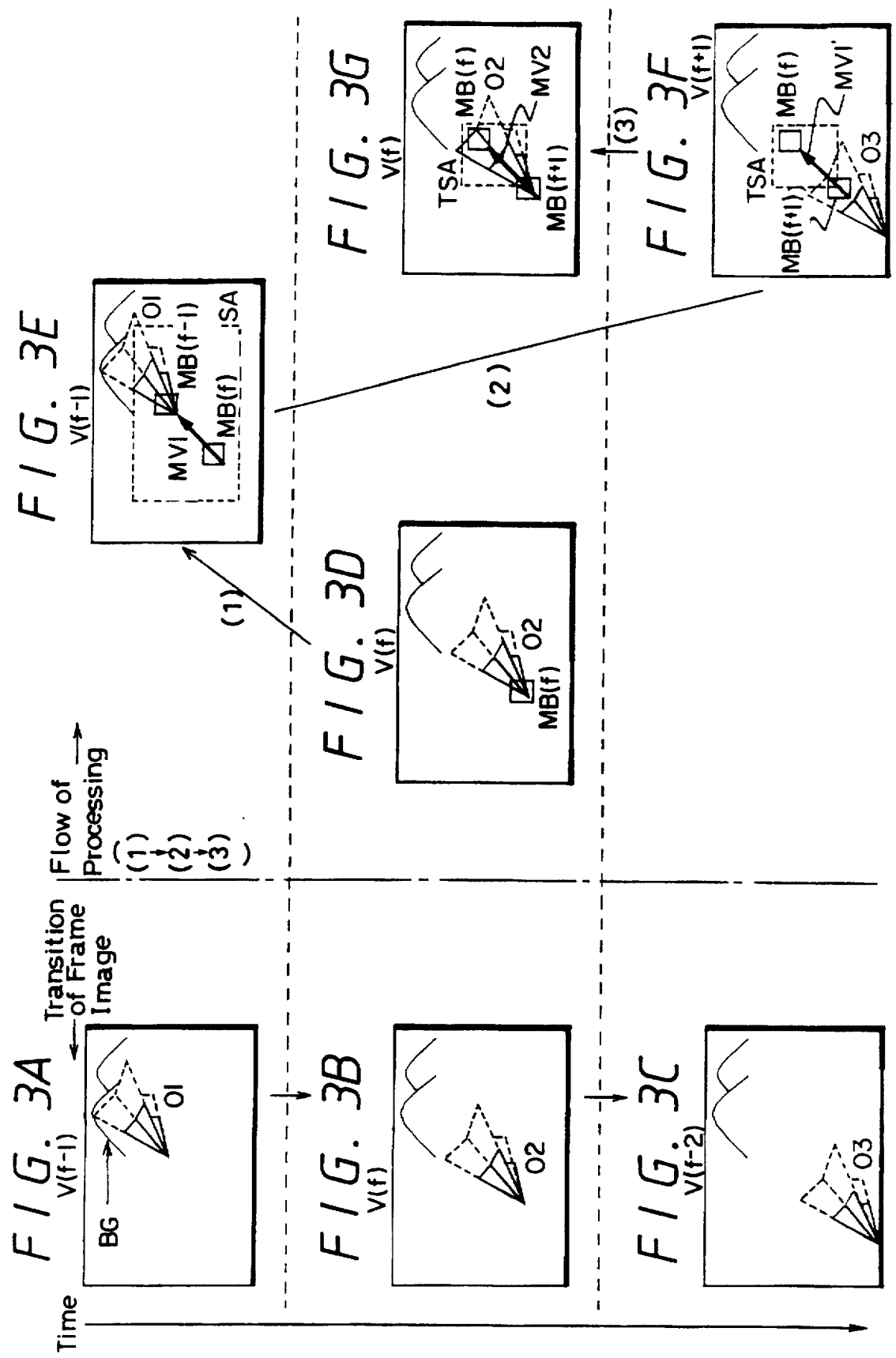

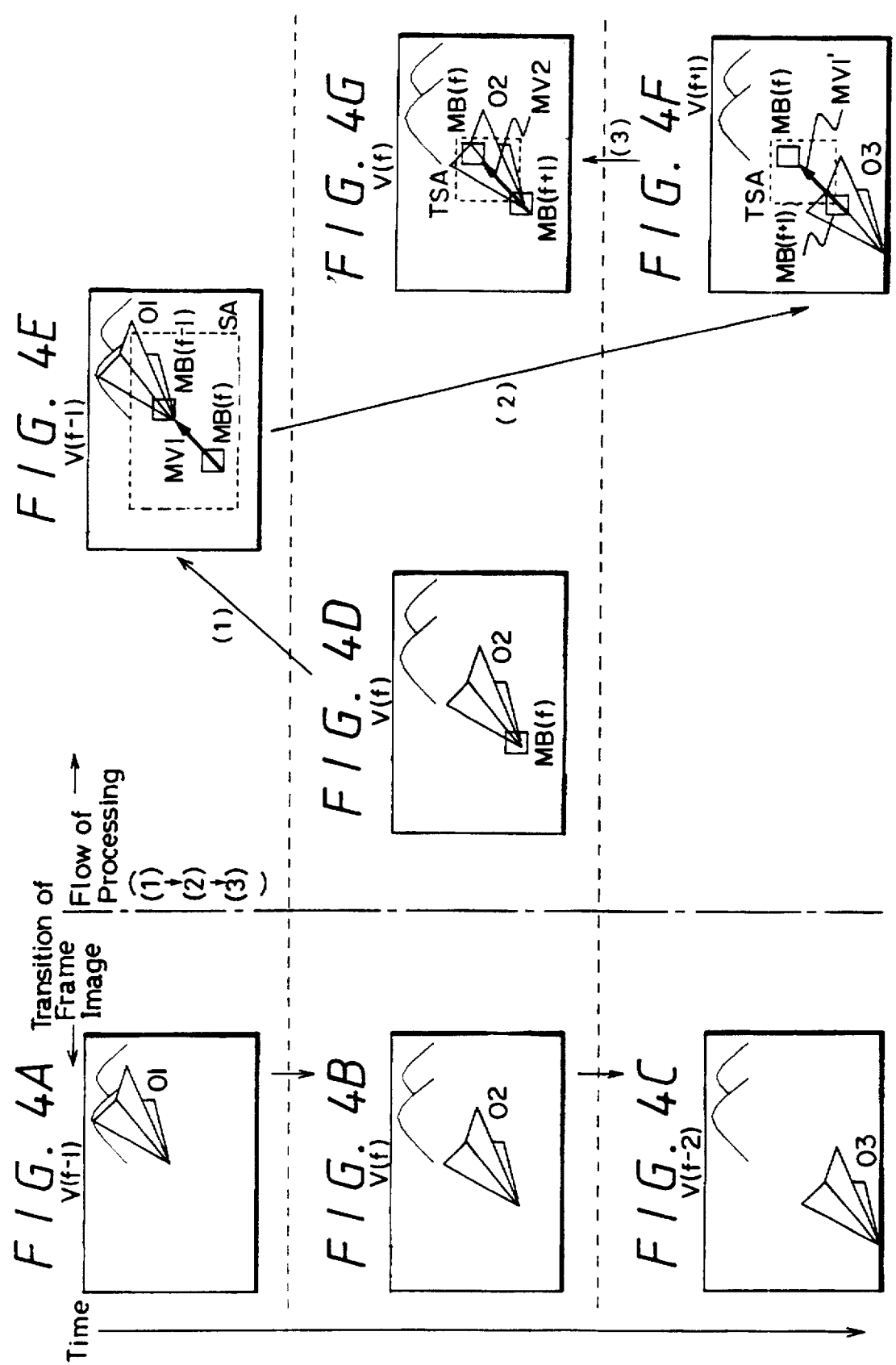

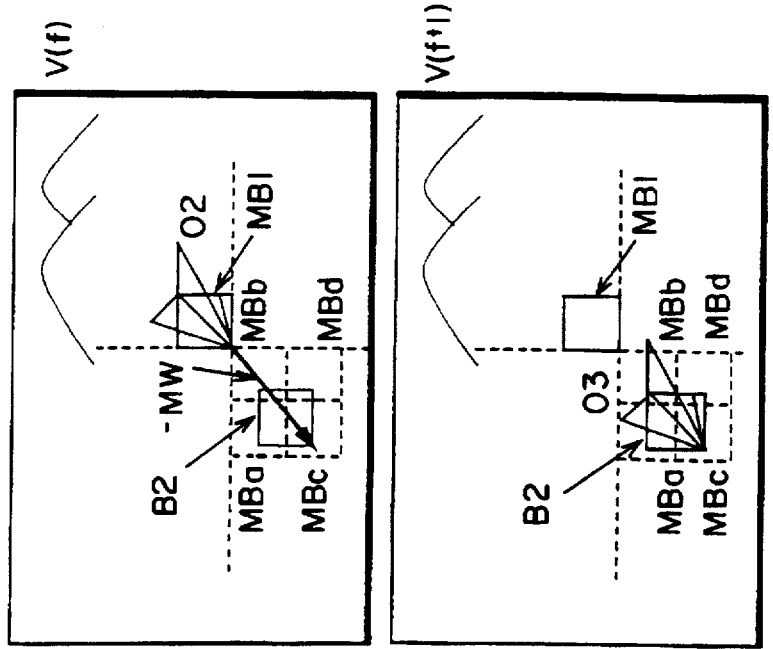
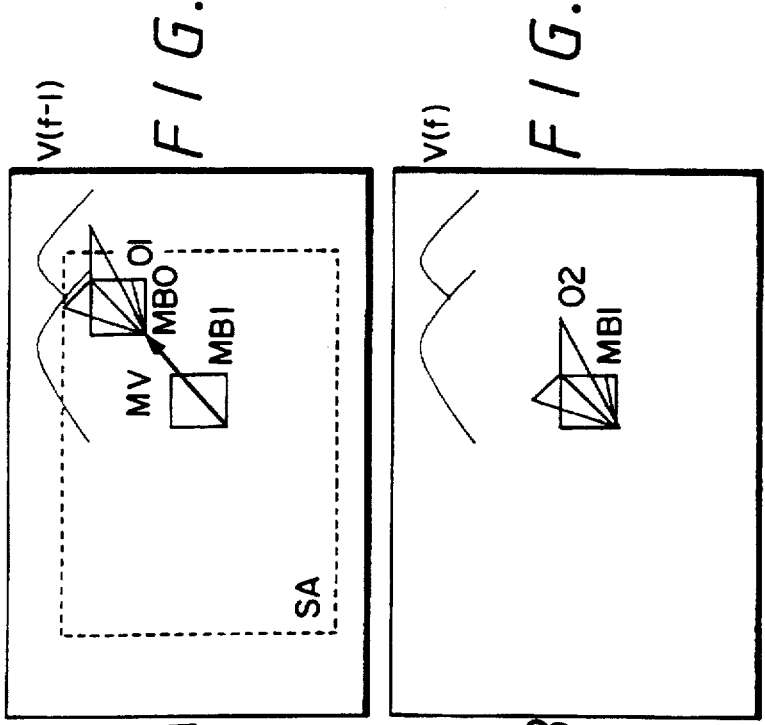

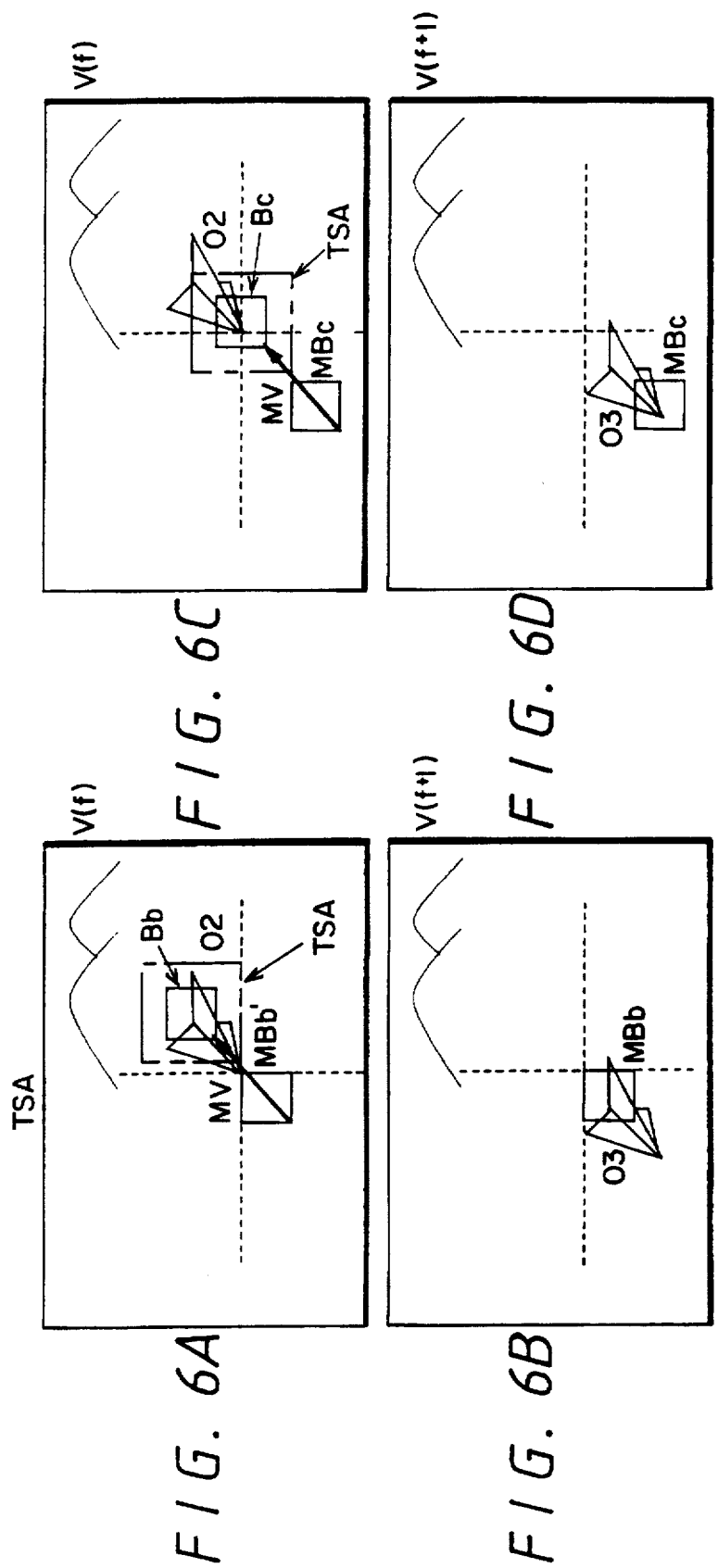

F I G. 23

| Nominated Motion Vector Data | Differential Total Value | Number of close vectors |
|---|---|---|
| MVn (x,y) | TV | Veqn |
|  |  |  |

F I G. 26A
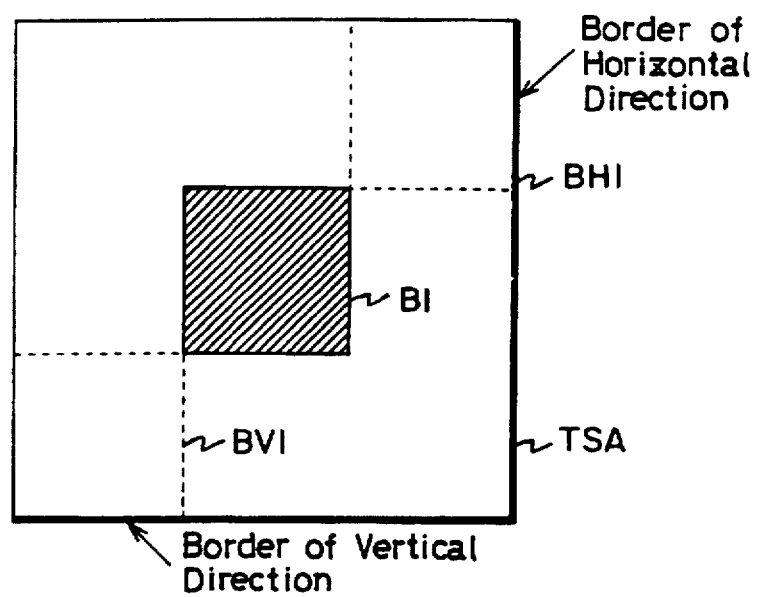
F I G. 26B

METHOD OF AND APPARATUS FOR DETECTING A MOTION OF IMAGE INFORMATION, METHOD OF AND APPARATUS FOR ENCODING IMAGE INFORMATION, IMAGE INFORMATION TRANSMITTING SYSTEM, IMAGE INFORMATION RECORDING SYSTEM AND RECORDING MEDIUM

BACKGROUND OF THE INVENTION

The present invention relates to a recording and reproducing apparatus for reproducing image information recorded on a recording medium such as a magnetic tape, method of and apparatus for a motion of image information for use with an information transmitting system, method of and apparatus for encoding image information, an image information transmitting system, an image information recording system and a recording medium.

Heretofore, there is known a motion detecting processing using a block matching. U.S. Pat. No. 4,897,720 describes a technique concerning the block matching. However, the motion detection using the block matching faces a problem. Such problem will be described below with reference to FIGS. 1A, 1B and FIG. 2.

FIG. 1A shows a target macroblock MB (f) in the block matching processing, a search area SA set in response to the target macroblock MB (f) and the position at which motion vector data obtained based on a number of differential absolute value sum data obtained by the differential absolute value sum calculation of the target macroblock MB (f) and reference macroblock located within the search area SA, i.e., the minimum residual value of residual values, address data of the reference macroblock in which the residual value could be obtained and address data of the target macroblock is located on frame image data of one frame preceding the image data of the target macroblock MB (f). A block MB' (f) shown by a bold broken-line represents a reference macroblock within the reference frame.

FIG. 1B shows a relationship among one target macroblock MB (f), the position of the reference macroblock located within the search area SA in which the differential absolute value sum calculation is carried out, the minimum residual value and motion vector data MV obtained based on address data of the reference macroblock data in which the residual value could be obtained and address data of the target macroblock. As illustrated, the vertical axis is x, horizontal axis is y and solid circles shown in these axes represent positions of reference macroblocks, respectively. In other words, within the search area SA, there exist reference macroblocks of the number corresponding to the positions that can be expressed by the x direction positions shown by the solid circles and the y direction positions shown by the solid circles.

FIG. 1B shows the state of FIG. 1A, i.e., the target macroblock MB (f) located at the center of the search area SA, the minimum residual value selected from a number of residual values obtained by executing the differential absolute value sum calculation on the target macroblock MB (f) and a number of reference macroblocks located within the search ares SA, the motion vector data MV based on address data of the reference macroblock in which the residual value could be obtained and address data of the target macroblock MB (f) and a block MB' (f) of one frame preceding the target macroblock MB (f) shown by the motion vector data in the form of quasi-graph. As is clear from FIG. 1B, solid circle located at the position shown by the motion vector data indicated by an arrow from the centers of the x and y directions become a minimum residual value E.

In order to obtain more accurate motion vector that can express real motion of a moving object, the size of the area of the search area SA has to be enlarged. The reason for this is that if the size of the area of the search area SA is enlarged, then vector data of the moving object moving at high moving speed can be detected by search algorithm. In the example of FIG. 1B, the x axis and the y axis are extended in their directions to increase a range of obtainable residual value.

FIG. 2 is a diagram used to explain the reason that the size of the area of the search ares SA should be increased in order to obtain more accurate motion vector data that can express real motion of the moving object. FIG. 2 shows a difference between motion vector data MV1 obtained by motion detection using a small search area sa and motion vector data MV2 obtained by motion detection using the large search area SA when the position of one frame of the target macroblock MB (f) is calculated under the condition that the position of the target macroblock MB (f) is expressed from the centers of the x axis and y axis by contour lines L1, L2, L3 of residual value E ($\Delta x$, $\Delta y$) wherein minimum residual value Emin indicating the new position of one frame before is set to a summit.

A space between the contour lines L3 and L2 corresponds to a foot of a mountain, and an area containing much erroneous residual values. A space between the contour lines L2 and L1 corresponds to a halfway up of the mountain and an area containing erroneous residual values less than that of the space between the contour lines L3 and L2. An area inside the contour line L1 corresponds to a summit of mountain and area containing residual values with least errors. A portion shown by a solid circle is a summit and this portion indicates a residual value without error, i.e., minimum residual value Emin. That is, FIG. 2 fictionalizes heights of respective portions of the mountain to accuracy of residual values by use of contour lines.

Of broken line blocks, a residual space ZA which is the widest space shows the whole of one frame, for example. When motion detection is executed using the small search area sa shown in this residual space ZA, the calculated motion vector data MV1 cannot show the position of the solid circle which the true position of the moving object. As shown in FIG. 2, the motion vector data MV1 is located at the right corner of the small search area sa and located between the contour lines L1 and L2, i.e., contains error in the residual value so that the motion vector data MV1 cannot detect a true motion of the moving object.

On the other hand, when a motion detection is carried out by use of the large search area SA, the calculated motion vector data MV2 can indicate the position of solid circle which is the true position of the moving object, i.e., the summit. In other words, the motion vector data MV2 does not contain error in the residual value and can detect the true motion of the moving object.

As is clear from the above description, when the moving speed of the moving object is low, the distance between the position of the moving object in the present frame and the position of the moving object in the reference frame is reduced so that the search area set upon motion detection may be small. However, when the moving speed of the moving object is high, the distance between the position of the moving object in the present frame and the position of the moving object in the reference frame is extended so that the search area SA set upon motion detection must be made large. Accordingly, when the moving speed of the moving object is high, the search area SA has to be enlarged in size.

However, when the search area SA is increased in size, although the motion detection can cope with the moving object moving at high speed, the search area SA is large so that the number of reference macroblocks for effecting the block matching is increased, thereby increasing the calculation amount of the differential absolute value sum calculation considerably.

In order to remove the above disadvantage, the search area SA has to be reduced in size. However, if the search area is reduced in size, when the moving speed of the moving object is high, as described above, the residual value contains errors so that the motion vector data which can express the true motion of the moving object cannot be obtained. Upon encoding moving image, when motion vector data is transmitted, only a difference between it and motion vector data transmitted immediately before is variable-length-encoded so that a difference between the motion vector data and motion vector data containing errors is calculated. There is then the disadvantage that the bit number of transmitted motion vector data is increased. Further, when a motion compensation is carried out using motion vector data containing errors, the motion-compensated macroblock is not the accurate macroblock. Thus, if image data is transmitted with a differential data between it and encoded macroblock, the number of bits to be transmitted is increased.

SUMMARY OF THE INVENTION

It is therefore an object of the present invention to provide method of and apparatus for detecting a motion of image information, method of and apparatus for encoding image information, an image information transmitting system and an image information recording system in which a coding efficiency can be improved by obtaining accurate motion vector data in a short period of time.

According to the present invention, there is provided a motion detection method which comprises a first search area setting step for setting a first search area for searching a reference block coincident with the content of target macroblock in response to the position of the target macroblock within a present frame within a reference frame which precedes or succeeds the time position of the present frame, a first coincidence detection step for detecting coincidence of contents of reference macroblocks located within the first search area of the reference frame, a first position predicting step for predicting a position of one frame after of a target block within said present frame based second motion vector data of the same magnitude as that of the first motion vector data calculated at the first coincidence detection step and which is opposite in direction to said first motion vector data, a first target block position information detection step for detecting positional information of a target block within an inclusive area including a block of the position predicted at the first position predicting step, a table registration step for registering the positional information of the target block calculated at the first target block positional information detection step on a table in association with information of the target block to be processed, a first judgement step for determining whether or not the process for calculating first motion vector data on all target blocks within the present frame is finished, an image updating step for updating the content of the present frame to the content of succeeding time position or the content of preceding time position of the present frame and updating the content of the reference frame to at least the content of the present frame if it is determined at the first judgement step that the processing for calculating the first motion vector data on all target blocks within the present frame is finished, a motion vector -selecting step for reading registered motion vector data registered on said table associated with the processed target block of the present frame updated by the image updating step from the table and selecting optimum motion vector data from the motion vector data, a second coincidence detection step for setting a second search area smaller than the first search area based on the nominated motion vector data selected at the motion vector selecting step and obtaining third motion vector data by detecting coincidence between the target block located within the present frame and the reference block located within the second search area of the reference frame, and a table content updating step for obtaining positional information of target block of said inclusive area used to set the second search area in said second coincidence detection step based on the third motion vector data detected in said second coincidence detection step and registering the positional information on the table to thereby update the content of the table.

BRIEF DESCRIPTION OF THE DRAWINGS

FIGS. 1A and 1B are schematic diagrams used to explain a relationship between a macroblock within a search area and a residual value, wherein FIG. 1A is a diagram used to explain the position at which image data of target macroblock of present frame within the search area is located one frame before, and FIG. 1B is a diagram used to explain a residual value within the search area;

FIGS. 3A through 3G are schematic diagrams used to explain a telescopic search processing which is a technique of the present invention;

FIG. 4A through 4G are schematic diagrams used to explain disadvantages encountered with the telescopic search processing shown in FIGS. 3A through 3F;

FIGS. 5A through 5D are schematic diagrams used to explain a manner in which a moving object is moving over three frames and a positional relationship of the moving object in the preceding and succeeding frames, wherein FIG. 5A is a diagram showing frame image data V (f−1), FIG. 5B is a diagram showing frame image data V (f), FIG. 5C is a diagram showing frame image data V (f), and FIG. 5D is a diagram showing frame image data V (f+1);

FIGS. 6A through 6D are schematic diagrams used to explain a predicting processing at every block, wherein FIG. 6A is a diagram showing frame image data V (f−1), FIG. 6B is a diagram showing frame image data V (f), FIG. 6C is a diagram showing frame image data V (f), and FIG. 6D is a diagram showing frame image data V (f+1);

FIG. 10 is a diagram used to explain a residual processing data table, a reference macroblock table, frame image data and macroblocks comprising the frame image data within the table data TBL shown in FIG. 9, wherein FIG. 10A is a diagram showing a residual processing data table, FIG. 10B is a diagram showing frame image data, FIG. 10C is a diagram showing macroblock and FIG. 10D is a diagram showing reference macroblock;

FIG. 23 is a diagram used to explain contents of the RAM 5 used when motion vector is selected;

FIGS. 26A and 26B are diagrams used to explain a pattern of a telescopic macroblock in the telescopic search area and a telescopic macroblock table, wherein FIG. 26A is a diagram used to explain a relationship between the telescopic search area and the macroblock, and FIG. 26B is a diagram showing the telescopic macroblock table;

FIGS. 33A through 33E are diagrams (third embodiment) used to explain a content of control operation based on the residual processing routine at step S300 in the flowchart of the main routine shown in FIG. 11, wherein FIG. 33A is a diagram showing frame image data arranged on a time base, FIG. 33B is a diagram showing motion detection processings arranged on a time base, FIG. 33C is a diagram showing main residual processing data tables sequentially generated (or updated) in the time base direction, FIG. 33D is a diagram showing buffering processings arranged on the time base, and FIG. 33E is a diagram showing a buffering residual processing data table buffered by the buffering processing shown in FIG. 33D;

DETAILED DESCRIPTION OF THE PREFERRED EMBODIMENTS

Figure 2:
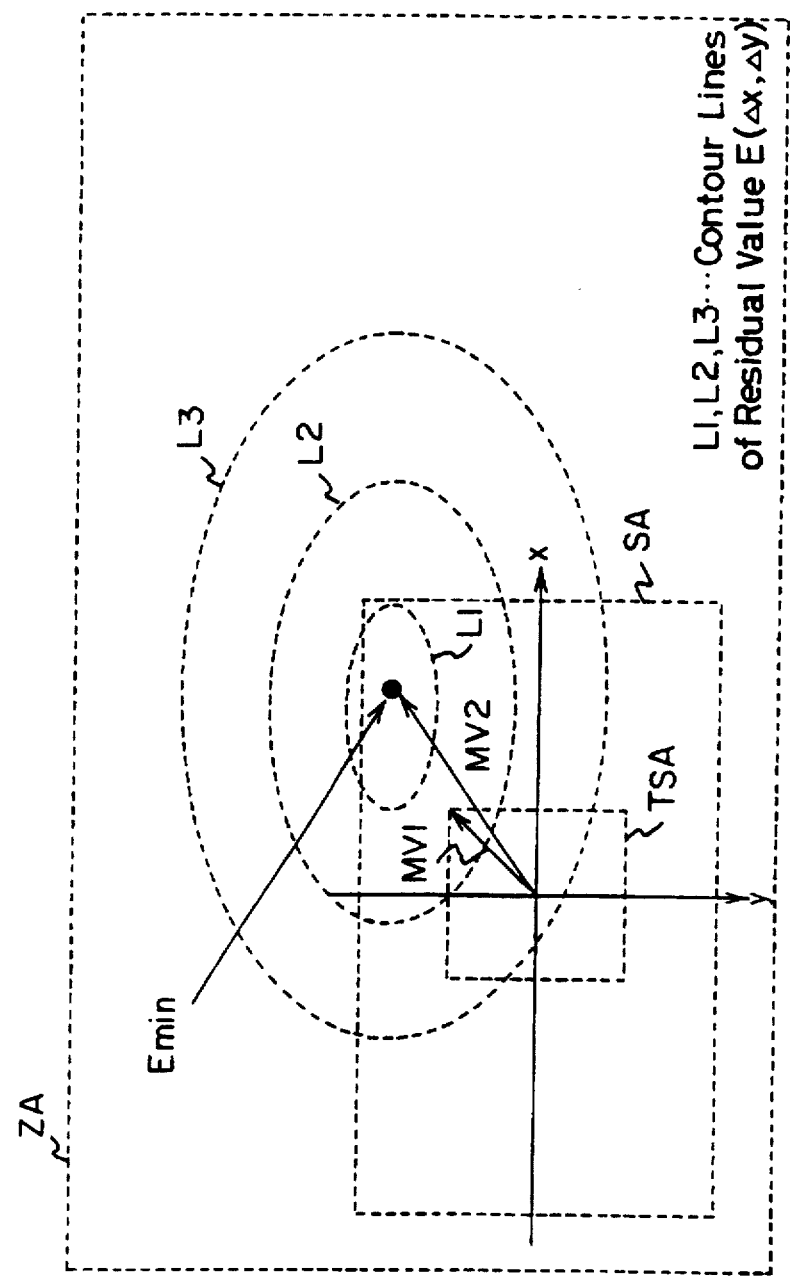
FIG. 2 is a schematic diagram used to compare a narrow search area and a wide search area in a residual space by contour line.

The present invention will hereinafter be described in detail with reference to the drawings.

FIGS. 3A through 3F are schematic diagrams used to explain a motion detection processing based on telescopic search presupposing the present invention. On the left-hand side of FIGS. 3A, 3B and 3C, there are respectively illustrated frame image data V (f−1) (FIG. 3A), frame image data V (f) (FIG. 3B) and frame image data V (f+1) of three frame image data extracted from arbitrary frame positions of video data obtained when moving pictures of paper airplane flying high on the mountain are taken by a video camera. A solid-line arrow on the left-hand side of FIGS. 3A, 3B and 3C shows changes of time.

On the right-hand side of FIGS. 3D to 3F show a processing sequence for the frame image data V (f−1), V (f) and V (f+1). The processing sequence is illustrated by (1) to (3) in FIGS. 3D through 3G. FIG. 3E shows the frame image data V (f−1) shown in FIG. 3A, FIGS. 3D and 3G show the frame image data V (f) shown in FIG. 3B, and FIG. 3F shows the frame image data V (f+1) shown in FIG. 3C. Broken lines are drawn in the horizontal direction of FIGS. 3A through 3F in order to facilitate the understand of a correspondence between the frame image data V (f−1) shown in FIG. 3A and the frame image data V (f−1) shown in FIG. 3E, a correspondence between the frame image data V (f) shown in FIG. 3B and the frame image data V (f) shown in FIGS. 3D, 3G and a correspondence between the frame image data V (f+1) shown in FIG. 3C and the frame image data V (f+1) shown in FIG. 3F.

When video data of paper airplane from the video camera is seen in the order of the frame image data V (f−1), the frame image data V (f) and the frame image data V (f+1), the positions on images of paper airplane are changed with time in the order of position O1 on the frame image data V (f−1), position O2 on the frame image data V (f) and position O3 on the frame image data V (f+1).

A manner in which a motion of paper airplane is detected by block matching will be described below with reference to the right-hand side of FIG. 3, i.e., FIGS. 3D to 3G which correspond to the processing sequence.

Initially, as shown by a solid-line arrow (1), a motion detection is carried out by use of a target macroblock MB (f) of the frame image data V (f) and a target macroblock MB (f−1) located within the frame image data V (f−1). In this case, the frame image data V (f) becomes frame image data of present frame, and the frame image data V (f−1) becomes image data of preceding frame. A motion detection is carried out with respect to an arbitrary macroblock MB (f−1) of the frame image data v (f−1) as follows.

Specifically, in response to the target macroblock MB (f) of the frame image data V (f), a search area SA is set within the frame image data v (f−1). A differential absolute value sum calculation is sequentially effected on pixel data provided within the target macroblock MB (f) and pixel data provided within a reference macroblock MB (f−1) located within the search area SA. Differential absolute value sum data of minimum value is selected from resultant differential absolute value sums of all reference macroblocks MB (f−1) located within the search area SA, and motion vector data MV1 is obtained from the selected differential absolute value sum data of minimum value, address data of the reference macroblock MB (f−1) in which this differential absolute value sum data could be obtained and address data of the target macroblock MB (f).

A bold solid-line arrow in FIG. 3E shows the motion vector data MV1. FIG. 3E shows the target macroblock MB (f) of the frame image data V (f) in order to understand the present invention more clearly. As is clear from FIG. 3E, the image data of the target macroblock MB (f) of frame image data V (f) is located at the position of the macroblock MB (f−1) shown by the motion vector data MV1. Specifically, the motion vector data MV1 shows that image data indicative of paper airplane shown in the frame image data V (f) is one-frame-preceding image data, i.e., located at the position O1 of the paper airplane shown in FIG. 3E on the frame image data V (f−1). In other words, the paper airplane shown in FIG. 3E exists at the position O2 on the frame image data of succeeding frame.

Then, a motion detection is effected on a pair of frame image data, i.e., the frame image data V (f+1) and the frame image data V (f). In this case, the frame image data V (f+1) becomes frame image data of present frame, and the frame image data V (f) becomes frame image data of preceding frame.

Let it be assumed that the paper airplane is flying at an equal speed in the same direction. Then, motion vector data MV1 which results from motion-detecting the reference macroblock MB (f−1) of the frame image data V (f−1) and the target macroblock MB (f) of the frame image data V (f) becomes the same as motion vector data MV1' which results from motion-detecting the target macroblock MB (f+1) located at the same position as that of the target macroblock MV of the frame image data V (f) on the frame image data V (f+1).

In other words, if the paper airplane is flying at an equal speed in the same direction, then motion vector data MV1' which results from motion-detecting the frame image data V (f+1) and the frame image data V (f) becomes the same in direction and in magnitude as the motion vector data MV1 which results from motion-detecting the frame image data V (f) and the frame image data (f−1).

That is, when the frame image data V (f+1) is used as the frame image data of present frame, the frame image data V (f) is used as the image data of preceding frame and the frame image data V (f+1) and the frame image data V (f+1) are motion-detected, if an area near the position indicated by the motion vector data MV1' which uses the target macroblock MB (f) of the frame image data V (f+1) as a starting point, there is then the large possibility that a highly-accurate motion detection can be made. Thus, the size of the search area SA can be reduced.

Therefore, when the search area SA is set in the frame image data V (f), the motion vector data MV1' equal to the motion vector data MV1 is used and a very small search area TSA including a position shown by this motion vector data MV1' is set. Then, a differential absolute value sum calculation is effected on the target macroblock MB (f) of the frame image data V (f+1) and the reference macroblock MB (f+1) located within the very small search area TSA of the frame image data V (f), and a residual value of minimum value is selected from some resultant residual values. Motion vector data MV2 is obtained based on the above residual value, address data of the reference macroblock MB (f−1) in which this residual value could be obtained and address data of the target macroblock MB (f). This operation is a telescopic search. The above-mentioned very small search area TSA will hereinafter be referred to as "telescopic search area TSA". Accurate motion detection can be carried out by the telescopic search processing in a short period of time.

FIGS. 4A through 4F are schematic diagrams used to explain disadvantages encountered in the telescopic search processing shown in FIGS. 3A through 3F. In FIGS. 4A through 4F, elements and parts identical to those of FIGS.

3A through 3F are marked with the same references and therefore need not be described in detail. FIGS. 3A through 3F and FIGS. 4A through 4F differ from each other only in that the size of paper airplane shown in FIGS. 4A through 4F becomes less than ½ of the paper airplane shown in FIGS. 3A through 3F. Broken lines in FIGS. 4A through 4F show a size difference between the paper airplanes shown in FIGS. 4A through 4F and FIGS. 3A through 3F. The macroblock data MB (f+1) of the frame image data V (f+1) shown in FIG. 3F also is shown on the frame image data V (f) shown in FIG. 3G in addition to the reference macroblock MB (f) of the frame image data V (f) because a manner in which the frame image data v (f+1) shown in FIG. 3F and the frame image data V (f) shown in FIG. 3G are motion-detected will be described. In addition to the target macroblock of this frame image data V (f+1), a reference macroblock MB (f) of frame image data shown in FIG. 4G also is displayed on frame image data V (f+1) shown in FIG. 4F due to a similar reason.

Similarly to FIGS. 3A through 3F, the motion vector data MV1 which results from motion-detecting the reference macroblock data MB (f−1) of the frame image data V (f−1) shown in FIG. 4E and the target macroblock MB (f) of frame image data V (f) shown in FIG. 4D becomes the same as motion vector data MV1' which results from motion-detecting the macroblock MB (f+1) located at the same position as that of the target macroblock MV of frame image data V (f) shown in FIG. 4G on the image of the frame image data V (f+1) when frame image data V (f+1) shown in FIG. 4F is used as image data of present frame.

Accordingly, when the search area SA is set in the frame image data V (f) in order to motion-detect the frame image data V (f+1) and the frame image data V (f), the very small search area TSA including the reference macroblock MB (f) on the frame image data V (f) shown by the motion vector data which uses the target macroblock MB (f+1) of frame image data V (f+1) as a starting point is set by use of the motion vector data MV1' equal to the motion vector data MV1. Then, a differential absolute value sum calculation is effected on the target macroblock MB (f) of the frame image data V (f+1) and the reference macroblock MB (f+1) located within the very small search area TSA of the frame image data V (f). A residual value of minimum value is selected from several resultant values, and motion vector data MV2 is obtained from address data of the reference macroblock MB (f−1) in which the above residual value could be obtained and address data of the target macroblock MB (f).

However, image data of paper airplane no longer exists within the target macroblock MB (f) located at the same position as that of the target macroblock MB (f) of the frame image data V (f) because the size of the paper airplane shown in FIGS. 4A through 4F is smaller than that of the paper airplane shown in FIGS. 3A through 3F.

Therefore, when the target macroblock MB (f+1) of the frame image data V (f+1) shown in FIG. 4F and the reference macroblock MB (f) of the frame image data V (f) shown in FIG. 4G are motion-detected, even if the telescopic search area TSA is set on the frame image data V (f) shown in FIG. 4G by use of the same motion vector data MV1' as the motion vector data MV1 which uses the target macroblock MB (f) in which the image data of paper airplane is not included as a starting point, the image data of paper airplane no longer exists within the telescopic search area TSA as shown in FIG. 4G.

Therefore, even if the target macroblock of the frame image data V (f+1) and the reference macroblock MB (f) located within the telescopic search area TSA of the frame image data V (f) are motion-detected, then a motion of the paper airplane cannot be detected. That is, it is natural that, even if image data located within the target macroblock MB (f+1) which does not include the moving object and image data located within the reference macroblock MB (f) which does not include the moving object are processed by block matching, then a motion of moving object cannot be detected.

As described above, even when the motion detection is carried out by use of the telescopic search area TSA thus simply set, the accurate motion detection cannot be carried out.

Having examined the telescopic search in order to remove the defects encountered with the above-mentioned technique, we made the present invention from an idea which will be described below.

FIGS. 5A through 5D are diagrams used to explain the idea of the present invention. FIGS. 5A through 5F illustrate, similarly to FIGS. 3A through 3F and FIGS. 4A through 4F, the manner in which image data is obtained by taking moving pictures of paper airplane flying on the mountain with a video camera, and frame image data obtained when three frame image data are continuously extracted from the position of arbitrary frame of the image data.

FIG. 5A illustrates frame image data of preceding frame obtained when f is used as a frame of arbitrary timing point; FIG. 5B illustrates frame image data V (f) of frame of arbitrary timing point; FIG. 5C illustrates the same frame image data V (f) as that of FIG. 5B for convenience sake of explanation; and FIG. 5D illustrates frame image data V (f+1) of succeeding frame.

When the image data of paper airplane picked up by the video camera is seen from the arbitrary position at every frame, the position of the paper airplane is changed in the order of position O1 in the frame image data V (f−1) shown in FIG. 5A, position O2 in the frame image data V (f) shown in FIG. 5B, and position O3 in the frame image data V (f+1) shown in FIG. 5D.

The manner in which a motion of paper airplane is detected by block matching will be described below. Initially, the frame image data V (f) and the frame image data V (f−1) are motion-detected. In this case, the frame image data V (f) becomes frame image data of present frame, and the frame image data V (f−1) becomes the image data of preceding frame. A motion detection is effected on an arbitrary target macroblock MB1 of frame image data V (f−1) as follows.

Specifically, the search area SA is set within the frame image data V (f−1) in response to the target macroblock MB1 of the frame image data V (f). Then, a differential absolute value sum calculation is sequentially effected on pixel data of the reference macroblock located within the search area SA and pixel data located within the target macroblock. Differential absolute value sum data of minimum value is selected from differential absolute value sum of all macroblocks located within the resultant search area SA. Then, motion vector data MV is obtained based on the selected differential absolute value sum data of minimum value, address data of the reference macroblock MB (f−1) in which the differential absolute value sum data could be obtained and address data of the target macroblock MB (f).

A bold solid-line arrow in FIG. 5A shows the motion vector data MV. The position of the target macroblock MB1 of the frame image data V (f) is also illustrated on the frame image data V (f−1). As is clear from FIG. 5A, image data of the target macroblock MB1 of the frame image data V (f) is located on the frame image data V (f−1) at its position of the macroblock MB0 shown by the motion vector data MV. That is, the motion vector data MV shows the manner in which the paper airplane located at the position O1 shown in FIG. 1A is moved to the position O2 shown in FIG. 5B.

Then, the frame image data V (f) and the frame image data V (f+1) are motion-detected. In this case, the frame image data V (f+1) becomes frame image data of present frame and the frame image data V (f) becomes frame image data of preceding frame. The arbitrary target block MB2 of frame image data V (f+1) shown in FIG. 5D is motion-detected based on the telescopic search. Having examined the following idea, more accurate motion vector data with smaller amount of encoding bits can be obtained in an extremely short period of time as compared with effects achieved by the conventional technique. The above idea and the new motion detection processing will be described below.

Assuming now that the paper airplane is flying at an equal speed, the position O3 of the paper airplane shown in the frame image data V (f+1) agrees with the position shown by a motion vector of the same magnitude as that of the motion vector MV but of the opposite direction relative to the motion vector data MV which results from motion-detecting the frame image data V (f−1) and the frame image data V (f) based on the position O2 of the paper airplane in the frame image data V (f), i.e., negative motion vector −MV. In other words, if the position of image data provided within the macroblock MB1 of the frame image V (f) is moved by the value of the motion vector −MV, then the position of the image data agrees with the position of a block B2. It is to be noted that the macroblock MB1 in the frame image data V (f) is one of macroblocks obtained by equally dividing the frame image V (f) as shown in FIG. 5C and that four broken-line blocks shown below are four blocks of macroblocks obtained by equally dividing the frame image data V (f). Incidentally, since the block B2 is the block located at the position in which the pixel data within the macroblock MB1 is moved by the value of the motion vector data MV, the block B2 is not referred to as "macroblock" but as "block".

Therefore, when the frame image data V (f+1) is set to the frame image data of present frame, the frame image data V (f) is set to the frame image data of preceding frame and the block B2 of the frame image data V (f+1) is motion-detected, as shown in FIG. 5C, a macroblock MB1 to be predicted exists at the position shown by the inverse motion vector MV of the motion vector −MV based on the position of the block B2.

In other words, the predictive vector exists at the position of the macroblock MB1, and such position is located near the position shown by the value of the motion vector data MV. Therefore, when the frame image data V (f+1) is set to the frame image data of present frame, the frame image data V (f) is set to the frame image data of preceding frame and the block B2 of the frame image data V (f+1) is motion-detected, a differential absolute value sum calculation is effected on pixel data of the block B2 and pixel data of the macroblock data MB1 located at the position shown by the value of the motion vector data MV based on the block B2, and motion vector data may be obtained based on the resultant differential absolute value sum data obtained by the above calculation, address data of the reference macroblock MB (f−1) in which the differential absolute value sum data could be obtained and address data of the target macroblock MB (f).

However, as shown by a broken line in FIG. 5D, the block B2 is not one of macroblocks obtained by equally dividing the frame image data V (f+1). In other words, the block B2 is a macroblock that cannot be used as a target block. A relationship between the block B2 and the macroblock obtained by equally dividing the frame image data V (f+1) is shown by a broken line. Specifically, the block B2 comprises pixel data of each part of four macroblocks MBa, MBb, MBc and MBd of the blocks obtained by equally dividing the frame image data V (f+1). Therefore, when the frame image data V (f+1) shown in FIG. 5D and the frame image data V (f) shown in FIG. 5C are motion-detected, the block B2 cannot become the target macroblock.

Let it be assumed that predictive macroblocks exist near the positions moved from the four macroblocks MBa, MBb, MBc and MBd by the value of the motion vector MV. Specifically, when the frame image data V (f+1) is set to frame image data of present frame, the frame image data V (f) is set to frame image data of preceding frame and the frame image data V (f+1) and the frame image data V (f) are motion-detected, if the macroblock MBa is used as the target macroblock, a very small area including a macroblock located at the position moved by the value shown by the motion vector data MV from the target macroblock MBa is set in the frame image data V (f). Then, image data provided within the target macroblock MBa and image data provided within a number of macroblocks within the very small area are motion-detected, and motion vector data of the target macroblock MBa is selected from a number of motion vector data.

Other macroblocks MBb, MBc and MBd are processed similarly. The "very small area" will hereinafter be referred to as "telescopic search area", the four macroblocks MBa, MBb, MBc and MBd shown by the motion vector data −MV will be referred to as "inverse areas". Further, the four macroblocks MBa, MBb, MBc and MBd located within "inverse areas" will hereinafter be referred to as "target macroblocks within the inverse area".

The predictive processing carried out at every block in the example shown in FIGS. 5A to 5D will be described with reference to FIGS. 6A to 6D.

FIGS. 6A to 6D are schematic diagrams used to explain a manner in which the macroblocks MBb and MBc shown in FIGS. 5A to 5D are used as the target macroblocks and the telescopic search area TSA for motion-detection is set in the frame image data of preceding frame. FIGS. 6A and 6B are schematic diagrams used to explain a manner in which the telescopic search area TSA is set when the macroblock MBb is used as the target macroblock. FIGS. 6C and 6D are schematic diagrams used to explain a manner in which the telescopic search area TSA is set when the macroblock MBc is used as the target macroblock.

Initially, the manner in which a motion detection is carried out when the macroblock MBb is used as the target macroblock will be described. When a motion detection is carried out under the condition that the macroblock MBb of the frame image data V (f+1) is used as the target macroblock, motion vector data MV which results from motion-detecting frame image data V (f) shown in FIG. 6A and the frame image data V (f−1) (see FIG. 5A) which precedes the frame image data V (f) in time is used.

Specifically, the telescopic search area TSA including the block Bb located at the position shown by the value of the motion vector data MV from the macroblock MBb' located at the same position as that of the macroblock MBb shown in FIG. 6B is set in the frame image data V (f) shown in FIG. 6A. Then, the target macroblock MBb of the frame image data V (f+1) shown in FIG. 6B and all reference macroblocks provided within the telescopic search area TSA of the frame image data V (f) shown in FIG. 6A are motion-detected and motion vector data of the target macroblock MBb is selected from a plurality of motion vector data thus obtained.

A manner in which a motion detection is carried out when the macroblock MBc is used as the target macroblock will be described below. When a motion detection is carried out under the condition that the macroblock MBc of the frame image data V (f+1) shown in FIG. 5B is used as the target macroblock, there is used motion vector data MV which results from motion-detecting the frame image data V (f) shown in FIG. 6A and the frame image data V (f−1) (see FIG. 5A) which precedes the frame image data V (f) in time.

Specifically, the telescopic search area TSA including the block Bc located at the position shown by the value of the motion vector data MV from the macroblock MBc' located at the same position as that of the macroblock MBc shown in FIG. 6C is set in the frame image data V (f) shown in FIG. 6C. Then, the target macroblock MBc of the frame image data V (f+1) shown in FIG. 6D and all reference macroblocks located within the telescopic search area TSA of the frame image data V (f) shown in FIG. 6C, and motion vector data of the target macroblock MBc is selected from a plurality of motion vector data thus obtained.

Figure 7:
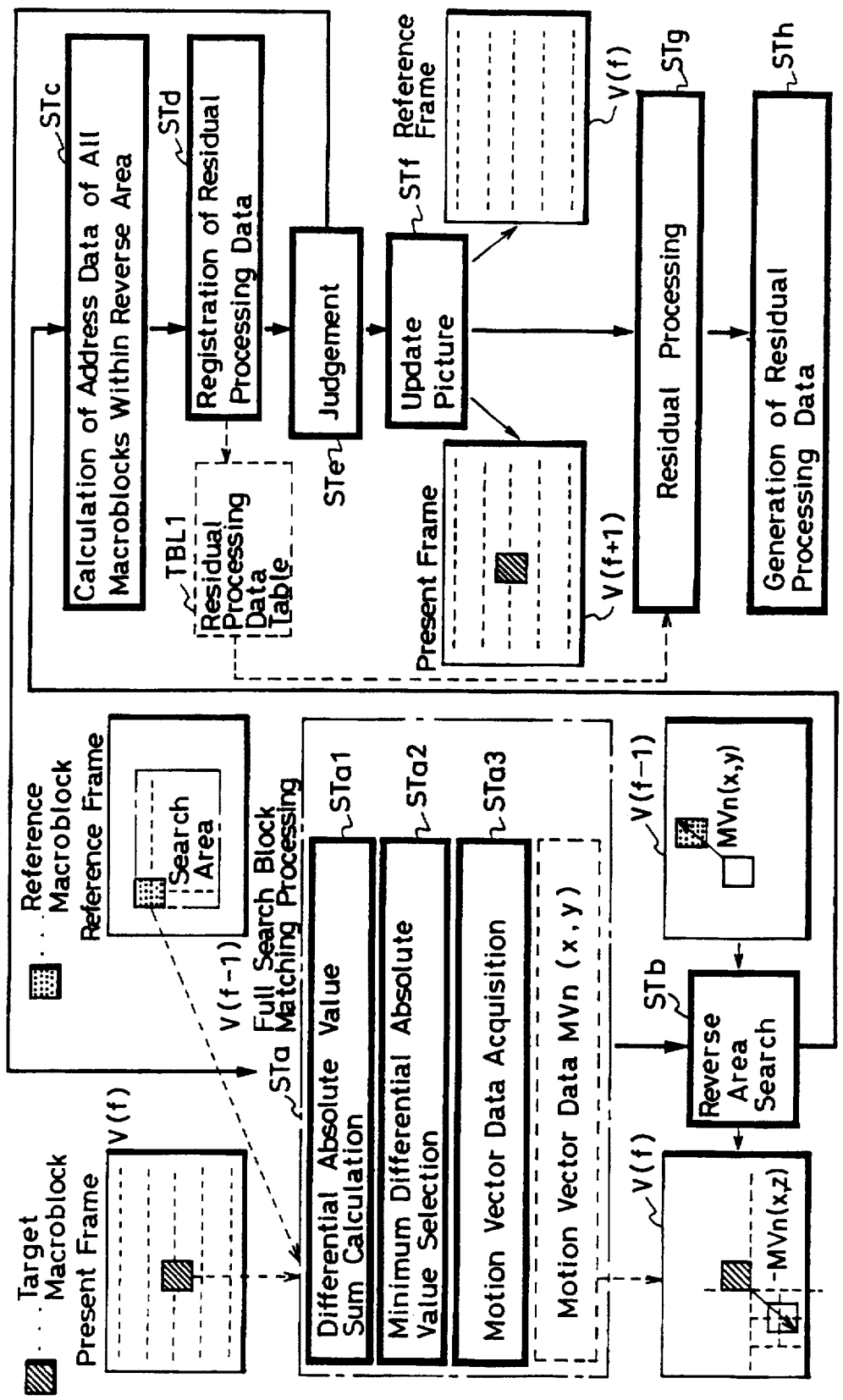
FIG. 7 is a schematic diagram used to explain an outline of the processing executed when the predicting processing shown in FIGS. 6A through 6D can be realized.

FIG. 7 is a schematic diagram used to explain an outline of processing according to the present invention based on a concept shown in FIGS. 5A to 5D and FIGS. 6A to 6D. In FIG. 7, broken-line arrows show use or transfer of data, narrow solid-line arrows show data acquisition, bold solid-line arrows show flow of processing, and broken-line blocks show motion vector data or table data. Solid-line blocks show processing steps, and processing steps are denoted by reference letters STa through STg.

In a processing step STa, frame image data V (f) is set to frame image data V (f−1) of present frame, and frame image data V (f−1) is set to frame image data of reference frame. A search area SA is set on the frame image data V (f−1) in response to the target macroblock, shown hatched, of the frame image data V (f). In a processing step STa1, a differential absolute value sum calculation is effected on the pixel data of macroblock of the frame image data V (f) and pixel data of macroblocks located within the search area SA of the frame image data V (f−1). In the next processing step STa2, differential absolute value sum data of minimum value is selected from differential absolute value sum data of the same number as that of the reference macroblocks located within the search area SA obtained at the processing step STa1. In a processing step STa3, motion vector data MVn (x, y) (shown by a broken-line block in FIG. 7) is obtained based on the differential absolute value sum data of the minimum value obtained in the processing step STa2, address data of the reference macroblock in which the above differential absolute value sum data could be obtained and address data of the target macroblock. The motion vector data MVn (x, y) is used in a reverse area search processing in the processing step STb.

In the processing step STb for executing the reverse area search processing, there is obtained address data of reverse area including address data of block located at the position moved from the position of the target macroblock by the amount shown by the value of the representing motion vector data MVn (x, y) in the reverse direction. As shown in FIG. 7, when the position in the frame image data V (f−1) of preceding frame of the target macroblock of the frame image data V (f), shown hatched, is the position of the macroblock shown by dots, motion vector data MVn (x, y) indicative of the position of the reference macroblock shown by dots is obtained based on an open macroblock located within the frame image data V (f−1) by executing a motion detection.

Then, based on the position of the target macroblock, shown hatched, of the frame image data V (f), there is obtained a position of block shown by the motion vector data MVn (x, y) of the same magnitude as that of the motion vector data MVn (x, y) and whose direction is opposite. If the target macroblock, shown hatched, is moved within the frame image data V (f) by the amount of the value of the motion vector data −MVn (x, y) as shown by a broken line, the position of the target macroblock becomes a position of an open block. The open block overlaps the four reverse area target macroblocks of the reverse area as shown by a broken line.

In the processing step STc shown on the upper right of FIG. 7, start address data of four reverse area target macroblocks belonging to the reverse area are obtained based on start address of the reverse area.

In the processing step STd, residual processing data is registered in a residual processing data table TBL1. The residual processing data represent target macroblock number data of frame image data of present frame, start address data of target macroblock shown by the target macroblock number data, motion vector data obtained with respect to the target macroblock shown by the target macroblock number data and start address data of four reverse area macroblocks. The residual processing data obtained at every target macroblock within one frame image data are registered on the residual processing data table TBL1.

In the processing step STe, it is determined whether or not the processing of one picture is ended, i.e., whether or not the above-mentioned processing is effected on all target macroblocks of the frame image data V (f). If the processing of one picture is not ended, then the processing goes back to the processing step STa wherein the full search block matching is carried out. If on the other hand the processing of one picture is ended, then the processing goes to a processing step STf.

In the processing step STf, a picture is updated. As shown by lower left and lower right of solid-line blocks which show the processing step STf, frame image data V (f+1) of frame next to the frame image data V (f) is set to image data of present frame, and frame image data V (f) is set to the image data of preceding frame.

In a processing step STg, a residual processing is carried out, and a residual processing data generating processing is executed in a processing step STh.

The explanation of outline shown in FIG. 7 includes embodiments from first to sixth embodiments which will be described later on. The first to sixth embodiments differ from each other in the processing step STg for executing the residual processing and the processing step STh for executing the residual processing data generating processing.

Figure 8:
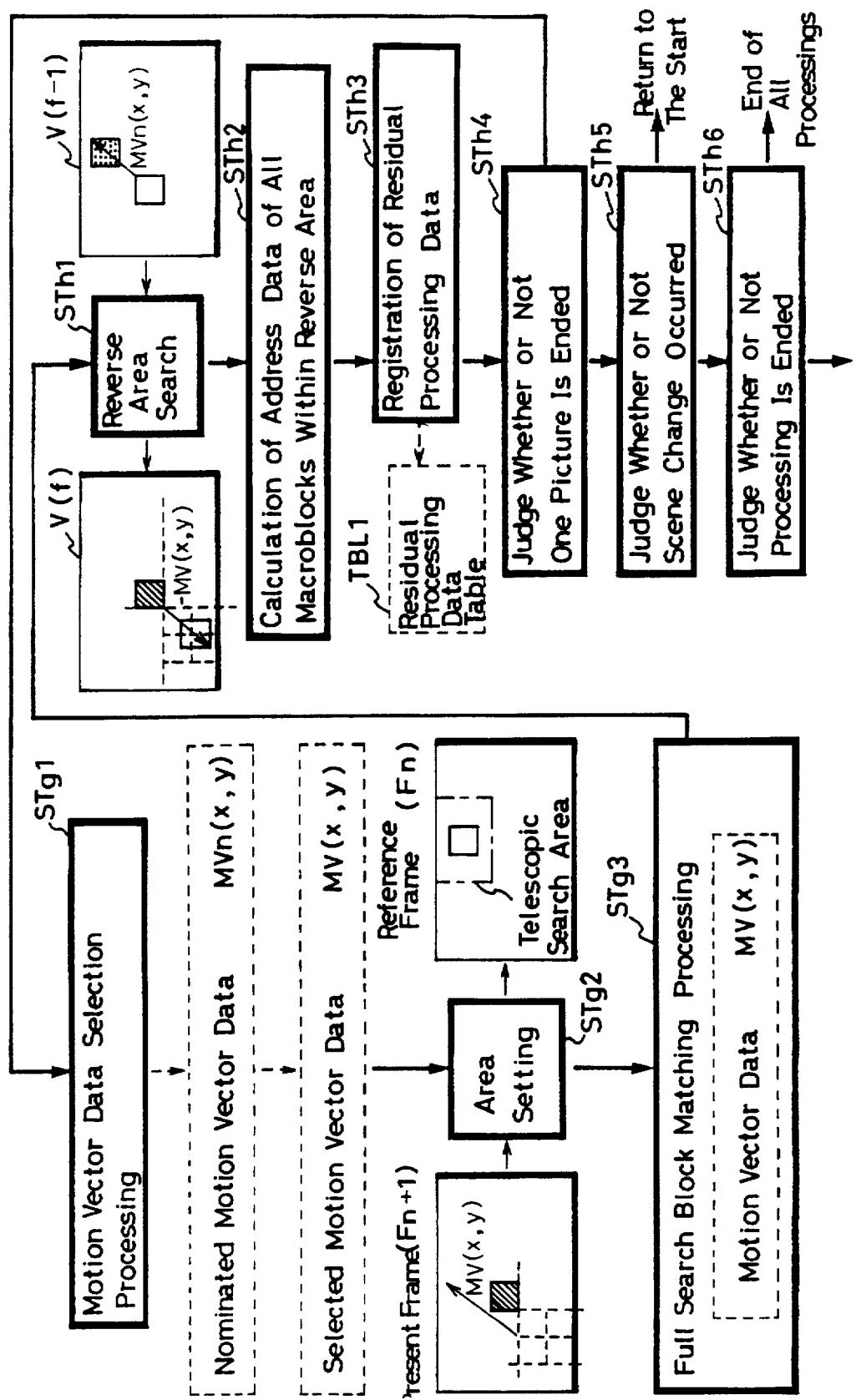
FIG. 8 is a schematic diagram used to explain an outline of the processing executed when a telescopic search processing in the residual processing steps shown in FIG. 7 is used.

FIG. 8 is a diagram used to explain more in detail the processing steps STg and STh shown in FIG. 7, and to which reference is made in explaining the outline of the first embodiment which will be described later on.

When a picture is updated, motion vector data is selected in a processing step STg1. This selection processing is executed for every target macroblock of the frame image data V (f+1) of present frame. Specifically, there are searched other macroblocks in which the same number data as the target macroblock number data of the target macroblock to be processed is registered as the reverse area target macroblock number data within the reverse area. Then, motion vector data registered in the searched target macroblocks are read out, respectively. In the above example, the number of motion vector data thus read is not determined. As shown by broken-line blocks in FIG. 8, optimum motion vector data MV (x, y) is selected from motion vector data MV1 (x, y) to MVn (x, y) thus read out (n is an integer).

Hereinafter, there are searched other target macroblocks wherein the same number data as the target macroblock number data of the target macroblocks to be processed are registered as the reverse area target macroblock number data within the reverse area. Motion vector data registered for the searched target macroblocks are referred to as "nominated motion vector data".

In a processing step STg2, an area setting processing is carried out. As shown on the left and right of this processing step STg2, a very small area (referred to as "telescopic area") including the reference macroblock located at the position shown by the value of the motion vector data MV (x, y) from the same position as that of the target macroblock to be processed in the frame image data V (f+1) is set in the frame image data V (f).

In a processing step Stg3, a full search block matching processing is carried out. That is, a differential absolute value sum calculation is effected on pixel data located within the target macroblock within the frame image data V (f+1) and pixel data located within the reference macroblock provided within the telescopic search area. After all calculations of one target macroblock and all reference macroblocks located within the telescopic search area TSA have been finished, there are obtained differential absolute value sum data of the same number as that of all reference macroblocks located within the telescopic search area TSA.

Differential absolute value sum data of minimum value is selected from the differential absolute value sum data, and motion vector data MV (x, y) is obtained based on the selected differential absolute value sum data, address data of the reference macroblock in which the differential absolute value sum data could be obtained, and address data of the target macroblock. The above-mentioned block matching processing is similar to the processing step STa wherein the full search block matching processing shown in FIG. 7 is carried out.

In a processing step STh1, as shown at left and right of solid-line blocks showing this processing step STh1, the reverse area is searched. In the next processing step STf2, address data of all macroblocks located within the reverse area are calculated. Subsequently, in a processing step STh3, residual processing data are registered on the residual processing data table TBL1. The processing steps STh1, STh2 and STh3 are the same as the processing steps STb, STc and STd shown in FIG. 7.

In a processing step STh4, it is determined whether or not the processing of one picture is ended. If the processing of one picture is not ended, then the processing goes back to the processing step STg1. If on the other hand the processing of one picture is ended, then the processing goes to a processing step STh5. The processing step STh5 is the same decision step as the processing step STe shown in FIG. 7.

In the processing step STh5, it is determined whether or not a scene is changed. If a scene is changed, then the processing goes back to the processing step STa shown in FIG. 7. If a scene is not changed, then the processing goes to a processing step STh6. There is the large possibility that the contents of image data obtained before and after the scene change will be changed considerably. Therefore, the full search block matching processing has to be made from the beginning. In other words, so long as relating frame image data are continued, the processing steps STa through STf need not be executed.

Differences of embodiments will be described below.

In the first embodiment, in the processing step STg1, motion vector data close to motion vector data of target macroblock around the target macroblock to be processed is selected from nominated motion vector data.

In the second embodiment, in the processing step STg1, motion vector data of target macroblock which is very frequently included in the reverse area is selected from nominated motion vector data.

In the third embodiment, nominated motion vector data is registered on the residual processing table data TBL1, and contents of the residual processing data table TBL1 are stored at every frame. Then, motion vector data is selected based on nominated motion vector data registered on the residual processing data table TBL1 in the step two steps before the processing. By way of example, the contents of the residual processing data table TBL1 are stored at every frame, and motion vector data close to nominated motion vector data registered at the same position as the position of the target macroblock of the frame image data of present frame in response to the target macroblock of preceding frame image data.

In the fourth embodiment, the processing step STg1 for selecting the motion vector data shown in FIG. 8 is placed behind the processing step STg3 for executing the full search block matching processing. In the processing step STg3, a target macroblock in which the same target macroblock number data as the target macroblock to be processed is registered as reverse area target macroblock number data within the reverse area is searched from the residual processing data table TBL1. The telescopic search area TSA is set by use of motion vector data registered with respect to the target macroblock number data of all macroblocks, and the target macroblock and the reference macroblocks provided within all the set telescopic search areas are motion-detected. Then, minimum differential absolute value sum data is calculated from all the telescopic search areas, and motion vector data are obtained in response to the minimum differential absolute value sum data.

In the processing step STg1, motion vector data with minimum differential absolute value sum is selected from motion vector data calculated with respect to all the telescopic search areas TSA.

In the fifth embodiment, there is obtained mean motion vector data which is a mean value of motion vector data registered with respect to all macroblocks provided within the residual processing data table TBL1. In the processing step STg1, motion vector data closest to the mean motion vector data is selected from the nominated motion vector data.

In the sixth embodiment, when motion vector data thus obtained by the full search block matching processing are registered on the residual data table TBL1, a residual value which is minimum differential absolute value sum data obtained with respect to the motion vector data also is registered on the residual processing data table TBL1. All target macroblocks in which the same target macroblock number data as the target macroblock to be processed is registered as the reverse area target block number within the reverse area are searched from the residual processing data table TBL1. Motion vector data registered with respect to the target macroblock number data of all macroblocks thus obtained by search are set to the nominated motion vector data. In the processing step STg1, motion vector data with minimum residual value is selected from the above nominated motion vector data.

As described above, when frame image data are processed in the sequential order of frame image data V (f−1), V(f) and V (f+1), the frame image data V (f) is set to the frame image data of present frame, the frame image data V (f−1) is set to the frame image data of preceding frame, the large search area SA is set within the frame image data V(f−1), the differential absolute value sum calculation is effected on the pixel data located within the target macroblock of the frame image data V (f) and the pixel data located within a large number of reference macroblocks within the search area SA of the frame image data, the differential absolute value sum data of minimum value is selected from a large number of differential absolute value sum data, and the motion vector data is obtained based on the differential absolute value sum data, the address data of the reference macroblock in which the difference absolute value sum data could be obtained and the address data of the target macroblock.

Then, start address of the reverse area target macroblock within the reverse area is obtained by searching the reverse area shown by the value of motion vector data with the same magnitude as the motion vector data but with opposite direction, the reverse area target macroblock number data is obtained based on the searched start address, the start address data of the target macroblock in which the motion vector data is obtained, the reverse area target macroblock number data within the reverse area, and the motion vector data are registered on the residual processing data table TBL1 as registered data of the target macroblock number data of the target macroblock in which the motion vector data is obtained. The above-mentioned processing is effected all the target macroblocks of the frame image data V (f) of the present frame.

Then, an image is updated, and the frame image data V (f+1) is set to the frame image data of present frame, and the frame image data V (f) is set to the frame image data of preceding frame. Then, target macroblock number data of the target macroblock in which the same target macroblock number data as that of the frame image data V (f+1) is registered as the reverse area target macroblock number data is searched from the residual processing data table TBL1. With respect to the target macroblock number data of the target macroblock obtained by search, one motion vector data is selected from the motion vector data registered on the residual processing data table TBL1. The very small telescopic search area TSA including the reference macroblock located at the position shown by the motion vector data is set within the frame image data V (f). Pixel data of the target macroblock located within the frame image data V (f+1) and pixel data of the reference macroblock located within the telescopic area TSA are processed by block matching. The resultant motion vector data is set to the motion vector data for motion-compensation, and start address of the target macroblock located within the reverse area including the block located at the position shown by the value of the motion vector data with the same magnitude as that of the motion vector data but with the reverse direction is obtained, and registered on the residual processing data table TBL1 similarly as described above.

According to the above-mentioned processing, the position of the pixel data located within the target macroblock in the present frame is predicted based on motion vector data obtained with respect to one target macroblock in the preceding frame and motion vector data of opposite direction to thereby obtain the reverse area target macroblock number data within the reverse area including the block which is predicted to exist at that position. Then, when the target macroblock of present frame is processed, the optimum motion vector data is selected from the motion vector data of the target macroblock wherein the target macroblock number data of the target macroblock is registered as the reverse area target macroblock number data within the reverse area, and the very small telescopic search area TSA used in the processing of the present target macroblock processing of preceding frame can be set by the selected motion vector data. Therefore, a time required by the motion detection processing can be reduced considerably, and accurate motion vector data can be obtained. Since accurate motion vector data can be obtained, a motion compensation can be carried out more accurately. A probability that an error is contained between image data to be encoded and image data compensated by the motion vector data can be suppressed considerably, and hence a difference can be reduced. Thus, an encoding efficiency can be increased, and a transmission efficiency can be improved considerably.

Correspondence of steps and flowcharts in the first to sixth embodiments will be described below.

Figure 11:
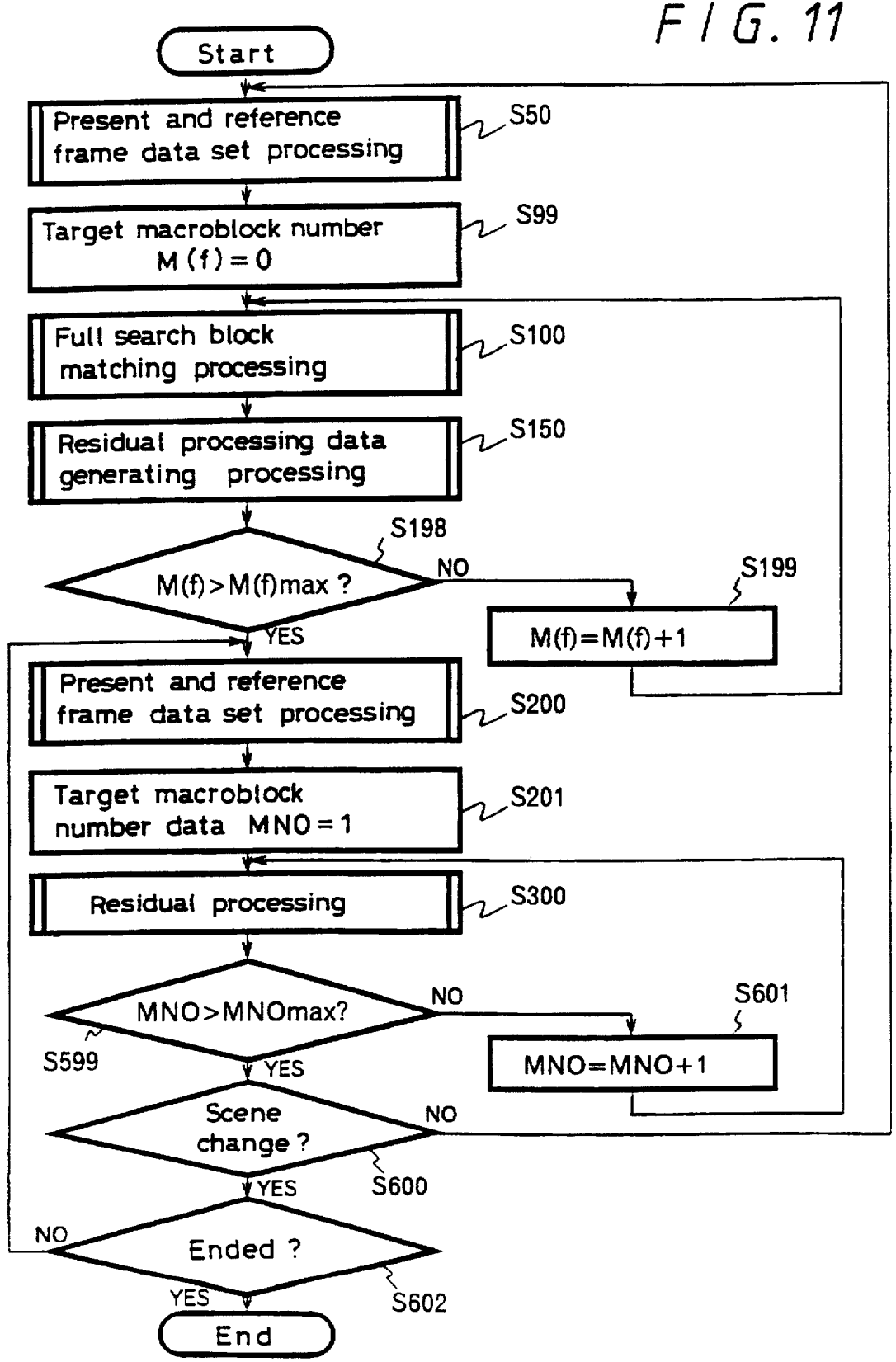
FIG. 11 is a flowchart used to explain a control operation of a main routine of the motion detecting circuit shown in FIG. 9.
Figure 14:
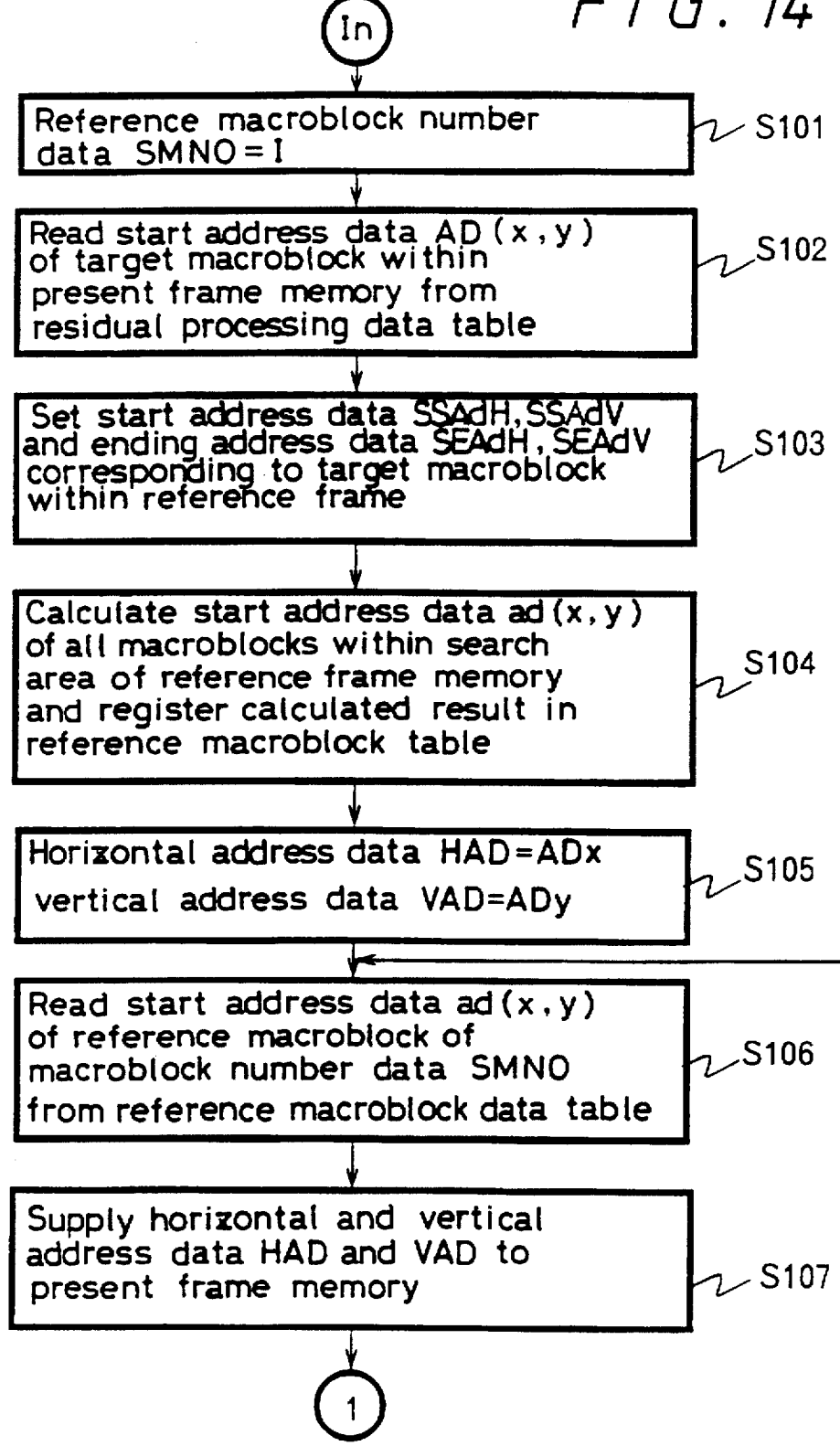
FIG. 14 is a flowchart used to explain a control operation based on a full search block matching processing routine at step S100 in the flowchart of the main routine shown in FIG. 11.
Figure 15:
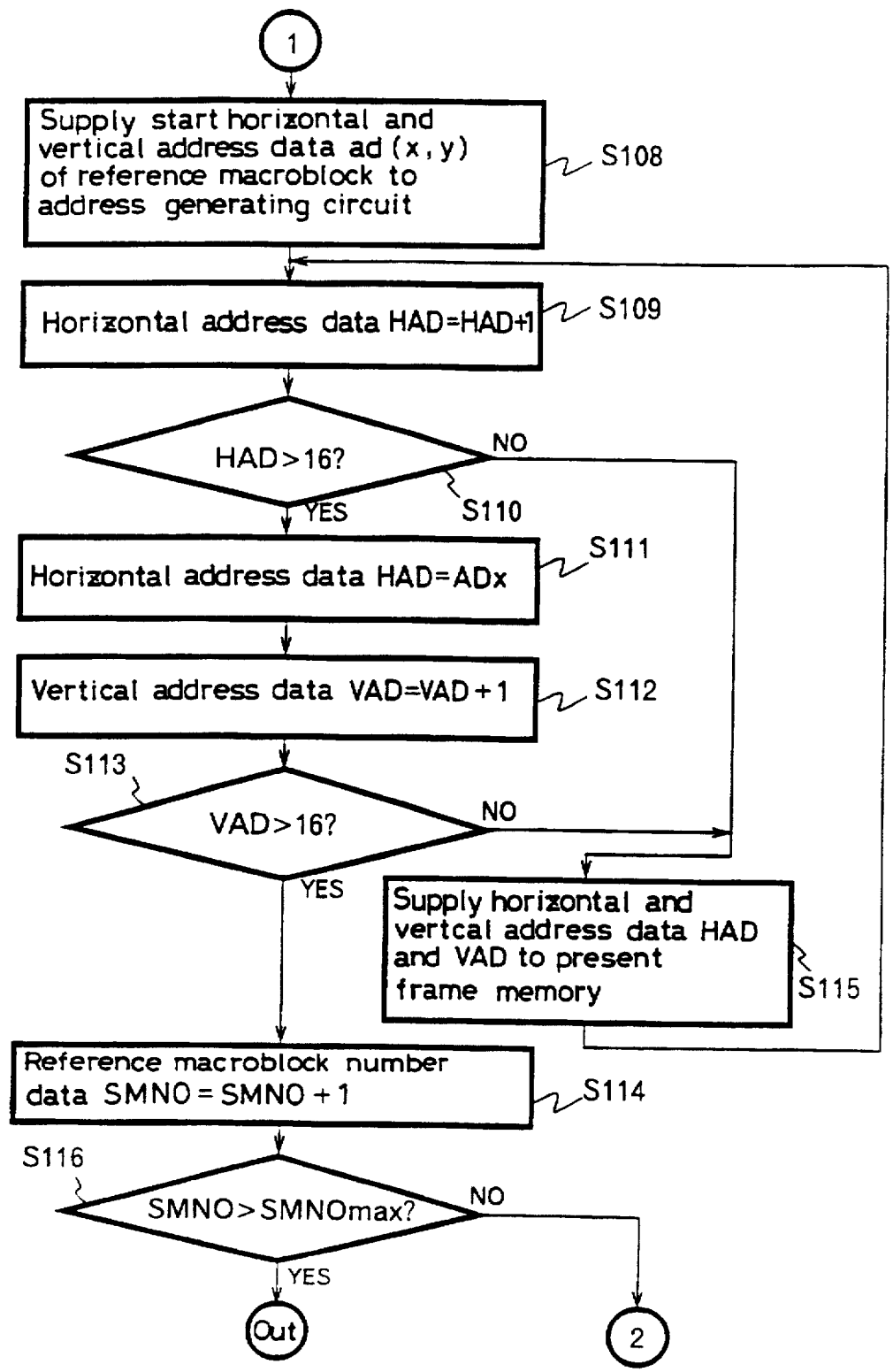
FIG. 15 is a flowchart used to explain a control operation based on a full search block matching processing routine at step S100 in the flowchart of the main routine shown in FIG. 11; *B1

The first embodiment:

FIG. 7 and 8 correspond to FIG. 11, and the full search block matching of the step STa shown in FIG. 3 corresponds to the processing in the full search block matching processing in the flowcharts shown in FIGS. 14 and 15.

Figure 17:
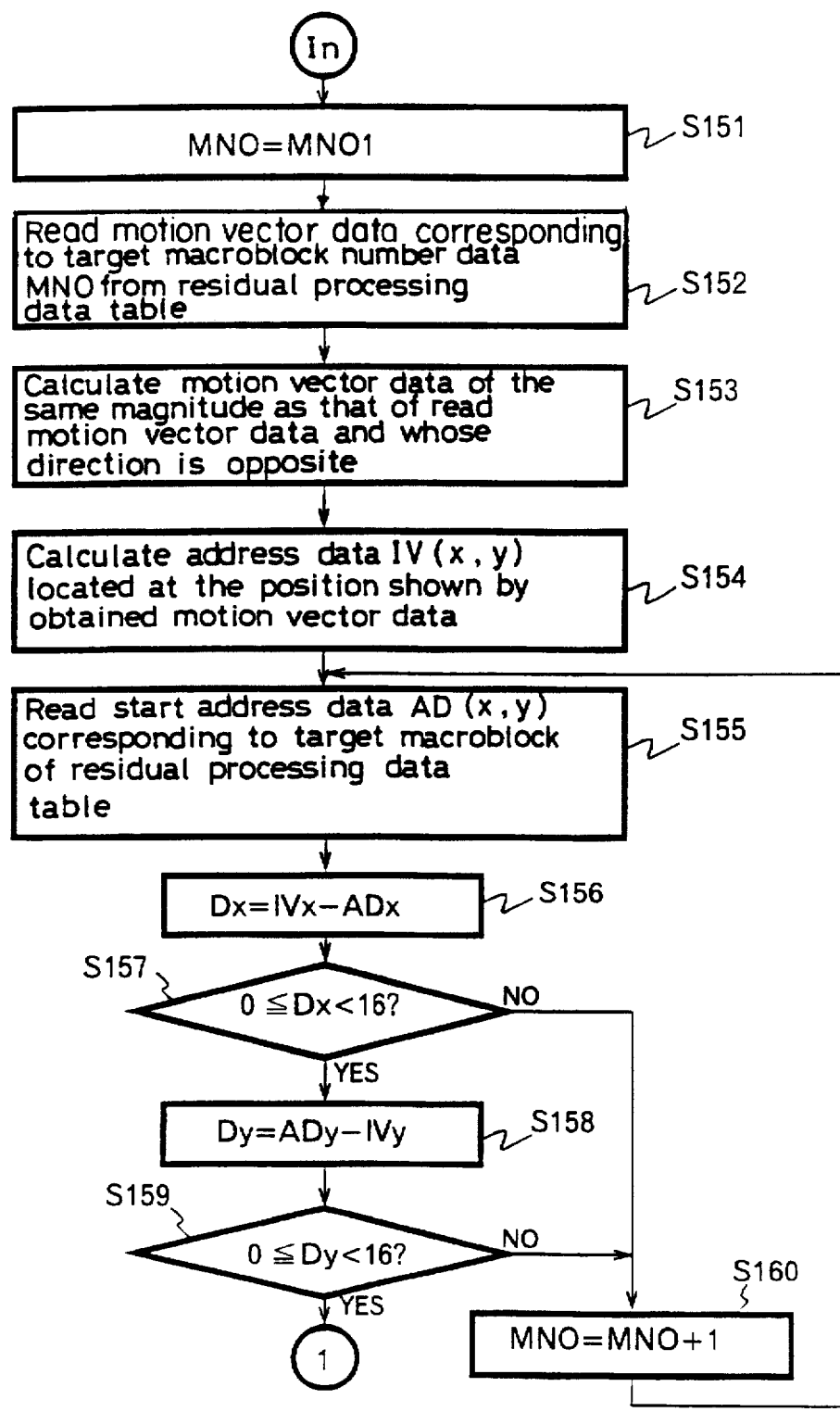
FIG. 17 is a diagram used to explain a layout pattern of macroblock in the reverse area.
Figure 18:
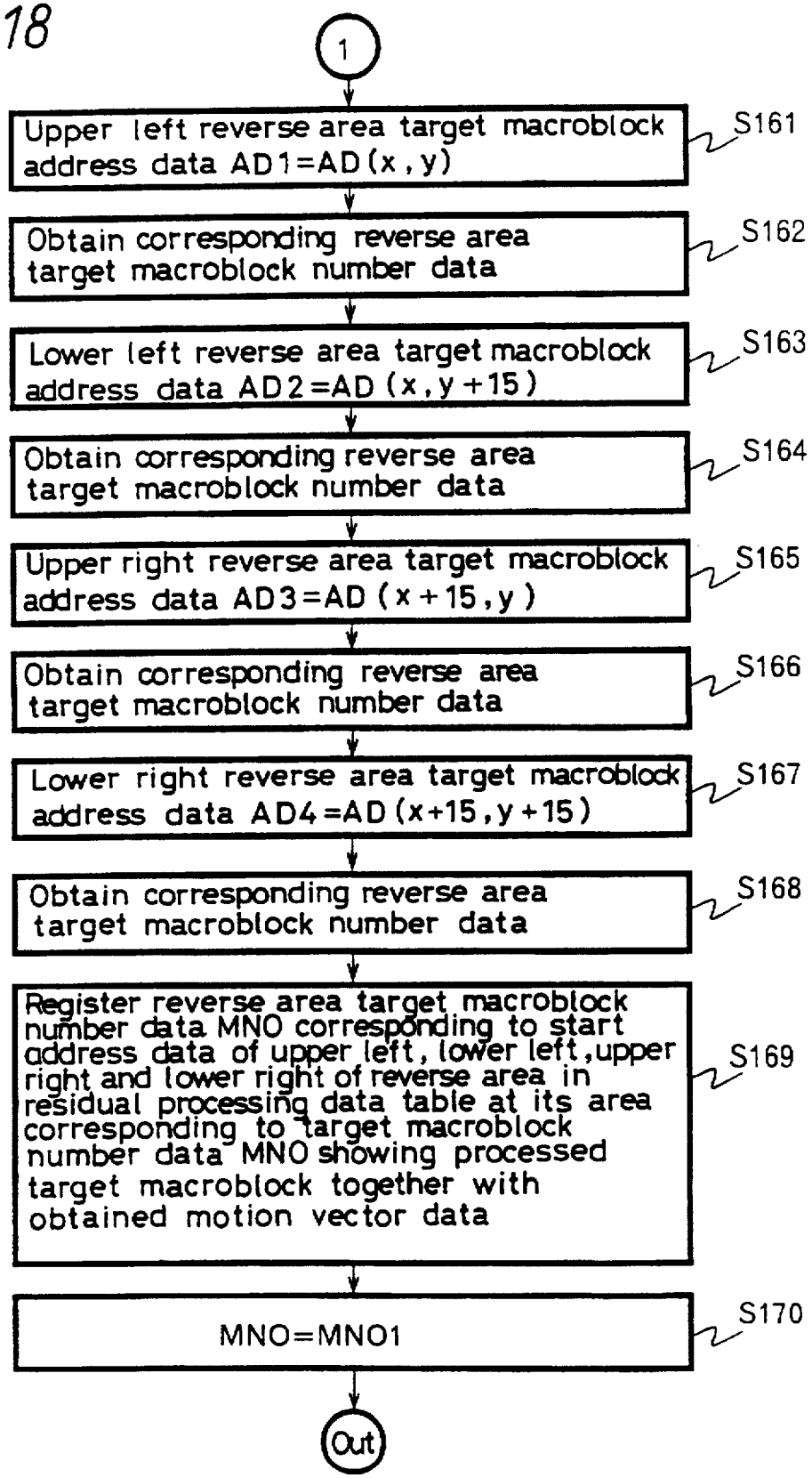
FIG. 18 is a flowchart used to explain a control operation based on the residual processing routine at step S150 in the flowchart of the main routine shown in FIG. 11.

The reverse area search processing in the step STb shown in FIG. 7 corresponds to a residual processing data generating processing routine of flowcharts shown in FIGS. 17 and 18.

The address calculation processing in the whole reverse area within the reverse area in the step STc shown in FIG. 7 corresponds to the processing in the residual processing data generating processing routine of flowchart shown in FIG. 18.

The residual processing data registration processing of the step STd shown in FIG. 7 corresponds to the processing in the residual processing data generating processing routine of flowchart shown in FIG. 18.

The judging processing in the step STe shown in FIG. 7 corresponds to a step S198 of a flowchart shown in FIG. 11.

Figure 12:
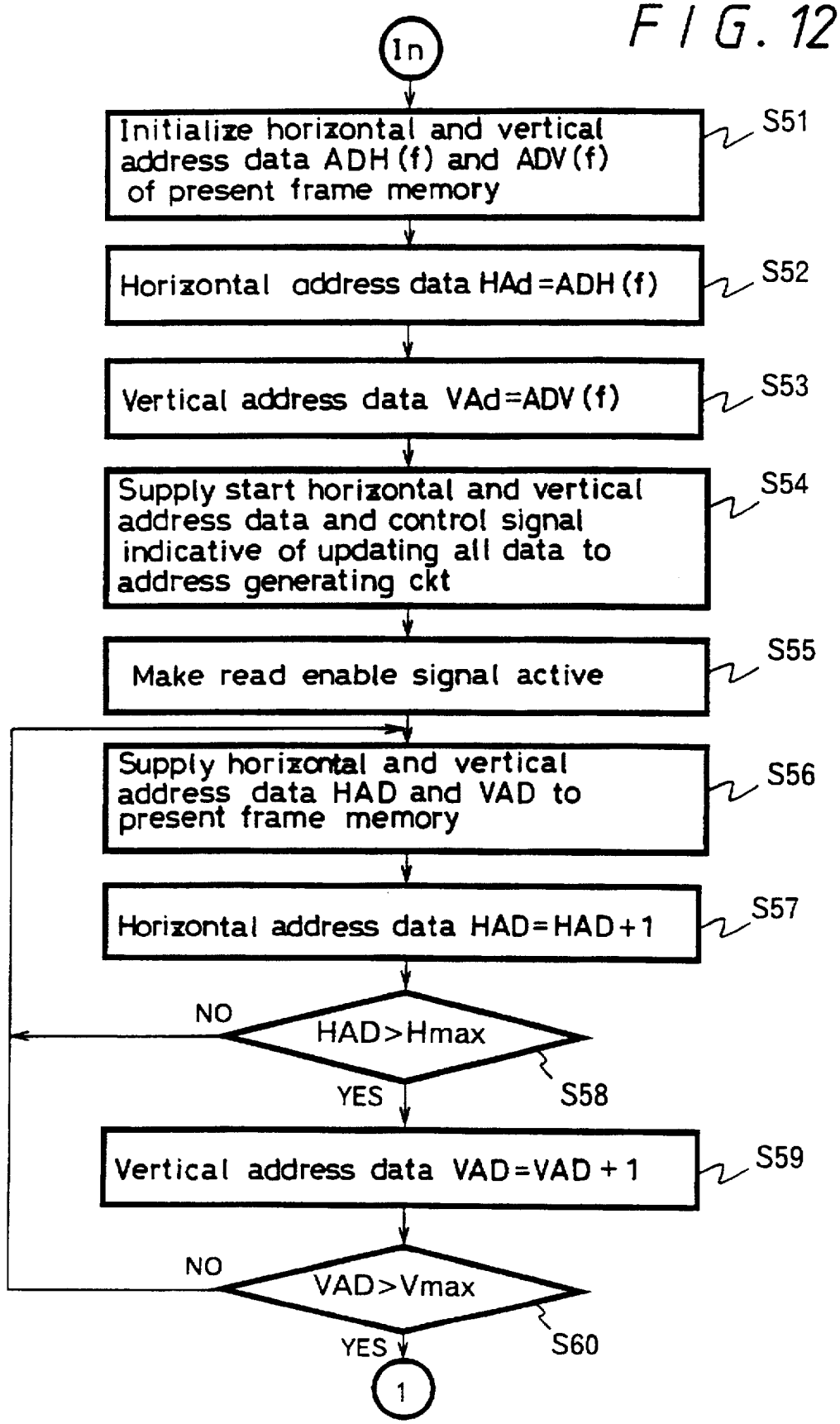
FIG. 12 is a flowchart used to explain a control operation based on a present and reference frame data setting processing routine at step S50 and S200 in the flowchart of the main routine shown in FIG. 11.
Figure 13:
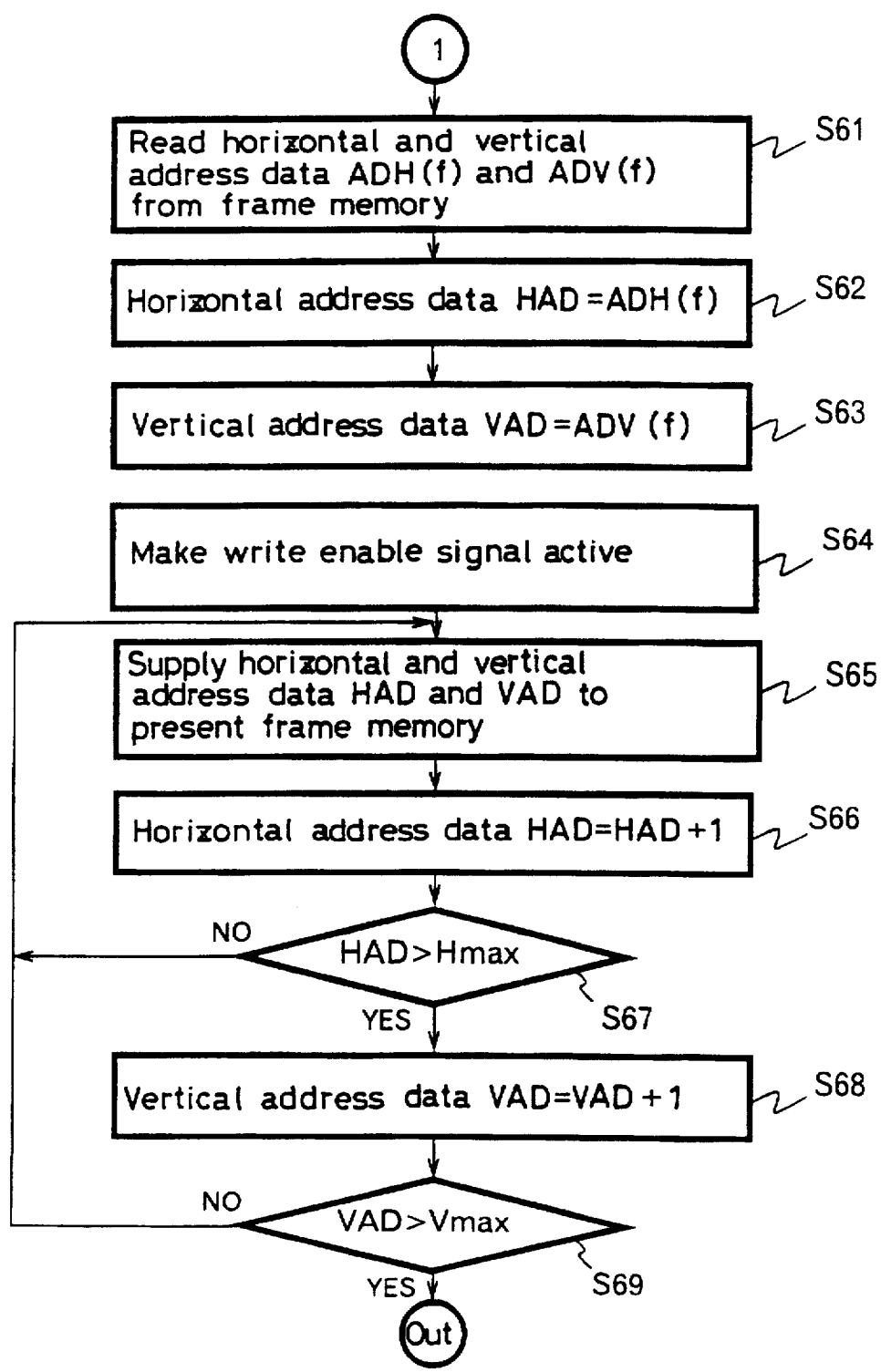
FIG. 13 is a flowchart used to explain a control operation based on the present and reference frame data setting processing routine at steps S50 and S200 in the flowchart of the main routine shown in FIG. 11.

The scene changing processing in the step STe shown in FIG. 7 corresponds to a processing in present and reference frame data set processing routine in flowcharts shown in FIGS. 12 and 13.

The residual processing in the step STg shown in FIG. 7 corresponds to a step S300 of a flowchart shown in FIG. 11.

The residual processing data generating processing in the step STh shown in FIG. 7 corresponds to the step S300 of the flowchart shown in FIG. 11.

Figure 19:
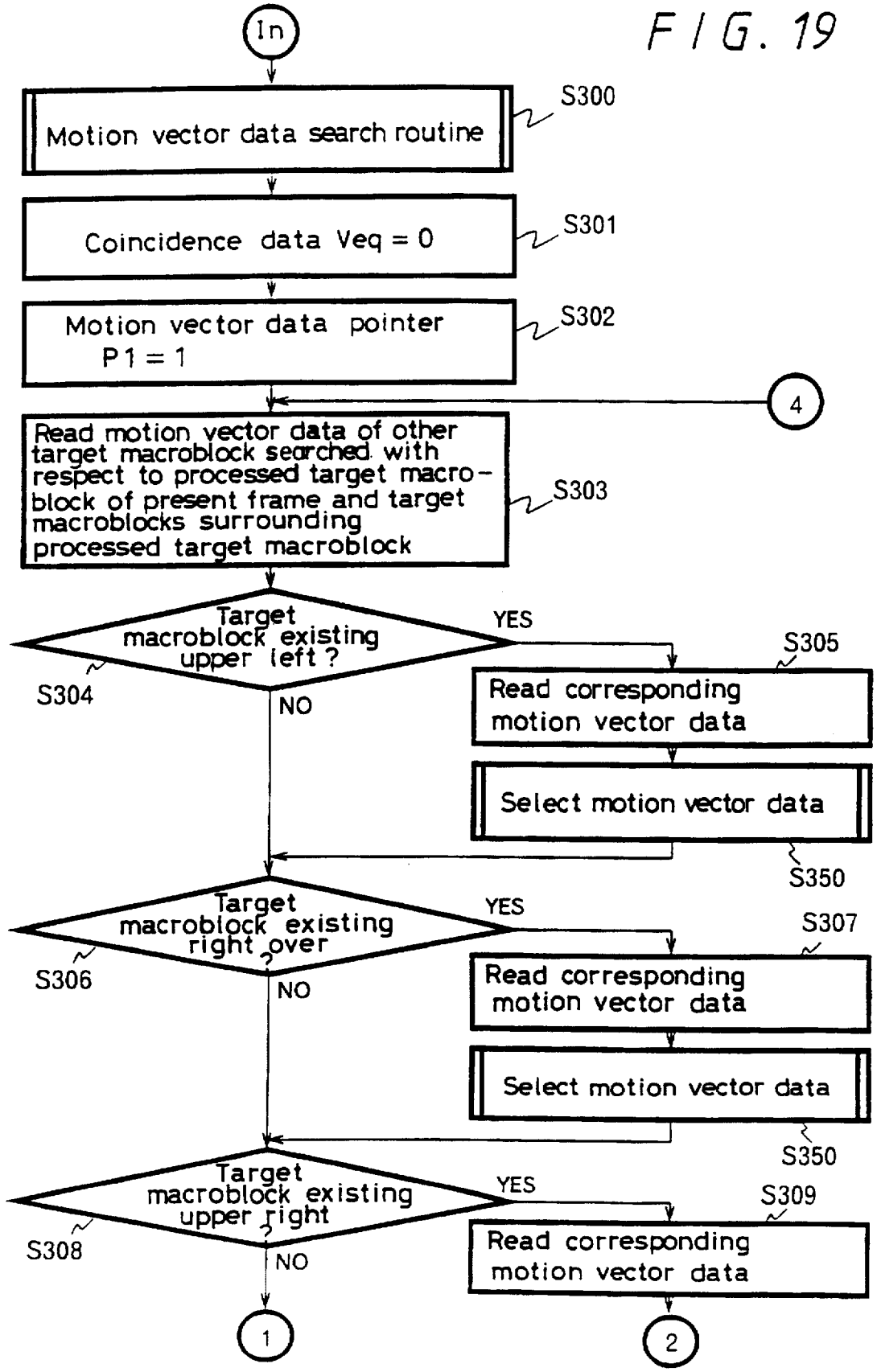
FIG. 19 is a flowchart used to explain a control operation based on the residual processing routine at step S300 in the flowchart of the main routine shown in FIG. 11.
Figure 20:
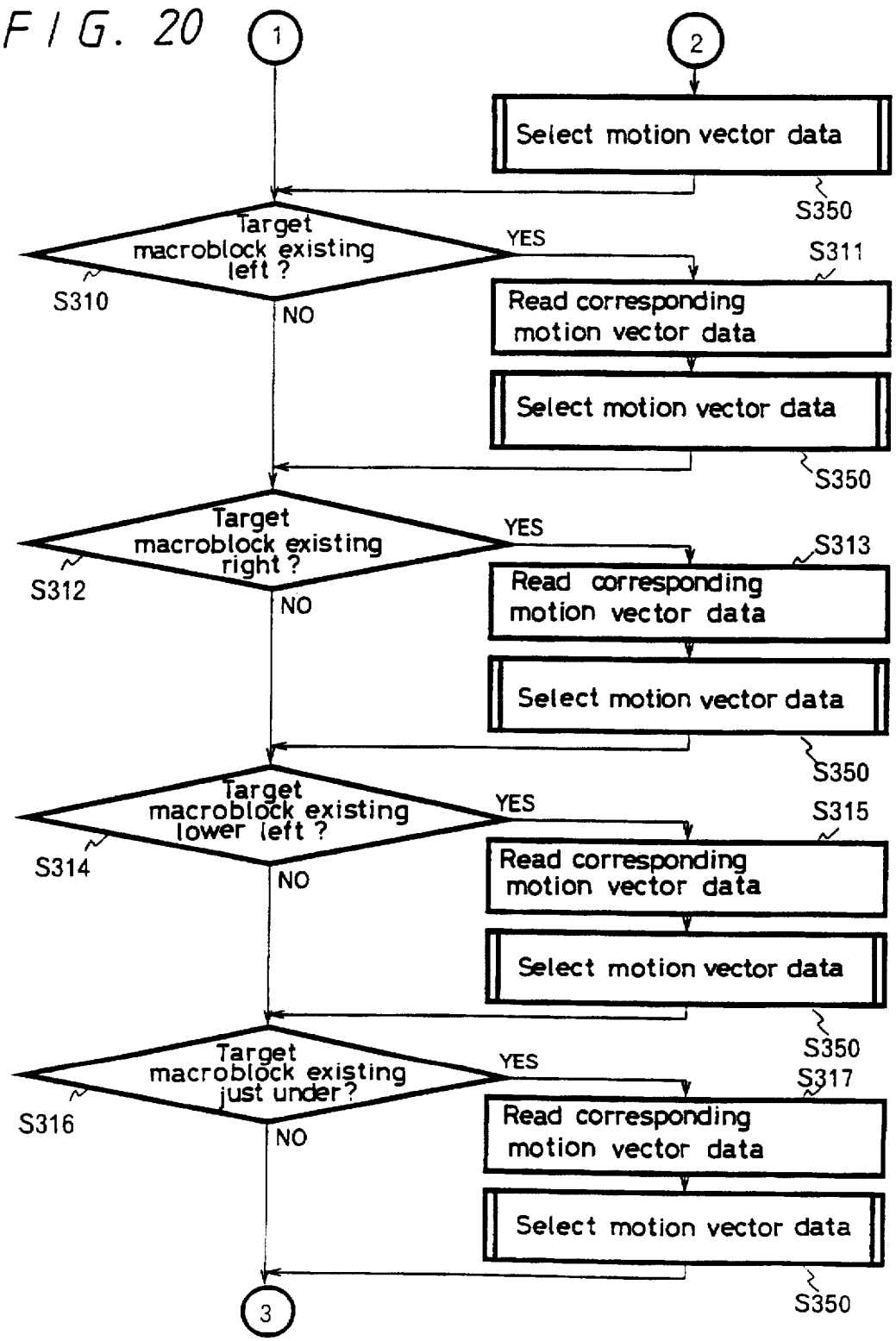
FIG. 20 is a flowchart used to explain a control operation based on the residual processing routine at step S300 in the flowchart of the main routine shown in FIG. 11.
Figure 21:
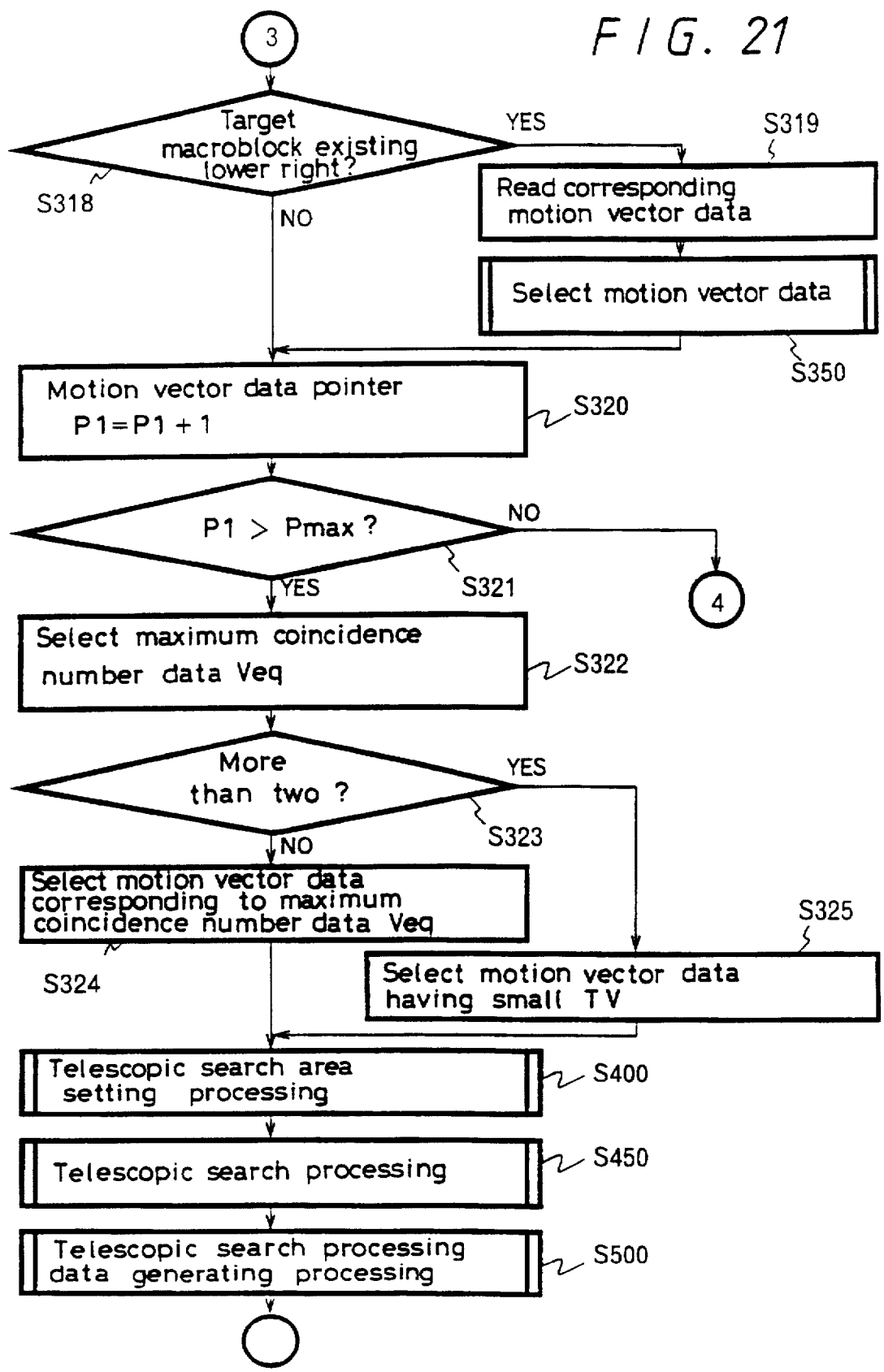
FIG. 21 is a flowchart used to explain a control operation based on the residual processing routine at step S300 in the flowchart of the main routine shown in FIG. 11.

The motion vector data selecting processing in the step STg1 shown in FIG. 8 corresponds to a processing in a motion vector selection processing at a step S350 shown in FIGS. 19 to 21. A processing based on the motion vector selection routine at the step S350 corresponds to a processing in a motion vector selection routine shown in FIGS. 24 and 25.

Figure 27:
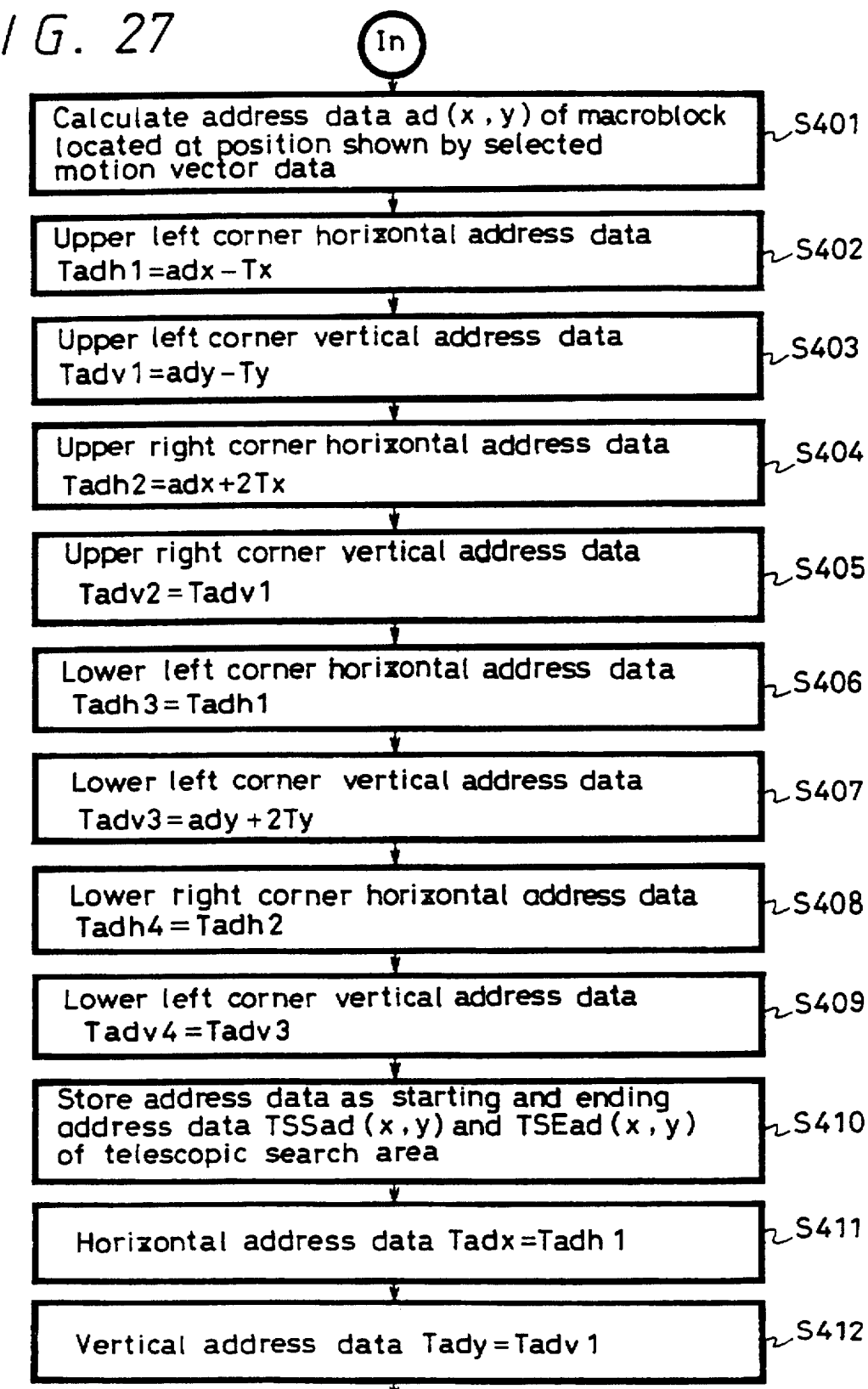
FIG. 27 is a diagram used to explain a control operation based on a telescopic search area setting processing routine at step S400 in the flowchart shown in FIG. 21.
Figure 28:
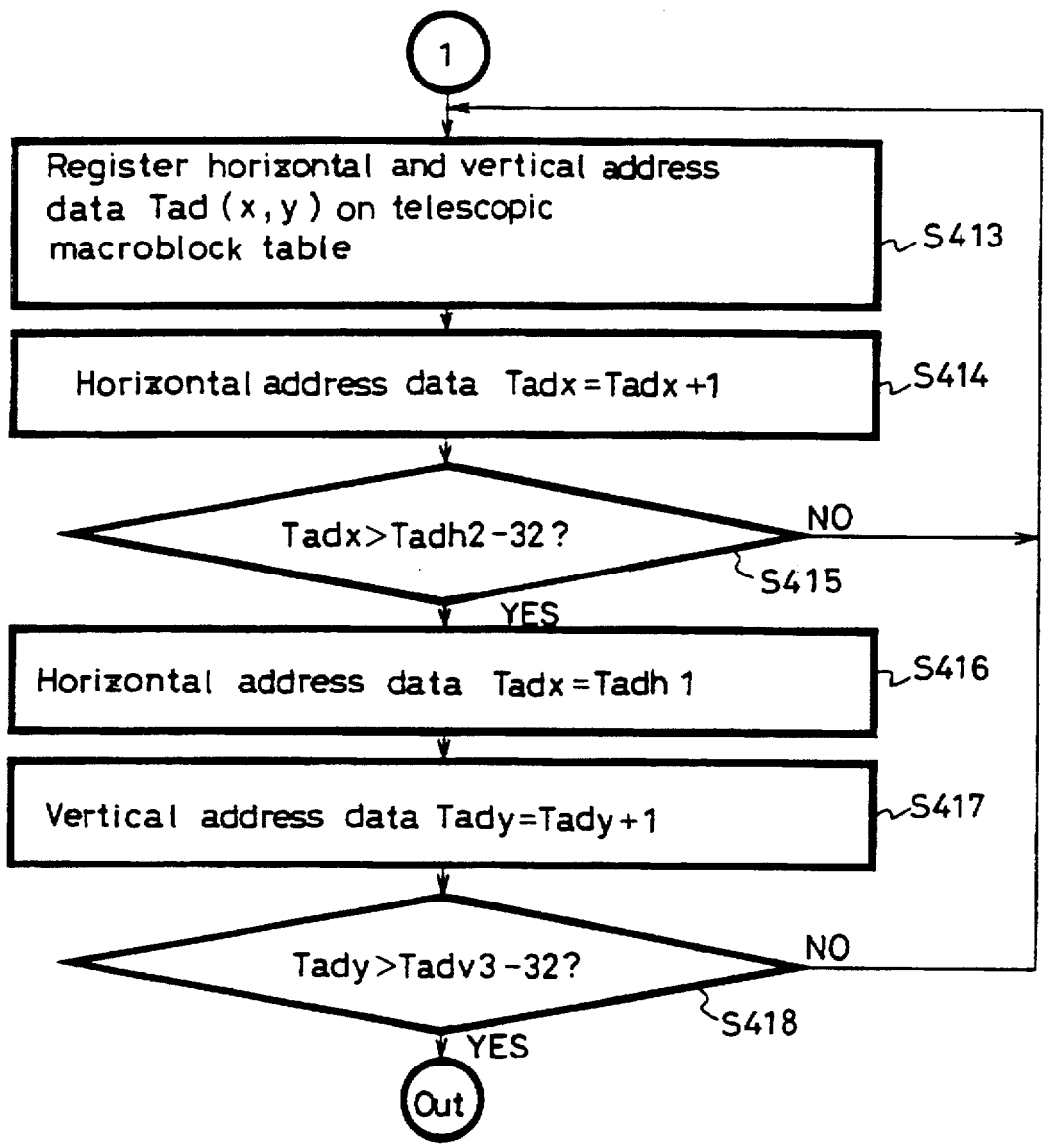
FIG. 28 is a diagram used to explain a control operation based on a telescopic search area setting processing routine at step S400 in the flowchart shown in FIG. 21.

The area setting processing at the step STg2 shown in FIG. 7 corresponds to a telescopic search area setting processing at a step S400 shown in FIG. 21, and the telescopic search area setting processing at step S400 corresponds to a processing in the telescopic search area setting processing routine in flowcharts shown in FIGS. 27 and 28.

Figure 29:
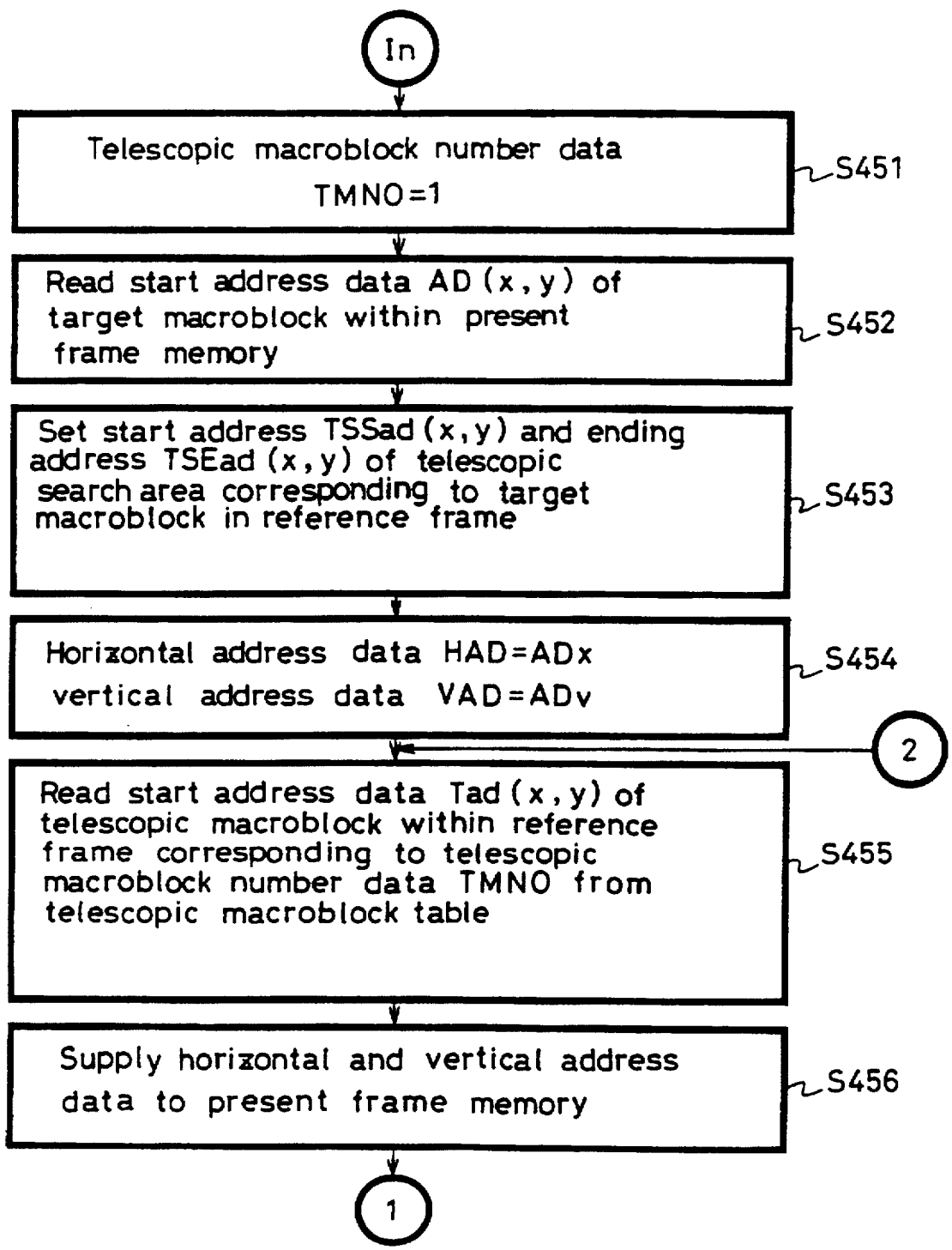
FIG. 29 is a diagram used to explain a control operation based on a telescopic search area setting processing routine at step S450 in the flowchart shown in FIG. 21.
Figure 30:
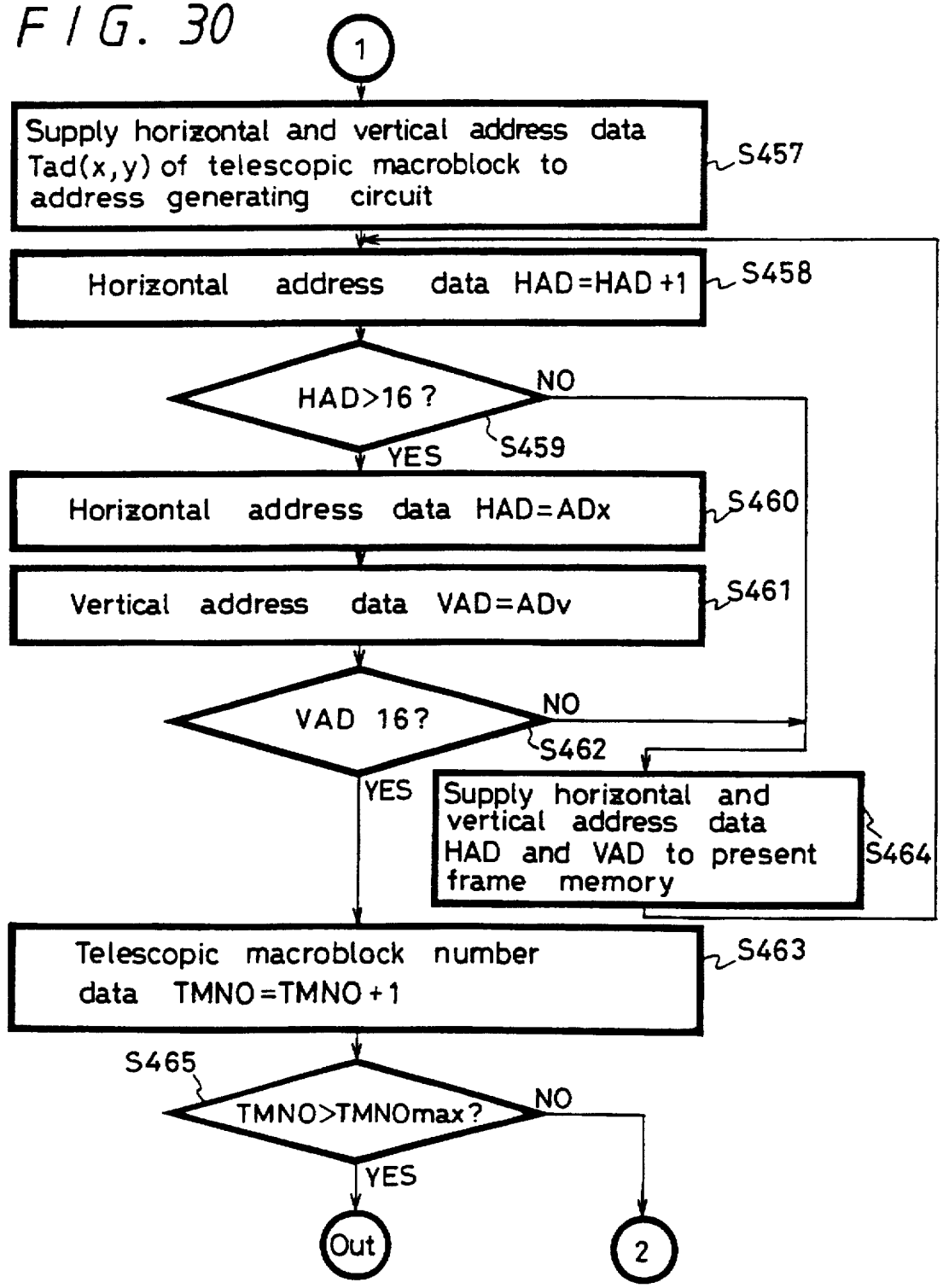
FIG. 30 is a diagram used to explain a control operation based on a telescopic search area setting processing routine at step S450 in the flowchart shown in FIG. 21.

The full search block matching processing in the step STg3 shown in FIG. 7 corresponds to a telescopic search processing at a step S450 shown in FIG. 21, and the telescopic search processing at the step S450 corresponds to a processing in a telescopic search processing in flowcharts shown in FIGS. 29 and 30.

The reverse area search processing at the step STh1 the address calculating processing for all macroblocks within the reverse area at the step STh2 and the residual processing data registration processing at the step STh3 shown in FIG. 7 correspond to a telescopic search processing data generating processing at a step S500 shown in FIG. 21, and the telescopic search processing data generating processing at the step S500 is the same as a step S150 in the flowchart shown in FIG. 11 in processing content.

The second judging processing in the step STh4 shown in FIG. 7 corresponds to a step S599 shown in FIG. 11, and the step STh6 shown in FIG. 7 corresponds to a step S602 shown in FIG. 11.

The second embodiment:

The second embodiment differs from the first embodiment in residual processing and a manner to select motion vector data in the residual processing. The residual processing in the step STg shown in FIG. 7 corresponds to residual processings in the flowcharts shown in FIG. 31 and 32. Therefore, in the second embodiment, of the flowcharts of FIGS. 11 to 30 used in the first embodiment, the flowcharts 31 to 32 are used instead of the flowcharts shown in FIG. 19 to 21 and the flowcharts shown in FIGS. 24 to 25. For other processing, the flowcharts used in the first embodiment are made common.

Figure 33:
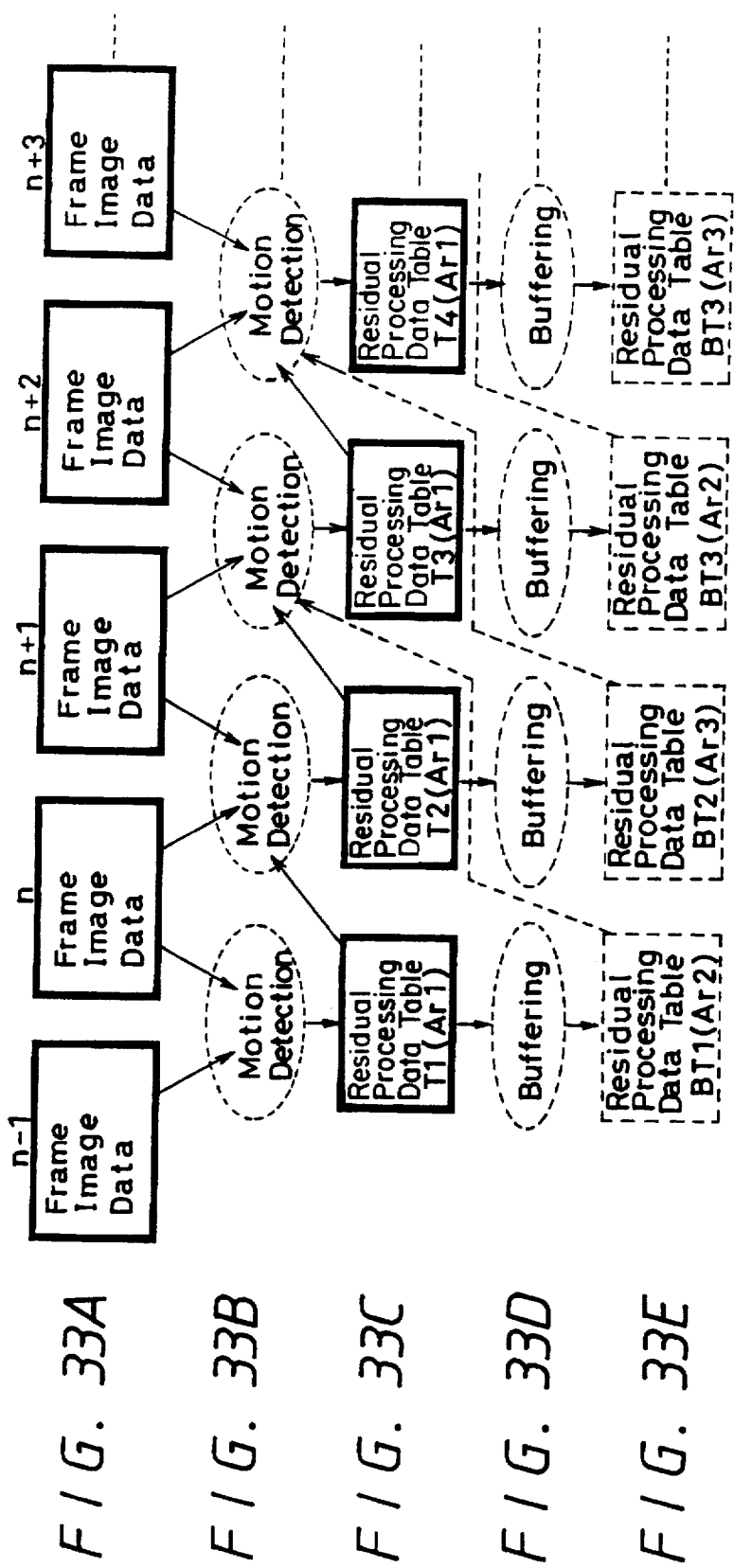

The third embodiment:

The third embodiment differs from the first embodiment in residual processing and a manner to select motion vector data in the residual processing. The residual processing in the step STg shown in FIG. 7 corresponds to flowcharts shown in FIGS. 34 to 36. Therefore, in the third embodiment, of the flowcharts shown in FIGS. 11 to 30 used in the first embodiment, the flowcharts of FIGS. 19 to 21 and FIGS. 24 to 25 are replaced with flowcharts shown in FIGS. 34 to 36, and the flowcharts used in the first embodiment are made common for other processing. With respect to only the third embodiment, FIG. 33 shows a conceneptual diagram.

Figure 24:
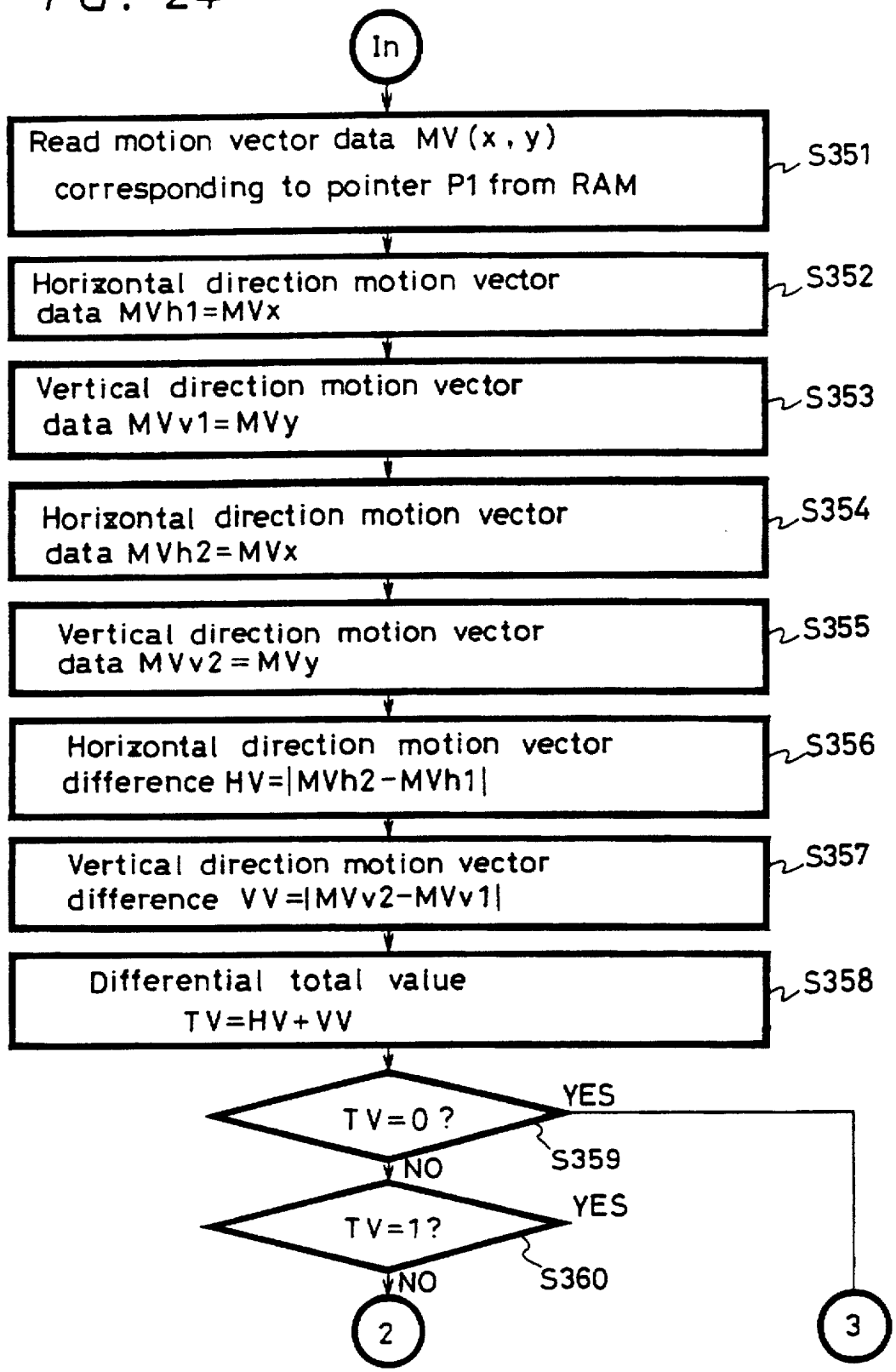
FIG. 24 is a flowchart used to explain a control operation of a motion vector selecting routine at step S350 in the flowcharts shown in FIGS. 19 to 21.
Figure 25:
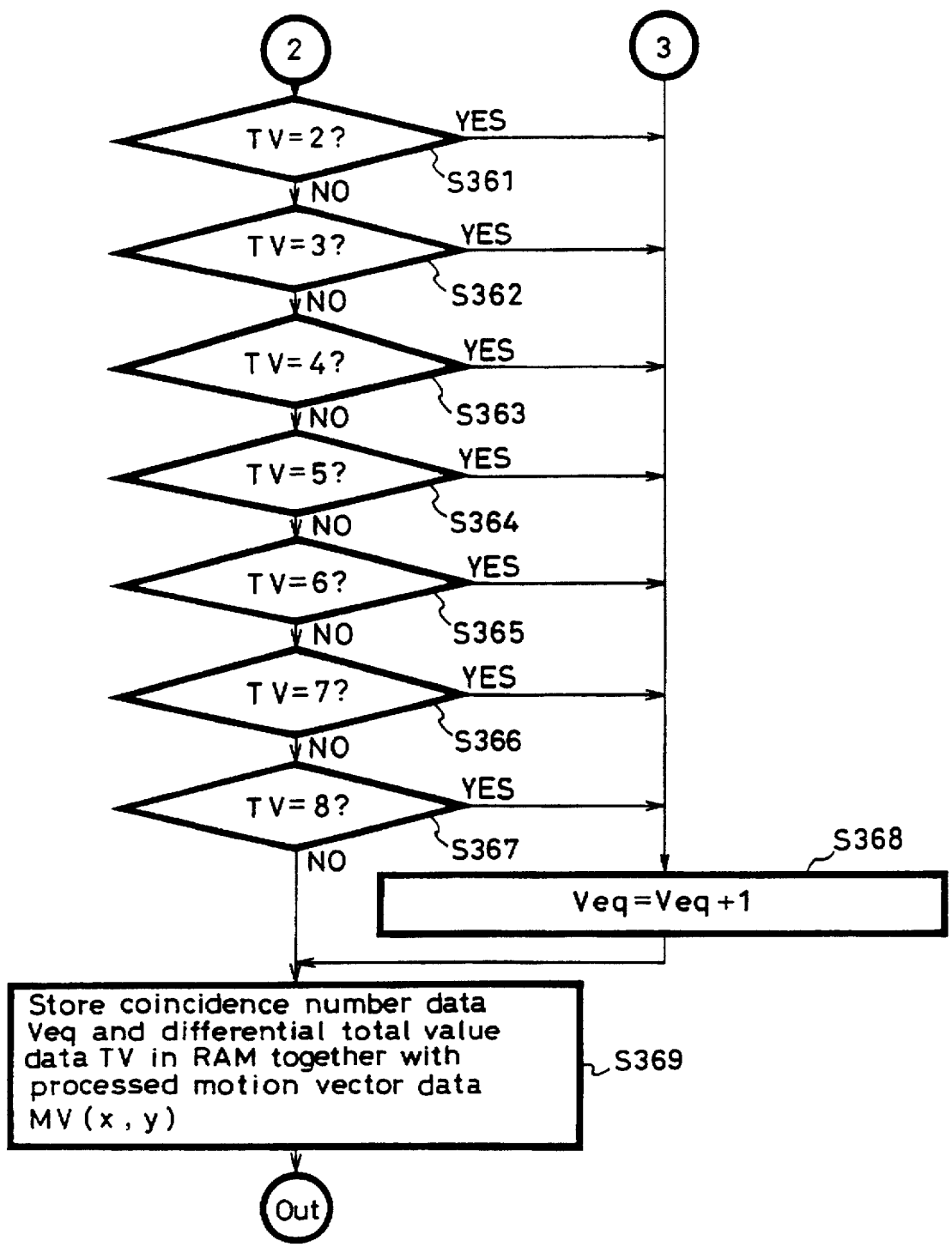
FIG. 25 is a flowchart used to explain a control operation of a motion vector selecting routine at step S350 in the flowcharts shown in FIGS. 19 to 21.

The fourth embodiment:

The fourth embodiment differs from the first embodiment in that motion vector data is not selected, the residual processing is effected on all data and motion vector data with minimum residual processing result is selected. The residual processing in the step STg shown in FIG. 7 corresponds to residual processings in flowcharts shown in FIGS. 37 and 38. Therefore, in the fourth embodiment, of the flowcharts of FIGS. 11 to 30 used in the first embodiment, flowcharts of FIGS. 19 to 21 and flowcharts of FIGS. 24 to 25 are replaced with the flowcharts shown in FIGS. 37 and 38, and flowcharts used in the first embodiments are made common for other processings.

The fifth embodiment:

The fifth embodiment differs from the first embodiment in that a mean value of motion vector data of respective macroblocks registered on the residual processing data table TBL1 and motion vector data closest to the mean motion vector data is selected from the nominated motion vector data. The residual processing in the step STg shown in FIG. 7 corresponds to residual processings in flowcharts shown in FIGS. 39 and 40. In the fifth embodiment, of the flowcharts shown in FIGS. 11 through 30 used in the first embodiment, the flowcharts of FIGS. 19 to 21 and FIGS. 24 to 25 are replaced with flowcharts of FIGS. 39 and 40, and the flowcharts used in the first embodiment are made common for other processings. A more detailed flowchart of mean motion vector obtaining routine for obtaining the mean value is illustrated in FIG. 41.

The sixth embodiment:

The sixth embodiment differs from the first embodiment as follows: When motion vector data with respect to respective target macroblocks are obtained by motion detection, residual value wherein motion vector data could be obtained are registered on the residual processing data table TBL1. Then, when one motion vector data is selected from nominated motion vector data, nominated motion vector data with the minimum residual value registered on the residual processing data table TBL1 is selected as motion vector data for setting telescopic search area. The residual processing in the step STg shown in FIG. 7 corresponds to a residual processing shown in FIG. 42. Therefore, in the sixth embodiment, of the flowcharts shown in FIG. 11 to 30 used in the first embodiment, the flowcharts of FIGS. 19 to 21 and the flowcharts shown in FIGS. 24 to 25 are replaced with the flowchart of FIGS. 42, and the flowcharts used in the first embodiment are made common for other processing.

The first through sixth embodiments according to the present invention will described below.

The first embodiment:

Arrangement and operation of a motion compensating circuit will be described with reference to FIG. 9.

Figure 9:
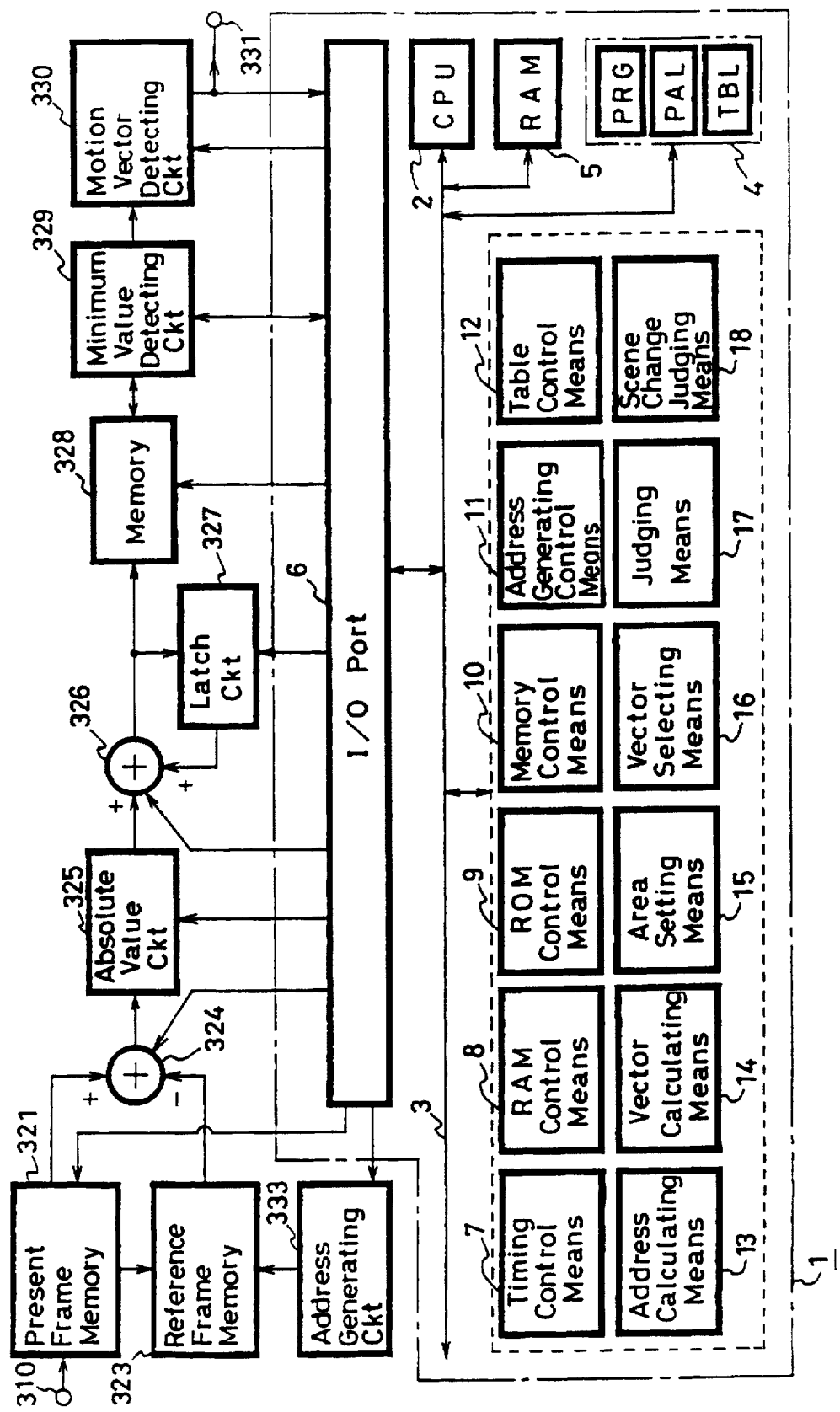
FIG. 9 is a block diagram showing a motion detecting circuit used in first to fourth embodiments.

FIG. 9 is a block diagram showing a motion detecting circuit for executing a block matching. The motion detecting circuit shown in FIG. 9 corresponds to the motion detecting circuits 205 and 206 of the motion encoder shown in FIG. 43.

Figure 43:
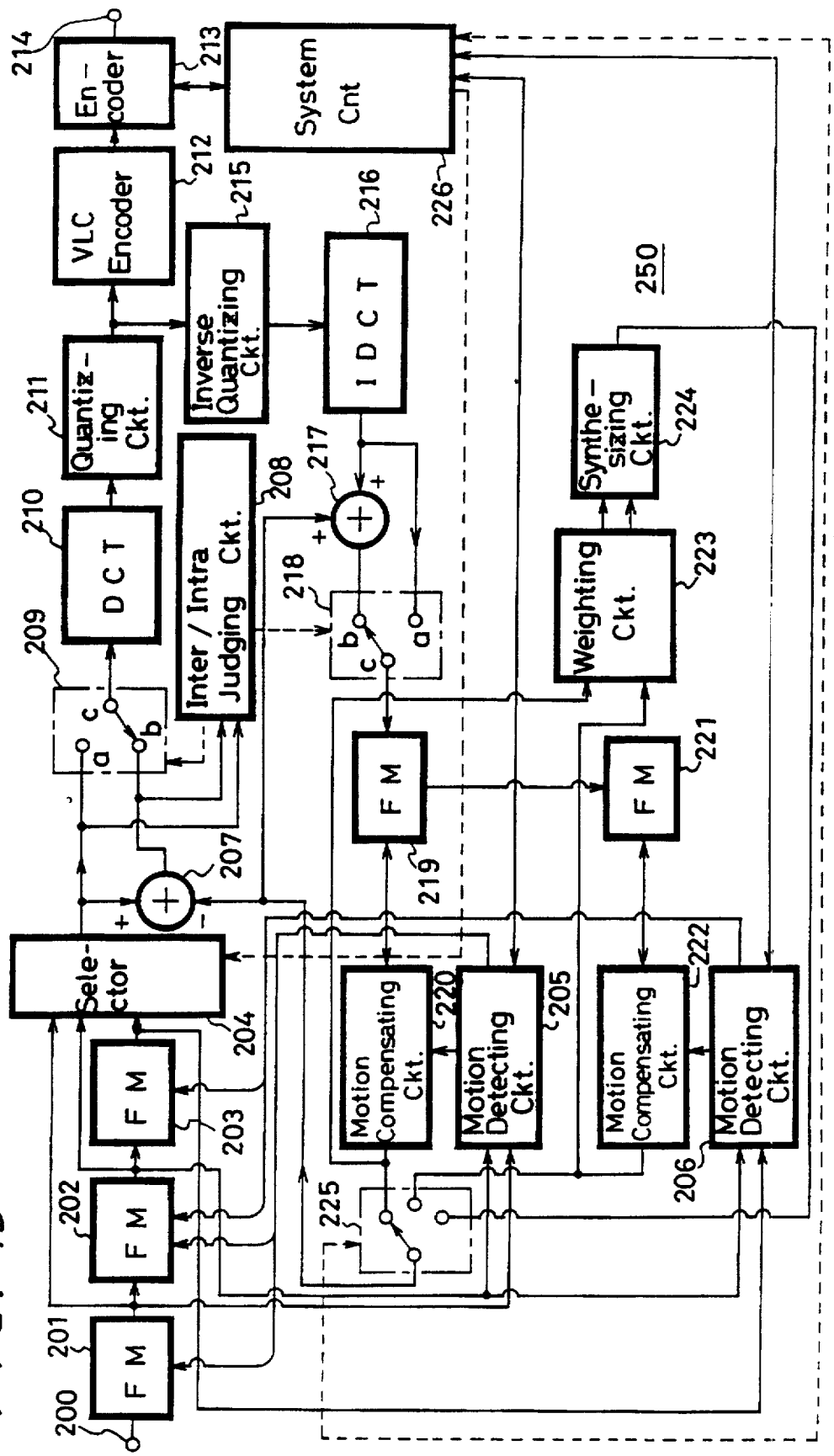
FIG. 43 is a block diagram showing a motion encoder used in the present invention.

In the motion encoder shown in FIG. 43, the frame memory 202 is set to the image memory of the present frame image, the frame memory 201 is set to the frame memory of the past frame, and the frame memory 203 is set to the frame memory of the future frame.

The motion detecting circuit shown in FIG. 8 comprises a present frame memory 321 for storing image data of present frame, a reference frame memory 323 for storing image data of succeeding or preceding frame (reference frame), an adding circuit 324 for subtracting pixel data of the reference macroblock from the frame memory 323 from the pixel data of the target macroblock of the present frame from the present frame memory 321, an absolute value circuit 325 for obtaining a differential absolute value of a subtracted result from the adding circuit 325, a latch circuit 327 for storing the absolute value data from the absolute value circuit 325, an adding circuit 326 for obtaining differential absolute value sum data of every reference macroblock by adding the output from the absolute value circuit 325 and the latch output from the latch circuit 327, a memory 328 for storing the differential absolute value sum data from the adding circuit 326, a minimum value detecting circuit 329 for detecting a minimum value from the differential absolute value sum data stored in the memory 328, a motion vector detecting circuit 330 for obtaining one motion vector data corresponding to one target macroblock and supplying this motion vector data to a controller 332 and a system controller 226 shown in FIG. 43, and a controller 332 for controlling an address generating circuit 333 based on the minimum differential absolute value sum data from the minimum value detecting circuit 329 and the motion vector data from the motion vector detecting circuit 330 and the writing of image data in the present frame memory 321 and the reading of image data from the present frame memory 321.

Under control of the controller 332, pixel data of macroblock (8×8 pixels or 16×16 pixels) serving as target block is sequentially and repeatedly read out from the present frame memory 321. On the other hand, under control of the controller 332, the address generating circuit 333 sets the search area on the storage space of the reference frame memory 323, sets a reference block of the same size as that of the macroblock within the search area and supplies address data for sequentially reading pixel data from the reference block. Then, after the reading of pixel data from the set reference block is completely finished, the address generating circuit 333 supplies address data to the reference frame memory 323 to thereby shift the position of the reference block within the search area by one pixel amount, and supplies sequentially address data to the reference frame memory 323 to thereby read pixel data from the reference block shifted by one pixel amount.

The adding circuit 324 subtracts the pixel data read out from the reference block read out from the reference frame memory 323 from the pixel data located within the target block read out from the present frame memory 321. The subtracted result is supplied to the absolute value circuit 325, in which it is changed to absolute value data and supplied through the adding circuit 326 to the latch circuit 327. The latch circuit 327 sequentially latches an added result, i.e., absolute value sum data from the adding circuit 326, whereby the target block within the present frame memory 321 and the differential absolute value sum data of one reference block within the reference frame memory 323 are sequentially stored in the memory 328. Then, finally, differential absolute value sum data of the number corresponding to a large number of reference blocks sequentially shifted within the search area by one pixel amount are stored in the memory 328.

After the calculation of pixel data of one target macroblock and pixel data of a plurality of reference macroblocks within one search area is completely finished, the minimum value detecting circuit 329 selects the minimum absolute value sum data from all differential absolute value sum data within the memory 328, supplies the differential absolute value sum data, address data of the reference macroblock in which the differential absolute value sum data could be obtained, and address data of the target macroblock to the motion vector detecting circuit 330 and supplies a control signal for starting the processing on the next target macroblock to the controller 332.

The differential absolute value sum data from the minimum value detecting circuit 329 is supplied to the motion vector detecting circuit 330. The motion vector detecting circuit 330 obtains motion vector data based on the differential absolute value sum data from the minimum value detecting circuit 329, the address data of the reference block in which the differential absolute value sum data could be obtained and address data of the target macroblock. The motion vector data from the motion vector detecting circuit 330 is supplied through the output terminal 331 to the motion compensating circuits 220, 222 and the system controller 226 shown in FIG. 43. After the controller 332 sets the search area by the similar procedure, the controller 332 controls the address generating circuit 333 and the present frame memory 321 in order to calculate pixel data of the next target macroblock and pixel data within the reference block.

In this case, when the frame image data of the past frame stored in the frame memory 201 and the frame image data of the present frame stored in the frame memory 202 are motion-detected, the frame image data stored in the frame memory 201 is set to frame image data of reference frame, and frame image data stored in the frame memory 202 is set to the frame image data of present frame. When the frame image data of present frame stored in the frame memory 202 and the frame image data of future frame stored in the frame memory 203 are motion-detected, the frame image data stored in the frame memory 202 is set to the frame image data of reference frame, and the frame image data stored in the frame memory 203 is set to the frame image data of present frame.

Therefore, when frame image data of nth frame and frame image data of n−1th frame are motion-detected, the present frame memory 321 shown in FIG. 9 corresponds to the frame memory 202 of the motion encoder shown in FIG. 43, and the reference frame memory 323 shown in FIG. 9 corresponds to the frame memory of the motion encoder shown in FIG. 43. Then, when the frame image data of nth frame and frame image data of n+1th frame are motion-detected, the present frame memory 321 shown in FIG. 9 corresponds to the frame memory of the motion encoder shown in FIG. 41 and the reference frame memory 323 shown in FIG. 9 corresponds to the frame memory 202 of the motion encoder shown in FIG. 43.

In the controller shown in FIG. 9, a bus 3 comprising address bus, data bus and control bus is connected to a CPU (central processing unit). A ROM (read-only memory) with program data PRG, various parameter data PAL and table data TBL for executing program, a working RAM (random-access memory) for the program data PRG and holding the table data TBL and an I/O port 6 are connected to the bus 33.

The table data is the residual processing data table TBL1, comprises target macroblock number data and start address data of target macroblock, and stored in the rAM 5 when stored in the ROM 4. When the motion detection processing is started, start address data of the target macroblock within the revere areas and motion vector data are sequentially registered in the above table data.

The parameter data are reference data used when the number of target macroblocks in one frame memory, for example, etc., are judged. When the motion detecting circuit is turned on, the parameter data are read out from the ROM 4 and stored in the predetermined area of the RAM 5. The parameter data PAL are as follows:

Parameter data PAL:

1. Horizontal address initial value data of frame memory . . . ADH (f)
2. Vertical address initial value data of frame memory . . . ADV (f)
3. Maximum value data of the number of target macroblocks . . . M (f) max
4. Maximum value data of target macroblock number . . . MNOmax
5. Maximum value data of horizontal direction . . . Hmax
6. Maximum value data of vertical direction . . . Vmax
7. Size of height or width of macroblock . . . "116"
8. Maximum value data of reference macroblock number . . . SMNOmax
9. The number of all nominated motion vector data . . . Pmax
10. Maximum value data of telescopic macroblock number . . . TMNOmax 11. Distance of horizontal direction based on pixels from left and right borders of macroblock to the border of telescopic search area . . . Tx
12. Distance of vertical direction based on pixel from upper and lower borders of macroblock to the border of telescopic search area . . . Ty
13. Memory pointer indicative of access area of RAM . . . MP (used only in the second embodiment)

When the motion detecting circuit shown in FIG. 9 is turned on, the parameter data PAL stored in the ROM 4 are read out from a ROM control means 9, which will be described later on, and stored in the RAM 5 at its predetermined areas on the storage space under control of a RAM control means 8.

When this motion detecting circuit shown in FIG. 9 is energized, the program data PRG stored in the ROM 4 is read out under control of a ROM control means 9, which will be described later on, and supplied to a main memory of the CPU 2, wherein it becomes resident. Thus, the CPU 2 is given many function shown by a broken line block in FIG. 9. These functions will be descried below.

A timing control means 7 generates various timing signals for determining processing timing based on a reference clock signal supplied thereto from a crystal oscillator, not shown, and supplies these timing signals through the I/O port 6 to an address generating circuit 333, adding circuits 324, 2326, absolute value circuit 325, a latch circuit 327, a minimum value detecting circuit 329 and a motion vector detecting circuit 330 to adjust timings of respective portions. The timing signal generated by this timing control means 7 are served to function as a timer for adjusting the processing timings in other functions.

The RAM control means 8 has a function to supply a write/read control signal to the RAM 5 shown in FIG. 9. The ROM control means 9 has a function to supply a write/read control signal to the ROM 4 shown in FIG. 9. The memory control means 10 has a function to supply a write/read control signal to the memory 328 shown in FIG. 9.

The address generating control means has a function to supply start address data of reference macroblock or telescopic macroblock. Incidentally, "telescopic macroblock" is the same as "reference macroblock" but they are referred to by different reference names for convenience sake of explanation.

A table control means 12 controls the RAM control means 8 such that data are registered on various tables read out from the ROM 4 shown in FIG. 9 and stored in the RAM 5 or that data registered on various tables are read out. Also, the table control means 12 has a function to search data registered on various table TBL.

An address calculating means 13 has a function to calculate search area SA in the present frame memory 321 and the reference frame memory 323 shown in FIG. 9, telescopic search area TSA, which will be described later on, address of reverse area and start address of macroblocks contained in these areas.

A vector calculating means 14 has a function to calculate motion vector data which result from effecting motion-detection in a large number of macroblocks provided within the search area SA and a large number of telescopic macroblocks provided within the telescopic search area TSA and vector data of the same magnitude as that of the resultant motion vector data obtained by the motion vector data but with the opposite direction.

An area setting means 15 has a function to set the search area SA and a telescopic search area TSA, which will be described later on, on the storage spaces of the present frame memory 321 and the reference frame memory 323 based on resultant motion vector data obtained by motion-detection. Specifically, the area setting means 15 calculates addresses on the storage spaces of the present frame memory 321 and the reference frame memory 323 of these areas.

The vector selecting means 16 has a function to select optimum motion vector data from motion vector data registered on all target macroblocks registered on the reverse area target macroblock number data in which the same number data as the target macroblock number data of the target macroblocks to be processed are registered, i.e., nominated motion vector data by some methods, which will be described later on.

A judging means 17 has a function to judge values and end of processing in various processings executed by the respective means.

A scene judging means 18 has a function to judge whether or not input frame image data has a scene change. That is, the scene judging means 18 constantly monitors sum of residuals of all macroblocks of P picture, for example, and determines that a scene change occurred between two P pictures when the sum of residuals of present P picture becomes more than twice the sum of the residuals of preceding P picture. When a scene change occurs, preceding and succeeding frames have not correlation therebetween, and hence a picture quality of image of P picture after the scene change occurred to which reference is made with respect to the frame provided before the scene change is deteriorated, i.e., the sum of residuals is increased.

When the motion detecting circuit shown in FIG. 9 is turned on, the program data PRG is read out from the ROM 4, and the program data PRG read out from the ROM 4 becomes resident on the main memory of the CPU 2, whereby the CPU 2 functions, as shown by a broken line block in FIG. 9, a timing control means 7, a RAM control means 8, a ROM control means 9, a memory control means 10, an address generating control means 11, a table control means 12, an address calculating means 13, a vector calculating means 14, an area setting means 15, a vector selecting means 16, a judging means 17 and a scene change judging means 18.

When a motion detection is started, the area setting means 15 sets the search area SA on the storage space of the reference frame memory 323, and pixel data of target macroblock of the present frame memory 321 and each pixel data of the reference macroblock provided within the search area SA are motion-detected. In the initial motion detection processing, each pixel data of all target macroblocks of the present frame memory 321 and each pixel data of all reference macroblocks provided within the search area SA set in the reference frame memory 323 in response to all target macroblocks are processed in full search block matching.

By this block matching, there are obtained a number of differential absolute value sum data of one target macroblock and all reference macroblocks provided within the search area SA. These differential absolute value sum data are stored in the memory 328 under control of the controller 1. After the motion detection processing with respect to one target macroblock has been ended, a number of differential absolute value sum data obtained with respect to one target macroblock are read out from the memory 328.

A large number of differential absolute value sum data read out from the memory 328 are supplied to a minimum value detecting circuit 329. The minimum value detecting circuit 329 selects differential absolute value sum of minimum value from a number of differential absolute value sum data, and supplied to the motion vector detecting circuit 330. The motion vector detecting circuit 330 obtains motion vector data based on the address of the reference macroblock in which the supplied differential absolute value sum data could be obtained and the address data of the target macroblock. This motion vector data is supplied through an output terminal 331 to a motion compensating circuit (not shown), in which it is used in motion compensation. This motion vector data is also supplied through the I/O port 6 and the bus 3 to the RAM 5, in which it is registered on the table TBL stored in the storage space of the RAM 5 in response to the write/read control signal supplied from the RAM control means 8 under control of the table control means 12.

In this manner, motion vector data with respect to all target macroblocks provided within the present frame memory 321 are each obtained. Incidentally, the full search block matching processing using the wide search area SA is executed only when the first motion detection is carried out immediately after the motion detecting circuit is turned on and when a motion detection is carried out between two frame image data which are not relating to each other. "When a motion detection is carried out between two frame image data which are not relating to each other" corresponds to a motion detection executed when a scene change occurs. In the case of scene change, a correlation between the frame image data provided immediately before the scene change and the frame image data provided after the scene change is low. So long as the scene change does not occur, in the motion detection following the second one, the telescopic search area TSA with a relatively narrow area is set on the storage space of the reference frame memory 323, whereby pixel data of the target macroblock of the present frame memory 321 and pixel data provided within all reference macroblocks provided within the telescopic search area TSA set on the storage space of the reference frame memory 323 are motion-detected. However, according to this embodiment, as earlier noted, when the telescopic search area TSA is set on the storage space of the frame memory, special processing is carried out in order to increase motion detection speed and detection accuracy.

An object of this explanation of this operation is to facilitate the understanding of overall operation of the arrangement of FIG. 9, and hence a specific explanation of operation mainly concerning the functions of the CPU 2 and the above-mentioned special processing will be described later on.

Subsequently, the frame image data stored in the present frame memory 321 is supplied to the reference frame memory 323 and stored in the reference frame memory 323. Frame image data of the next frame is supplied through the input terminal 310 to the present frame memory 321 and stored in this present frame memory 321.

According to the above special processing, the telescopic search area TSA is set on the storage space of the reference frame memory 323. Then, pixel data located within the target macroblock of frame image data stored in the present frame memory 321 and pixel data located within the telescopic macroblock within the telescopic search area TSA set on the storage space of the reference frame memory 323 are motion-detected.

A number of differential absolute value sum data obtained by the motion detection is supplied to the minimum value detection circuit 329 similarly as described above, and the minimum value detecting circuit 329 selects the minimum differential absolute value sum data. The selected minimum differential absolute value sum data is supplied to a motion vector detecting circuit 330. The motion vector detecting circuit 330 obtains motion vector data based on the address of reference macroblocks in which the inputted minimum differential absolute value sum could be obtained and address of target macroblock. This motion vector data is supplied through an output terminal 331 to a motion compensating circuit, not shown, as motion-compensating data and also supplied through the I/O port 6 and the bus line 3 to the RAM 5, whereafter it is registered on the table TBL stored on the storage space of the RAM 5 in response to the write/read control signal supplied from the RAM control means 8 under control of the table control means 12.

In this manner, finally, motion vector data can be obtained with respect to all target macroblocks located within the present frame memory 321.

The table data TBL shown in FIG. 9 will be described with reference to FIGS. 10A to 10D.

FIGS. 10A to 10D are explanatory diagrams showing an example of the table data TBL shown in FIG. 9. In this embodiment, there are used at least three table of residual processing data table TBL1, reference macroblock table TBL2 and telescopic macroblock table TBL3. The residual processing data table TBL1 is the residual processing data table TBL1 which was already described in the embodiment. The reference macroblock table is a table comprising reference macroblock numbers of all reference macroblocks located within the search area SA set on the storage space of the reference frame memory 323 and start address data of the reference macroblocks.

The telescopic macroblock table TBL3 is a table comprising telescopic macroblock numbers MNO of all telescopic macroblocks located within the telescopic search area TSA set on the storage space of the reference frame memory 233 and start address TDA (x, y) of the telescopic macroblocks. For brevity, only the telescopic macroblock table TBL is illustrated in FIG. 26, and only the residual processing data table TBL1 and the reference macroblock table TBL2 will be described with reference to FIGS. 10A to 10D.

Figure 10:
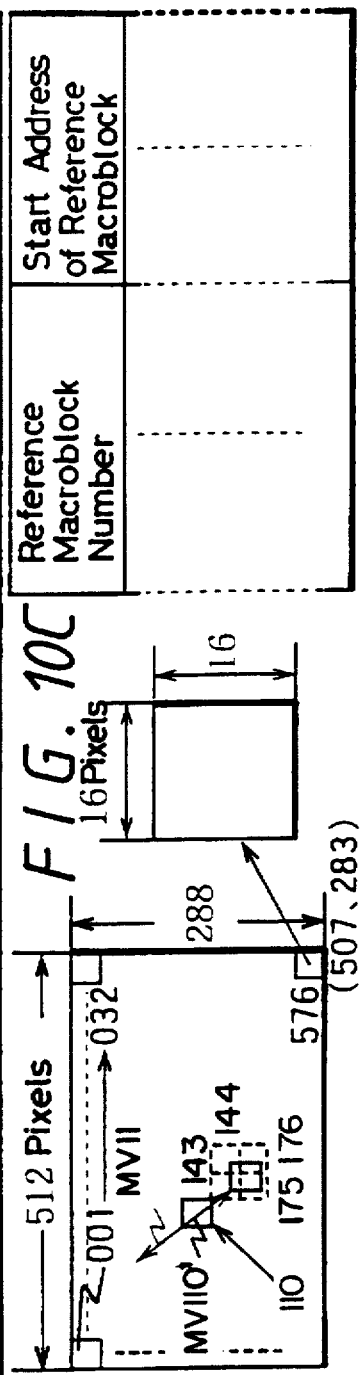

FIG. 10A shows an example of the residual processing data table. FIG. 10B shows a structure of frame used to explain a manner in which residual processing data registered on the residual processing data table are obtained. FIG. 10C shows a size of one macroblock, and FIG. 10D shows the reference macroblock table. The residual processing data table will be described initially.

As shown in FIG. 10A, the residual processing data table comprises target macroblock number data MNO, start address data AD (x, y) of target macroblock indicated by the values of the target macroblock number data MNO, target macroblock number data MNO surrounding the target macroblocks of the target macroblocks, reverse area target macroblock number data MNO of reverse area obtained with respect to the target macroblocks and motion vector data MV (x, y) calculated with respect to the target macroblock.

The target macroblock number data MNO of the target macroblocks surrounding the target macroblocks become target macroblock number data MNO of target macroblocks located at upper left, right over, upper right, left, lower left, just under and lower right of the target macroblock. Incidentally, if the value is "0", then this means that the corresponding target macroblock does not exist within the frame image data. Since the target macroblock corresponding to the target macroblock number data MNO of the value "0" is located at the upper leftmost position located with the frame image data, no target macroblock data exist on the upper left, right over, upper right, left and lower left of the target macroblock. Accordingly, as is clear from the column of the corresponding surrounding target macroblock number, the values become "0" (upper left), "0" (right over), "0" (upper right), "0" (left), "002" (right), "0" (lower left), "033" (just under), and "034" (lower right).

A manner in which the residual processing data is obtained when the respective target macroblocks of frame image data of the size shown in FIG. 10B is motion-detected will be described below.

The frame image data shown in FIG. 10B comprises 512 pixels in the horizontal direction and 288 pixels the longitudinal direction. The macroblock located within this frame image data comprises 16 pixels both in the horizontal and vertical directions. Numerical values "001", "032", "110", and "576" in the inside of the frame image data shown in FIG. 10B are all target macroblock MNO. The target macroblock number data MNO become numbers sequentially incremented in the horizontal direction as shown by a solid-line arrow. Although numerical values other than "001", "032", "110" and "576" are not illustrated, if this frame image data is equally divided by the target macroblock data of 16 pixels and 16 pixels and the divided target macroblocks are represented by the target macroblock number data MNO, then target macroblock number data MNO used range from "001" to "576".

Numerical values parenthesized in the outside of the frame image data in FIG. 10B are start address data of respective target macroblocks on the storage spaces of the present frame memory 321 and the reference frame memory 323 in which the above frame image data are stored.

A process in which residual processing data are registered on the residual processing data table TBL1 shown in FIG. 10A in the case of such frame image data, by way of example, will be described.

The residual processing data table data stored in the ROM 4 shown in FIG. 9 as editor is stored in the RAM 5. At that time, as earlier noted, the target macroblock number data MNO, start address data AD (x, y) of the target macroblocks shown by the target macroblock number data MNO and the target macroblock number data MNO of the macroblocks surrounding the target macroblocks were already registered at the time they are stored in the ROM 4. On the RAM 4, there are stored the reverse area target macroblock number data MNO of the reverse area and the motion vector data MVn (x, y) in response to the target macroblocks indicated by the target macroblock number data MNO.

A manner in which the reverse area target macroblock number data MNO of reverse area corresponding to the target macroblock with the target macroblock number data MNO "110" is registered will be described, by way of example.

Start address data AD (x, y) of the target macroblock with the target macroblock number data MNO "110" are "(208, 48) as shown in FIG. 10A, which corresponds to start address data (208, 48) of the RAM of the frame image data shown in FIG. 10B. Motion vector data MV110 (see FIG. 10B) which results from motion-detecting the target macroblock with the target macroblock number data MNO of "110" and a number of reference macroblocks located within the search area SA set on the frame image data of preceding frame is motion vector data MV110 (−18, 20) shown in FIG. 10A. The reverse area target macroblock number data MNO of the reverse area target macroblock of the reverse area including the block located at the position shown by motion vector data MV110' (see FIG. 10B) of the same magnitude as but with the opposite direction to that of the motion vector data MV110 become "143", "144", "175" and "176" as shown in FIG. 10A. These four reverse area target macroblock number data MNO are illustrated by way of example. In this manner, data are written in the storage areas of the reverse area target macroblock number data and the storage areas of the motion vector data MV (x, y) within the residual processing data table TBL1.

A manner in which the residual processing data table TBL1 is used will be described one more time.

By the initial full search block matching processing, as shown in FIG. 10A, residual processing data of all target macroblocks of frame image data are registered on the residual processing data table TB1. Then, when a picture is updated, the telescopic search area TSA for effecting the telescopic search by the target macroblock of new frame image data and the frame image data of preceding frame is set. A manner in which the telescopic search is effected on the target macroblock with the target macroblock number data MNO of "110" will be described by way of example.

In the case of the target macroblock with the target macroblock number data MNO of "110", reference is made on the storage area of the reverse area target macroblock number data MNO of the reverse area corresponding to the all target macroblock number data MNO of the residual processing data table TBL1 shown in FIG. 10A. In this example, the target macroblock number data MNO in which "110" is stored in the storage area of the reverse area target macroblock number data MNO of the reverse area is "075" and "076" (assumed to be "075" and "076").

As shown in FIG. 10A, the reverse area target macroblock number data of reverse area in which the target macroblock number data MNO is registered on the target macroblock of "075" is "109", "110", "141", "142", and the reverse area target macroblock number data of reverse area in which the target macroblock number data MNO is registered on the target macroblock of "076" is "110", "111", "142", "143".

Specifically, for these two target macroblocks, "110" which is the same value as the target macroblock number data MNO of the target macroblock to be processed is registered as the reverse target macroblock number data of the reverse area. Therefore, motion vector data MV75 (x, y) and MV76 (x, y) in which the these target macroblock number data MNO are registered on the target macroblocks of "075" and "076" are respectively read out as nominated motion vector data.

One of the motion vector data MV75 (x, y) and MV76 (x, y) of the target macroblocks indicated by the thus read two target macroblock number data MNO is selected.

Based on the position of start address data AD (x, y) of the target macroblock in which the value of the target macroblock number data MNO is "110", the position shown by the value of the selected motion vector data MV75 (x, y) or MV76 (x, y) is searched on the frame image data which is the reference frame. Then, the very small telescopic search area TSA including the reference macroblock data of that position is set on the frame image data which is the reference frame.

The target macroblock data with the above value of "110" and all reference macroblocks located within the telescopic search area TSA set on the frame image data set to the reference frame are motion-detected, and hence there is obtained one motion vector data MV (x, y). This motion vector data MV (x, y) is used in motion compensation, and the reverse area is again obtained by the reverse motion vector data of the same magnitude as that of the motion vector data MV (x, y) to thereby obtain start address data Ad (x, y) of all target macroblocks within this reverse area.

These start address data AD (x, y) are stored in the storage areas of the target macroblock number data MNO located within the reverse area corresponding to the target macroblock number data MNO of the target macroblock to be motion-detected. The motion vector data MV (x, y) obtained in the motion detection also is stored in the storage area of the motion vector data MV (x, y) corresponding to the target macroblock number data MNO of the target macroblock to be motion-detected.

As shown in FIG. 10D, the reference macroblock table TBL2 comprises reference macroblock number data SMNO and start address data ad (x, y) of the reference macroblock, and is a table used to control address of the address generating circuit 333 when differential absolute value sum is calculated. Incidentally, the reference macroblock data SMNO was already stored in the reference macroblock table TBL2 at the time the reference macroblock table TBL2 is stored in the ROM 4 as editor. The reason for this is that the number of reference macroblocks located within the search area SA is known beforehand.

This reference macroblock table TBL2 is stored in the ROM 4 shown in FIG. 9 as an editor, and read out from the ROM 4 and stored in the RAM 5 when the motion detecting circuit is turned on. The reference macroblock number data SMNO given within the search area SA set on the frame image data which is set to the reference frame is stored in the storage area of the reference macroblock number data SMNO of the reference macroblock table TBL2 stored in the RAM 5. Start address data ad (x, y) of the reference macroblock shown by the value of the reference macroblock number data SMNO is stored in the storage area of the start address data ad (x, y) of the reference macroblock. The search area is changed each time the target macroblock to be processed is changed so that the content of the reference macroblock table TBL2 is changed each time.

A control operation of the main routine of the motion detecting circuit shown in FIG. 9 will be described with reference to FIG. 11.

FIG. 11 is a flowchart used to explain operation of the main routine in the motion detecting circuit shown in FIG. 9.

As shown in FIG. 11, the CPU 2 shown in FIG. 9 executes a processing based on a present and reference frame data set processing routine. Then, the processing proceeds to a step S99. This processing is effected when the memory control circuit 10 shown in FIG. 9 supplies the write/read control signal to the present frame memory 321 and the address generating control circuit 11 supplies start address data of reference macroblock to the reference frame memory 323.

In this processing, frame image data is updated. Specifically, the next frame image data is stored in the present frame memory 321 under control of the memory control means 10. In the reference frame memory 323, there is stored frame image data of one frame preceding the frame image data of the next frame stored in the present frame memory 321, i.e. frame image data of the same content as that of the frame image data stored in the present frame memory 321 before being updated. Control of writing data in the reference frame memory 323 is carried out as follows. Specifically, when start address data of reference macroblock is loaded onto the address generating circuit 333 from the address generating control means 11, the address generating circuit 333 sequentially increments the start address data in the x and y directions to sequentially generate address data indicative of pixel data within the reference macroblock, and supplies address data to the reference frame memory 323.

In step S99, the judging means 17 shown in FIG. 9 supplies the target macroblock number data M (f) of value "1" to the RAM 5. The target macroblock number data M (f) of value "1" is stored in the storage area of the target macroblock number data M (f) on the storage space of the RAM 5 in response to the write/read control signal from the RAM control means 8. Then, the processing proceeds to a step S100. The "f" in "M (f)" represents "present frame".

In the step S100, the CPU 2 executes the full search block matching processing routine. Then, the processing goes to step 150. The full search block matching processing is executed by this full search block matching processing routine when the first motion detection is carried out or the scene change occurs.

In the step S150, the CPU 2 executes the residual processing data generating processing routine. Then, control proceeds to a step S198. In this residual processing data generating processing routine, motion vector data obtained with respect to all macroblocks located within the present frame memory 321, obtained in the full search block matching in the step S100 and start address data of target macroblocks within the reverse area obtained based on these motion vector data are stored in the residual processing data table TBL1.

In the step S198, the target macroblock number data M (f) and target macroblock number data M (f)max within one frame are read out from the RAM 5 under control of the RAM control means 8 shown in FIG. 9. Then, the judging means 17 determines whether or not the target macroblock number data M (f) is larger than the target macroblock number data M (f)max within one frame. If "YES" is outputted, then the processing proceeds to a step S200. If "NO" is outputted, then the processing proceeds to a step S199.

In step S199, the judging means 17 adds "1" to the target macroblock number data M (f) and supplies an added result to the RAM 5. The target macroblock number data M (f) supplied to the RAM 5 is again stored in the RAM 5 at its original position on the storage space in response to the write/read control signal from the RAM control means 8. Then, the processing proceeds to step S100.

In a step S200, the CPU 2 executes the processing of the present and reference frame data set processing routine. Then, the processing proceeds to a step S201. This processing is effected when the memory control circuit 10 supplies the write/read control signal to the present frame memory 321 and the address generating control circuit 11 supplies start address data of telescopic macroblock to the reference frame memory 323.

The contents of the processing are similar to those of the present and reference frame data set routine and this processing is different only in the size of area of the target macroblock. In this embodiment, the large search area is simply referred to as "search area SA", the small area set by the special processing is referred to as "telescopic search area TSA", the macroblock located within the search area SA is referred to as "reference macroblock", and the macroblock located within the telescopic search area TSA is referred to as "telescopic macroblock".

In a step S300, the CPU 2 executes the processing of the residual processing routine, i.e., the telescopic search processing mentioned before. Then, the processing proceeds to a step S599.

In the step S599, the target macroblock number data MNO and maximum value data MNOmax of target macroblock number are read out from the RAM 5 under control of the RAM control means 8. Then, the judging means 17 judges whether or not the target macroblock number data MNO is larger than the maximum value data MNOmax of the target macroblock number. If "YES" is outputted, then the processing proceeds to a step S600. If "NO" is outputted, then the processing proceeds to a step S601.

In the step S601, the judging means 17 adds "1" to the target macroblock number data MNO, and supplies new target macroblock number MNO to the RAM 5. The target macroblock number data MNO supplied to the RAM 5 is stored again in the RAM 5 at its original position on the storage space in response to the write/read control signal from the RAM control means 8. Then, the processing goes back to the step S300.

In the step S600, the scene change judging means 18 determines whether or not the scene change occurred. If "YES" is outputted, then the processing proceeds to a step S602. If on the other hand "NO" is outputted, then the processing goes back to the step S50.

In the step S602, the judging means 17 determines whether or not the processing is ended. If "YES" is outputted, then the processing is ended. If "NO" is outputted, then the processing goes back to the step S200.

A control operation based on the present and reference frame data set processing routine shown in FIG. 11A will be described with reference to FIGS. 12 and 13.

FIGS. 12 and 13 are flowcharts used to explain the control operation based on the present and reference frame data set processing routine of the steps S50 and S200 in the flowchart of the main routine shown in FIG. 11.

In a step S51, the RAM control means 8 reads horizontal and vertical address data ADH (f) and ADV (f) which are start addresses of the present frame memory 321 or the reference frame memory 323 from the RAM 5. Then, the processing proceeds to a step S52.

In the step S52, the RAM control means 8 supplies a write/read control signal including address data indicative of the holding position of the horizontal address data on the storage space of the RAM 5 to the RAM 5, whereby the content of the horizontal address data HAD on the storage space of the RAM 5 becomes the horizontal address data ADH (f) read out from the RAM 5. Then, the processing proceeds to a step S53.

In the step S531 the RAM control means 8 supplies a write/read control signal including address data indicative of the holding position of the vertical address data VAD on the storage space of the RAM 5, whereby the content of the vertical address data VAD on the storage space of the RAM 5 becomes the vertical address data ADV (f) read out from the RAM 5. Then, the processing proceeds to a step S54.

In the step S54, under control of the address generating control means 11, the RAM control means 8 supplies the horizontal and vertical address data HAD, VAD and a control signal including information indicative of renewal of whole data to the RAM 5. The horizontal and vertical address data HAD, VAD read out from the RAM 5 and the control signal including information indicative of updating all data outputted from the address generating control means 11 are supplied through the bus line 3 and the I/O port 6 to the address generating circuit 333. The address generating circuit 333 sequentially increments horizontal and vertical address data in the control signal from the controller 1 to increment the horizontal and vertical address data, and supplies the horizontal and vertical address data to the reference frame memory 323. As described above, since the control signal including the information indicative of renewal of all data is supplied to the address generating circuit 333, the address generating circuit 333 increments the horizontal and vertical address data from the loaded start horizontal and vertical address data and sequentially addresses the whole storage space of the reference frame memory 333.

In a step S55, the memory control means 10 supplies a read enable signal through the I/O port 6 to the present frame memory 321. Then, the processing proceeds to a step S56.

In the step S56, the memory control means 10 supplies the horizontal and vertical address data HAD and VAD through the I/O port 6 to the present frame memory 321. Then, the processing proceeds to a step S56. According to the above-mentioned processing, pixel data read out from the present frame memory 321 is supplied to the reference frame memory 323 and stored in the reference frame memory 323.

In a step S57, the memory control means 10 adds "1" to the horizontal address data HAD. Then, the processing proceeds to a step S58.

In the step S58, the RAM control means 8 reads out the horizontal direction maximum value data Hmax from the RAM 5. The thus read horizontal direction maximum value data Hmax is supplied to the judging means 17. The judging means 17 judges whether or not the horizontal address data HAD is larger than the horizontal direction maximum value data Hmax. If "YES" is outputted, then the processing proceeds to a step S59. If "NO" is outputted, then the processing goes back to the step S56.

In step S59, the memory control means 10 adds "1" to the vertical address data VAD. Then, the processing proceeds to a step S60.

In the step S60, the RAM control means 8 reads out the vertical direction maximum value data Vmax from the RAM 5. The thus read vertical direction maximum value data Vmax is supplied to the judging means 17. The judging means 17 judges whether or not the vertical address data VAD is larger than the vertical direction maximum value data Vmax. If "YES" is outputted, then the processing proceeds to a step S61 in a flowchart shown in FIG. 13. If "NO" is outputted, the processing goes back to the step S56.

In the step S59, the memory control means 10 adds "1" to the vertical address data VAD. Then, the processing proceeds to a step S60.

In the step S60, the RAM control means 8 reads out the vertical direction maximum value data Vmax from the RAM 5. The thus read vertical direction maximum value data Vmax is supplied to the judging means 17. The judging means 17 judges whether or not the vertical address data VAD is larger than the vertical direction maximum value data Vmax. If "YES" is outputted, then the processing proceeds to a step S61 in the flowchart of FIG. 13. If "NO" is outputted, the processing goes back to the step S56.

In the step S61, the RAM control means 8 reads out horizontal and vertical address data ADH (f) and ADV (f), which are start address of the present frame memory 321 or the reference frame memory 323 from the RAM 5. Then, the memory control means 10 supplies the horizontal and vertical address data ADH (f) and ADV (f) to the RAM 5. Then, the processing proceeds to a step S62.

In the step S62, the RAM control means 8 supplies a write/read control signal including address data indicative of the holding position of the horizontal address data HAD on the storage space of the RAM 5, whereby the content of the horizontal address data on the storage space of the RAM 5 becomes the horizontal address data ADH (f) read out from the RAM 5. Then, the processing proceeds to a step S63.

In the step S63, the RAM control means 8 supplies a write/read control signal including address data indicative of the holding position of the vertical address data VAD on the storage space of the RAM 5 to the RAM 5, whereby the content of the vertical address data VAD on the storage space of the RAM 5 becomes the vertical address data ADV (f) read out from the RAM 5. Then, the processing proceeds to a step S64.

In the step S64, the memory control means 10 supplies the write enable signal through the I/O port 6 to the present frame memory 321. Then, the processing proceeds to a step S65.

In the step S65, the memory control means 10 supplies the horizontal and vertical address data HAD and VAD through the I/O port 6 to the present frame memory 321. Then, the processing proceeds to a step S66. The frame image data of the next frame supplied to the present frame memory 321 through the input terminal 310 by the above-mentioned processing is stored in the present frame memory 321.

In a step S66, the memory control means 10 adds "1" to the horizontal address data HAD. Then, the processing proceeds to a step S67.

In the step S67, the RAM control means 8 reads out the horizontal maximum value data Hmax from the RAM 5. The thus read horizontal maximum value data Hmax is supplied to the judging means 17. The judging means 17 determines whether or not the horizontal address data HAD is larger than the horizonal direction maximum value data Hmax. If "YES" is outputted, then the processing proceeds to a step S68. If "NO" is outputted, then the processing goes back to the step S65.

In a step S68, the memory control means 10 adds "1" to the vertical address data VAD. Then, the processing proceeds to a step S69.

In the step S69, the RAM control means 8 reads out the vertical direction maximum value data Vmax from the RAM 5. The thus read vertical direction maximum value data Vmax is supplied to the judging means 17. The judging means 17 determines whether or not the vertical address data VAD is larger than the vertical direction maximum value data Vmax. If "YES" is outputted, then the processing ends this present frame and reference frame data set routine, and goes BACK to a step S99 in a flowchart of a main routine shown in FIG. 11.

A control operation based on the full search block matching processing routine shown in FIG. 11 will be described with reference to FIGS. 14 and 15.

FIGS. 14 and 15 are flowcharts used to explain the control operation based on the full search block matching processing routine of the step S100 in the flowchart of the main routine shown in FIG. 11.

In step S101, the judging means 17 supplies the reference macroblock number data SMNO of the value "1" to the RAM 5. The reference macroblock number data SMNO with the value "1" is stored in the storage area of the reference macroblock number data SMNO on the storage space of the RAM 5 in response to the write/read control signal from the RAM control means 8. Then, control goes to a step S102.

In the step S102, under control of the table control circuit 12, the RAM control means 8 read the target macroblock number data M (f) from the RAM 5, and also read the start horizontal and vertical address data AD (x, y) of target macroblock within the present frame memory 321 corresponding to the target macroblock number data MNO of the same value from the residual processing data table TBL1 stored in the RAM 5. The horizontal and vertical address data AD (x, y) read out from the residual processing data table TBL1 are supplied to the area setting means 15. Then, control proceeds to a step S103.

In the step S103, the area setting means 15 calculates the start horizontal and vertical address data SSAdH and SSAdV and ending horizontal and vertical address data SEAdH and SEAdV of the search area SA to be set on the storage space of the reference frame memory 323. The thus calculated start horizontal and vertical address data SSAdH and SSAdV and the ending horizontal and vertical address data SEAdH and SEAdV of the search area on the storage space of the reference frame memory 323 are supplied to the address calculating means 13 shown in FIG. 9. Then, the processing proceeds to step S104.

In the step S104, the address calculating means 13 calculates the start address data ad (x, y) of all reference macroblocks located within the search area SA based on the start horizontal and vertical address data SSAdH and SSAdV and the ending horizontal and vertical address data SEAdH and SEAdV of the search area SA on the storage space on the reference frame memory 323 supplied from the area setting means 15. The thus calculated start address data ad (x, y) of all reference macroblocks located within the search area SA are supplied to the RAM 5. The RAM control means 8 supplies address data indicative of the storage areas of the above reference macroblock table TBL2 to the RAM 5, whereby the start address data ad (x, y) of the reference macroblocks located within the search area SA are sequentially registered on the reference macroblock table TBL2 stored in the RAM 5. Then, control goes to a step S105.

In the step S105, the RAM control means 8 supplies the write/read control signal including address data indicative of the holding positions of the horizontal and vertical address data HAD and VAD on the storage space of the RAM 5 to the RAM 5, whereby the contents of the horizontal and vertical address data HAD and VAD on the storage space on the RAM 5 become the horizontal address data AD (x, y) read out from the RAM 5. Then, control proceeds to a step S106.

In the step S106, under control of the address generating control means 11, the RAM control means 8 reads out the start address data ad (x, y) of the reference macroblock corresponding to the reference macroblock number data SMNO from the reference macroblock table TBL2 of the RAM 5. Then, control goes to a step S107.

In the step S107, the memory control means 10 supplies the horizontal and vertical address data HAD and VAD through the I/O port 6 to the present frame memory 321. Then, control goes to a step S108.

In the step S108, under control of the memory control means 10, the RAM control means 8 reads out the start address data ad (x, y) of the reference macroblock from the reference macroblock table stored in the RAM 5. The thus read start address data ad (x, y) of the reference macroblock is supplied through the I/O port 6 to the address generating circuit 333.

The address generating circuit 333 generates sequentially horizontal and vertical address data from the thus loaded horizontal and vertical address data ad (x, y) and supplies the generated horizontal and vertical address data to the reference frame memory 323, whereby pixel data of reference macroblock are sequentially read out from the reference frame memory 323. The address generating circuit 333 generates horizontal and vertical address data as follows:

Specifically, the address generating circuit 333 increments the loaded horizontal address data by "1" each. When the incremented number reaches "15", the address generating circuit 333 returns the horizontal address data to the loaded horizontal address data and increments the vertical address data by "1". Each time the horizontal address data is incremented by "16" in the horizontal direction, the vertical address data also is incremented, and finally incremented by "15". According to the above-mentioned processing, the reference frame memory 323 can be addressed at the reference macroblock unit of 16 lines×16 pixels.

In a step S109, the memory control means 10 adds "1", to the horizontal address data HAD. Then, control goes to a step silo.

In the step S110, the judging circuit 17 determines whether or not the horizontal address data HAD is larger than "16". If "YES" is outputted, then the processing goes to a step S111. If "NO" is outputted, then control goes to a step S115.

In the step S111, the RAM control means 8 supplies the write/read control signal including the address data indicative of the holding position of the horizontal address data HAD on the storage space of the RAM 5 to the RAM 5, whereby the content of the horizontal address data HAD on the storage space of the RAM 5 becomes the horizontal address data ADx read out from the residual processing data table TBL1 of the RAM 5. Then, control goes to a step S112.

In the step S112, the memory control means 10 adds "1" to the vertical address data VAD. Then, control goes to a step S113.

In the step S113, the judging means 17 determines whether or not the vertical address data VAD is larger than "16". If "YES" is outputted, then control goes to a step S114. If "NO" is outputted, then control goes to a step S115.

In the step S114, the judging means 17 adds "1" to the reference macroblock number data SMNO read out from the RAM 5 by the RAM control means 8. The reference macroblock number data SMNO with "1" added thereto is supplied to the RAM 5 and again stored in the RAM 5 in response to the write/read control signal from the RAM control means 8. Then, the processing goes to a step S116.

In the step S115, the memory control means 10 supplies the horizontal and vertical address data HAD and VAD through the I/O port 6 to the present frame memory 321. Then, control goes back to the step S109.

In the step S116, under control of the judging means 17, the RAM control means 8 supplies the write/read control signal including address data indicative of storage areas of the reference macroblock number data SMNO and the maximum value data SMNOmax of the reference macroblock number to the RAM 5, whereby the reference macroblock number data SMNO and the maximum value data SMNOmax of the reference macroblock number are read out from the RAM 5. The judging means 17 determines whether or not the reference macroblock number data SMNO is larger than the maximum value data SMNOmax of the reference macroblock number. If "YES" is outputted, then this full search block matching processing routine is ended, and control goes to a residual processing data generating processing routine of a step S150 of a flowchart of the main routine shown in FIG. 11. If "NO" is outputted, then control goes back to the step S106 of the flowchart shown in FIG. 14.

As is clear from the above description, when the above processings are repeatedly executed, pixel data located within one reference macroblock of the search area SA of the reference frame memory 323 corresponding to the target macroblock are subtracted from pixel data located within one target macroblock by the adding circuit 324 shown in FIG. 9, the resultant subtracted output is converted into an absolute value by the absolute value circuit 325, differential data in the form of absolute value are accumulated by the adding circuit 326 and the latch circuit 327, and stored in the memory 328 as differential absolute value sum data. This processing is effected on one target macroblock and all reference macroblocks of the search area SA of the reference frame memory 321. Then, the minimum value detecting circuit 329 selects the differential absolute value sum data of minimum value from differential absolute value sum data corresponding to all reference macroblocks within the search area SA stored in the memory 328. The thus selected differential absolute value sum data is converted into motion vector data by the motion vector detecting circuit 330.

As is clear from the flowchart shown in FIG. 11, during the target macroblock number data is not larger than the maximum value data M (f)max of the target macroblock number in the step S198, "1" is added to the target macroblock number data M (f) as shown at the step S199, the full search block matching processing routine shown in FIGS. 14 and 15 goes back to the step S100, i.e., the full search block matching processing routine shown in FIGS. 14 and 15. In other words, all target macroblocks of the present frame memory 321 are motion-detected by full search block matching.

The content of RAM obtained when the reverse area pattern and the motion vector data are selected will be described with reference to FIG. 16.

Figure 16:
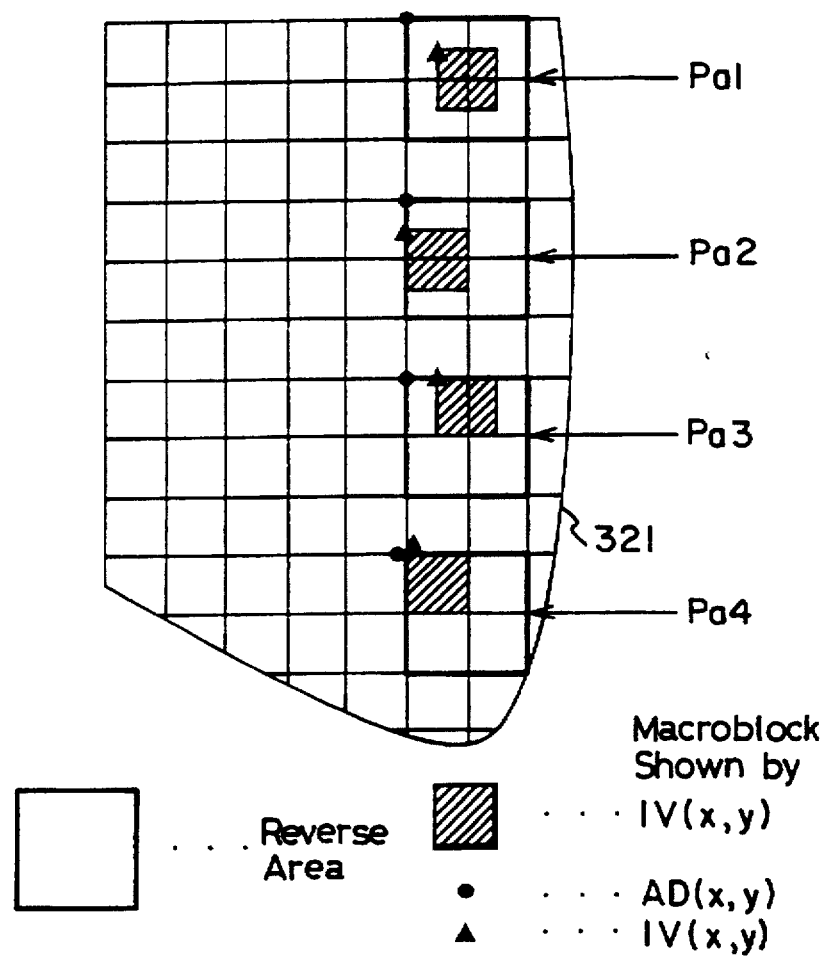

FIG. 16 is a diagram used to explain a layout pattern of the macroblock in the reverse area which was already described. This item will be described in order to facilitate the understanding of the control operation of the residual processing data generating processing routine described in the item M.

FIG. 16 shows a part of a storage space of the present frame memory. In FIG. 16, blocks shown by narrow solid-lines represent target blocks, and blocks shown by bold solid-lines represent reverse areas.

As earlier noted, if one motion vector data is obtained with respect to one target macroblock by the full block matching processing, motion vector data of the same magnitude but with the reverse direction is obtained and the target macroblock is moved by the amount shown by the value of the reverse motion vector data, then when the object is moving at an equal speed in the same direction, the position of the target macroblock in the next frame of the present frame can be predicted. As earlier described with reference to FIGS. 10A through 10D, after one motion vector data with respect to the processed target macroblock has been obtained by motion detection, the target macroblock number data of the four target macroblocks in the reverse area including the macroblock shown by the reverse motion vector data of this motion vector data has to be obtained.

The reason for this is that, when the target macroblock of the next new frame image data is processed, there is used motion vector data registered with respect to the target macroblock number data of the target macroblock in which the reverse area target macroblock number data of the same number of the target macroblock number data of the target macroblock.

Four macroblocks shown hatched in FIG. 16 represent the positions obtained by the reverse motion vector data. In this case, the macroblock supposed to locate at the position shown by the reverse motion vector data is hardly agreed with the reverse target macroblock which results from equally dividing the frame image data. The patterns thus generated are Pa1, Pa2, Pa3 and Pa4 as shown in FIG. 16.

The pattern Pa1 shows the case that the macroblocks predicted by the reverse motion vector data overlap all of the four reverse area target macroblocks. The pattern Pa2 shows the case that the macroblocks predicted by the reverse motion vector data overlap two upper and lower reverse area target macroblocks. The pattern Pa3 shows the case that the macroblocks predicted by the reverse motion vector data overlap two left and right reverse area target macroblocks. The pattern Pa4 shows the case that the macroblocks predicted by the reverse motion vector data overlap one reverse area target macroblock within the reverse area completely.

In this embodiment, the reverse area is set as follows. The pattern Pa1 comprises the four reverse area target macroblocks which overlap the macroblocks shown hatched. The pattern Pa2 comprises the two reverse area target macroblocks overlapping the macroblocks shown hatched and two reverse area target macroblocks adjoining the above two reverse area target macroblocks in the right-hand side.

The pattern Pa3 comprises the two reverse area target macroblocks overlapping the macroblocks shown hatched and the two reverse area target macroblocks adjoining the above two reverse area target macroblocks in the lower direction.

The pattern Pa4 comprises one reverse area target macroblock overlapping the macroblock shown hatched and the three reverse area target macroblocks adjoining the above one reverse area target macroblock in upper right, lower left and lower right directions.

The present invention is not limited to the above setting and the above setting may be changed arbitrarily. For example, the adjoining reverse area target macroblock may be set to the left-hand side with respect to the pattern Pa2, the adjoining revere area target macroblock may be set to the upper side with respect to the pattern Pa3, and the reverse area may be set with respect to the pattern Pa4 such that the macroblock shown hatched is located at a desired position within the reverse area.

After the reverse area has been set, start address data of the four reverse area target macroblocks located within the reverse area have to be obtained. To this end, revere area start address data AD (x, y) shown by solid circles on the left corners of the reverse areas of the respective patterns Pa1 to Pa4 have to be obtained. In order to obtain the reverse area start address data AD (x, y), start address data of the reverse area target macroblocks closest to the start address data IV (x, y) of the hatched macroblocks may be obtained based on start address data IV (x, y) of the macroblocks shown by solid triangle on the left corners of the hatched macroblocks of the respective patterns Pa1 to Pa4. Incidentally, in the pattern Pa4, the start address IV (x, y) of the hatched macroblock is the same as the start address on the left corner of the reverse area.

The reason for this is that the value of the address on the left corner of the reverse area is the same as that of the address on the left corner of the reverse area target macroblock on the upper left within the area If the address on the left corner of the reverse area is obtained, then the address on the left corner is the same as the start address o the reverse area target macroblock on the upper left within the reverse area. Therefore, it is sufficient to calculate start addresses of the reverse area target macroblocks on the upper right, lower left and lower right of the reveres area. The manner in which the start addresses of the reverse area target macroblocks within the reverse area are obtained will be described more fully in the item M.

As described above, the start address data of the four reverse area target macroblocks within the reverse area including the macroblocks shown by the motion vector data and the reverse motion vector data are obtained from the target macroblock obtained by full search block matching. Then, based on the start address data of the four reveres area target macroblocks, the reverse area target macroblock number data of the four reverse area target macroblocks can be obtained from the residual processing data table TBL1. These four reverse area target macroblock number data are registered on the residual processing data table TBL1 at its corresponding areas which correspond to the target macroblock number data of the target macroblocks to be processed.

The reverse area target macroblock number data of the four reverse area target macroblocks are used when target macroblocks of new frame image data of present frame which results from updating the frame image data are motion-detected. Specifically, when the target macroblock of the new frame image data is motion-detected, motion vector data registered with respect to the target macroblock number data of the target macroblock in which the reverse area target macroblock number data of the same value as that of the target macroblock number data of the target macroblock to be processed is used as an index for sequentially reading nominated motion vector data from the residual processing data table TBL1. Then, optimum motion vector data is selected from read nominated motion vector data, and the very small telescopic search area TSA including the reference macroblock located at the position shown by the motion vector data is set.

The above processing will be described one more time with reference to FIGS. 10A through 10D. As shown in FIG. 10A, in response to the target macroblock number data MNO from "001", to "576", there are registered start address AD (x, y) of target macroblocks from (0, 0) to (507, 203) corresponding to the target macroblock numbers, target macroblock number MNO of surrounding target macroblocks, four reverse area target macroblock number data MNO located within the reverse area, and motion vector data MV (x, y) from MV1 (x, y) to MV 576 (x, y) calculated with respect to the target macroblocks corresponding to the target macroblock number data MNO.

In order to select one motion vector data from nominated motion vector data for processing the target macroblock corresponding to the target macroblock number data MNO of "110", for example, the target macroblock number data MNO of "075" and "076" in which the reverse area target macroblock number data of the same value as the target macroblock number data of "110" is registered are respectively read out, and motion vector data MV75 (x, y) and MV76 (x, y) corresponding to the target macroblock number data MNO of "075", "076" are respectively read out from the residual processing data table TBL1 as nominated motion vector data. Then, it is determined which one of the two nominated motion vector data is optimum in order to set the telescopic search area TSA.

In short, the full search block matching is executed by use of the search area SA of ordinary width only when the motion detecting circuit is turned on or the scene change occurs. Thereafter, optimum motion vector data is selected from all nominated motion vector data registered with respect to the target macroblock number data of the target macroblocks in which the reverse area target macroblock number data of the same value as that of the target macroblock number data of one target macroblock is registered. Then, the full search block matching is executed by use of the very small telescopic search area TSA set by the selected optimum motion vector data.

A control operation based on the residual processing data generating processing routine shown in FIG. 11 will be described with reference to FIGS. 17 and 18.

FIGS. 17 and 18 are flowcharts used to explain the control operation based on the residual processing data generating processing routine of the step S150 in the flowchart of the main routine shown in FIG. 11. The residual processing data are data registered on the residual processing data table TBL1 shown in FIG. 10A, i.e., motion vector data obtained at each target macroblock and four reverse area target macroblock number data located within the revere area including the macroblocks obtained by the motion vector data with the same magnitude as but with the reverse direction to that of the motion vector data.

In a step S151, under control of the table control means 12, the RAM control means 8 reads out the target macroblock number data MNO from the RAM 5. The target macroblock number data MNO read out from the RAM 5 is supplied to the table control means 12. The table control means 12 obtains the target macroblock number data MNO based on the target macroblock number data MNO supplied thereto from the RAM 5, and holds the value of the target macroblock number data MNO as MNO1. Then, control goes to a step S151.

In a step S152, the table control means 12 supplies the target macroblock number data MNO to the RAM control means 8. The RAM control means 8 reads out motion vector data corresponding to the target macroblock number data MNO from the residual processing data table TBL1 of the RAM 5. The motion vector data read out from the RAM 5 is supplied to the vector calculating means 14. Then, control goes to a step S153.

At the step S153, the vector calculating means 14 shown in FIG. 9 calculates motion vector data of the same magnitude as but with the opposite direction to that of the motion vector data based on the motion vector data supplied thereto from the RAM 5, and supplies the calculated reverse motion vector data to the address calculating means 13. Then, control goes to a step S154.

The reverse direction motion vector data is calculated easily. When the thus read out motion vector data is "1" in the x direction and "−2" in the y direction, the reverse direction motion vector data is "−1" in the x direction and "2" in the y direction. That is, the polarity of the value in the x direction and the polarity of the value in the y direction are reversed.

In a step S154, the address calculating means 13 calculates the position shown by the reverse motion vector data supplied thereto from the vector calculating means 14, i.e., address IV (x, y) on the storage space of the present frame memory 321. Then, control goes to a step S155.

The address IV (x, y) is calculated easily. When address AD (x, y) corresponding to the target macroblock number data of the target macroblock that is processed at present is (20, 30), if the reverse motion vector data MV (x, y) is (−1, 2), for example, the above address IVx is the address advanced from the address ADx to the negative direction by one pixel, and hence becomes "19". Also, the address IVy is the address advanced from the address ADy in the positive direction by two pixels, and hence becomes "32".

This is expressed by the following equation (1):

$$IV(x, y) = \{IVx + (MVx), IVy + (MVy)\} \quad (1)$$

In a step S155, under control of the table control means 12, the RAM control means 8 reads out the start address data AD (x, y) of the target macroblock corresponding to the target macroblock number data MNO from the residual processing data table TBL1 of the RAM 5. The start address data AD (x, y) read out from the RAM 5 is supplied to the address calculating means 13.

In a step S156, the address calculating means 13 obtains a subtracted result Dx by subtracting the start address data AD (x, y) of the target macroblock supplied from the RAM 5 from the address IVx. This subtracted result Dx is supplied to the judging means 17. Then, control goes to a step S157.

In the step S157, the judging means 17 determines whether or not the subtracted result Dx is larger than "0" and less than "16". If "YES" is outputted, then control goes to a step S158. If "NO" is outputted, control goes to a step S160.

In the step S158, the address calculating means 13 obtains a subtracted result Dy by subtracting the address IVy from the start address data AD (x, y) of the target macroblock supplied from the RAM 5. This subtracted result Dy is supplied to the judging means 17. Then, control goes to a step S159.

In the step S159, the judging means 17 determines whether or not the subtracted result Dy is larger than "0" and smaller than "16". If "YES" is outputted, then control goes to a step S161 in a flowchart shown in FIG. 18. If "NO" is outputted, then control goes to a step S160.

In the step S160, the table control means 12 shown in FIG. 9 adds "1" to the target macroblock number data MNO. Then, control goes back to the step S155.

The processing in the steps S155 to S160 will be described below.

In the step S155, the start address data AD (x, y) of the target macroblock corresponding to the target macroblock number data MNO sequentially incremented at the step S160 is read out from the residual processing data table TBL1. In the step S156, a difference between the address IVx and address ADx in the x direction of the start address data AD ((x, y) is calculated. Further, in the step S157, it is determined whether the difference is greater than "0" and smaller than "16". In other words, it is determined whether the address data is the address data in the x direction of the target macroblock closest to the position shown by the address IVx.

In the step S157, if "OK" is outputted, i.e., if it is determined that the start address data ADx in the x direction is closest to the address IVx, then control goes to the step S158, whereat a difference between the address IVy and the address ADy in the y direction of the start address data AD (x, y) is calculated. Further, in the step S159, it is determined whether the difference is greater than "0" and smaller than "16". That is, it is determined whether the address data is the address data of the y direction closest to the position shown by the address IVy. According to the above-mentioned processing, there can be obtained the start address data AD (x, y) of the target macroblock closest to the address IV (x, y).

The above processing will be described one more time with reference to FIG. 16. As is clear from the four patterns Pa1 to Pa4 shown in FIG. 16, a minimum value of distance between the address IV (x, y) on the left corner of the hatched macroblock and the start address AD (x, y) on the left corner of the target macroblock closest to the address IV (x, y) is "0" in the x and y directions, and a maximum value of distance is "15" in the x and y directions. Accordingly, the start address data AD (x, y) of the target macroblock sequentially read out from the residual processing data table TBL1 and the address data IV (x, y) may be compared with each other. The reverse area is set by executing this processing.

In a step S161, the address calculating means 13 shown in FIG. 9 determines that the start address data AD (x, y) corresponding to the target macroblock number data MNO supplied at the step S155 is the start address data of the reverse area target macroblock on the upper left of the reverse area, and supplies the start address data AD (x, y) to the table control means 12 and the RAM 5. The RAM control means 8 supplies the write/read control signal to the RAM 5 under control of the address calculating means 13, whereby the start address data AD (x, y) of the reverse area target macroblock of the reverse area from the address calculating means 13 is stored in the predetermined area of the RAM 5 as address data AD1 (x, y). Then, control goes to a step S162.

In the step S162, under control of the table control means 12, the RAM control means 8 reads the target macroblock number data MNO and the start address data AD (x, y) of the target macroblock corresponding to the target macroblock number data MNO from the residual processing data table TBL1 of the RAM 5. These data are supplied to the table control means 12. The table control means 12 compares the address data AD1 (x, y) and the start address data AD (x, y) of the target macroblock. If they agree with each other, then the table control mean 12 holds the target macroblock number data MNO supplied at that time. Then, control goes to a step S163.

In the step S163, the address calculating means determines that the start address data AD (x, y+15) corresponding to the target macroblock number data MNO supplied at the step S155 is the start address data of the reverse area target macroblock on the lower left of the reverse area, and supplies the start address data AD (x, y+15) to the table control means 12 and the RAM 5. Under control of the address calculating means 13, the RAM control means 8 supplies the write/read control signal to the RAM 5, whereby the start address data AD (x, y+15) of the reverse area target macroblock of the reverse area from the address calculating means 13 is stored in the predetermined area of the RAM 5 as address data AD2 (xc, y+15). Then, control goes to a step S164.

In the step S164, under the control of the table control means 12, the RAM control means 8 reads out the target macroblock number data MNO and the start address data AD (x, y) of the target macroblock corresponding to the target macroblock number data MNO from the residual data table TBL1 of the RAM 5. These data are supplied to the table control means 12. The table control means 12 compares the address data AD2 (x, y+15) and the start address data AD (x, y) of the target macroblock. If they agree with each other, the table control means 12 holds the target macroblock number data MNO. Then, the processing goes to a step S165.

In the step S165, the address calculating means 13 determines that the start address data AD (x+15, y) corresponding to the target macroblock number data MNO supplied at the step S155 is the start address data of the reverse area target macroblock on the upper right of the reverse area, and supplies the start address data AD (x+15, y) to the table control means 12 and the RAM 5. Under control of the address calculating means 13, the RAM control means 8 supplies the write/read control signal to the RAM 5, whereby the start address data AD (x+15, y) of the reverse area target macroblock on the upper right of the reverse area from the address calculating means 13 is stored in the predetermined area of the RAM 5 as address data AD3 (x+15, y). Then, control goes to a step S166.

In the step S166, under control of the table control means 12, the RAM control means 8 reads out the target macroblock number data MNO and the start address data AD (x, y) of the target macroblock corresponding to the target macroblock number data MNO from the residual processing data table TBL1 of the RAM 5. These data are supplied to the table control means 12. The table control means 12 compares the address data AD3 (x+15, y) and the start address data AD (x, y) of the target macroblock with each other. If they agree with each other, then the table control means 12 holds the target macroblock number data MNO supplied at that time. Then, control goes to a step S167.

In the step S167, the address calculating means 13 determines that the start address data AD (x+15, y+15) corresponding to the target macroblock number data MNO supplied at the step S155 is the start address data of the reverse area target macroblock on the lower right of the reverse area, and supplies the start address data AD (x+15, y+15) to the table control means 12 and the RAM 5. Under control of the address calculating means 13, the RAM control means 8 supplies the write/read control signal to the RAM 5, whereby the start address AD (x+15, y+15) of the reverse area target macroblock on the lower right of the reverse area from the address calculating means 13 is stored in the predetermined area of the RAM 5. Then, control goes to a step S168.

In the step S168, under control of the table control means 12, the RAM control means 8 reads out the target macroblock number data MNO and the start address data AD (x, y) of the target macroblock corresponding to the target macroblock number data MNO from the residual processing data table TBL1 of the RAM 5. These data are supplied to the table control means 12. The table control means 12 compares the address data AD4 (x+15, y+15) and the start address data AD (x, y) of the target macroblock. If they agree with each other, then the table control means 12 holds the target macroblock number data MNO supplied at that time. Then, control goes to a step S169.

In the step S169, the table control means 12 supplies the above four reverse area target macroblock number data MNO to the RAM 5. The RAM control means 8 supplies the write/read control signal to the RAM 5, whereby the four reverse area target macroblock number data MNO are stored in the RAM 5. Then, control goes to a step S170.

In the step S170, the table control means 12 supplies the target macroblock number data MNO1 to the RAM 5. Under control of the table control means 12, the RAM control means 8 supplies the write/read control signal including address data indicative of an area in which the target macroblock number data MNO should be stored to the RAM 5, whereby the target macroblock number data MNO stored in the RAM 5 is changed to the content of the target macroblock number data MNO1 obtained when the processing is started by this routine. Then, the residual processing data generating processing routine is ended, and control goes to a step S198 of the flowchart of the main routine shown in FIG. 11.

When the processing based on this routine is started, the target macroblock number data MNO is stored as the target macroblock number data MNO1. When the processing based on this routine ius ended, the target macroblock number data MNO used in this processing is rewritten into the stored target macroblock number data MNO1. The reason for this will be described below. Since the target macroblock number data MNO is used also in the processing loop of the main routine shown in FIG. 11, the target macroblock number data MNO whose value was changed in this residual processing data generating processing routine is returned to the value obtained before the processing based on the residual processing data generating processing routine is started.

When the control operation based on the residual processing data generating routine is ended, control goes to the step S198 of the main routine, whereat if the judging means 17 determines that the processing on all the macroblocks of present frame is ended, control goes to a step S200. In the step S200, a control operation based on the present and reference frame data set routine is executed. Specifically, under control of the memory control means 10, the frame image data that have been stored in the present frame memory 321 so far are transferred to the reference frame memory 323. Then, new frame image data are stored in the present frame memory 321. The content of the processing at the step S200 is similar to that of the step S50.

A control operation based on the residual processing routine shown in FIG. 11 will be described with reference to FIGS. 19 to 21.

FIGS. 19 to 21 are flowcharts used to explain the control operation based on the residual processing routine of the step S300 in the flowchart of the main routine shown in FIG. 11.

In a step S330, a processing based on the motion vector data search routine is executed, and control goes to a step S301.

In the step S301, the vector selecting means 16 sets the number Veq of motion vector data whose values are close to "0". Then, control goes to a step S302. "whose values are close" means that a difference between the value of the motion vector data registered with respect to the target macroblock number data of the target macroblock in which the reverse area target macroblock number data of the same value as that of the target macroblock number data of the target macroblock to be processed and the value of the motion vector data registered on the residual processing data table TBL1 with respect to the surrounding target macroblock of the processed target macroblock is small.

In the step S302, the vector selecting means 16 supplies a pointer P1 indicative of motion vector data of the value "1" to the RAM 5. The pointer P1 is stored in the predetermined area of the RAM 5 by the write/read control signal from the RAM control means 8. Then, control goes to a step S303. The pointer P1 is a pointer used to read out all nominated motion vector data searched at the step S330 which is the motion vector data search routine.

In the step S303, under control of the vector selecting means 16, the RAM control means 8 reads out all of motion vector data registered on the residual processing data table TBL1 with respect to the target macroblock number data of the target macroblocks searched in the motion vector data search routine with respect to the target macroblock number data MNO of the processed target macroblock of the present frame and target macroblock number data of the surrounding target macroblocks of the processed target macroblock of the present frame. The thus read out data are supplied to the vector selecting means 16. Then, control goes to a step S304.

In the step S304, the vector selecting means 16 determines whether or not there is target macroblock number data MNO corresponding to the upper left in the target macroblock number data MNO of the surrounding target macroblocks supplied from the RAM 5. If "YES" is outputted, then control goes to a step S305. If "NO" is outputted, then control goes to a step S306. The target macroblock number data of the upper left target macroblock takes a value if the number exists, and becomes "0" if such number does not exist. This was already described in FIG. 10A.

In the step S305, under control of the motion vector selecting means 16, the RAM control means 8 reads out motion vector data corresponding to the target macroblock number data MNO of the upper left macroblock from the residual processing data table TBL1 of the RAM 5. The thus read out motion vector data is supplied to the motion vector selecting means 16. Then, control goes to a step S350.

In the step S350, motion vector data is selected by the motion vector data selecting routine. Then, control goes to a step S306. The motion vector data used herein are the motion vector data shown by the pointer P1 and the motion vector data of the upper left target macroblock read out at the step S305.

In the step S306, the motion vector selecting means 16 determines whether or not there is target macroblock number data MNO corresponding to the right over within the target macroblock number data MNO of the surrounding target macroblocks supplied from the RAM 5. If "YES" is outputted, then control goes to a step S307. If "NO" is outputted, then control goes to a step S308. The target macroblock number data MNO of the right over target macroblock takes a value if the number exists, and becomes "0" if such number does not exist. This was already described with reference to FIG. 10A.

In the step S307, under control of the motion vector selecting means 16, the RAM control means 8 reads out motion vector data corresponding to the target macroblock number data MNO of the right over target macroblock from the residual processing data table TBL1 of the RAM 5. The thus read out motion vector data is supplied to the motion vector selecting means 16. Then, control goes to a step S350.

In the step S350, motion vector data is selected by the motion vector data selecting routine. Thereafter, control goes to a step S308 in the flowchart shown in FIG. 20. The motion vector used herein are the motion vector data shown by the pointer P1 and the motion vector data of the right over macroblock read out at the step S307.

In the step S308, the motion vector selecting means 16 determines whether or not there is target macroblock number data MNO corresponding to the upper right within the target macroblock number data MNO of the surrounding target macroblocks supplied from the RAM 5. If "YES" is outputted, then control goes to a step S309. If "NO" is outputted, then control goes to the step S310 of the flowchart shown in FIG. 20. The target macroblock number data MNO of the upper right target macroblock takes a value if the number exists, and becomes "0" if such number does not exist. This was already described with reference to FIG. 10A.

In the step S309, under control of the motion vector selecting means 16, the RAM control means 8 reads out motion vector data corresponding to the target macroblock number data MNO of the upper right target macroblock from the residual processing data table TBL1 of the RAM 5. The thus read out motion vector data is supplied to the motion vector selecting means 16. Then, control goes to the step S350.

In the step S350 next to the step S309 shown in FIG. 20, motion vector data is selected by the motion vector data selecting routine. Then, control goes to a step S310. The motion vector data used herein are the motion vector data shown by the pointer P1 and the motion vector data of the upper right target macroblock read out at the step S309.

In the step S310, the motion vector selecting means 16 determines whether or not there is target macroblock number data MNO corresponding to the left target macroblock within the target macroblock number data MNO of the surrounding target macroblocks supplied from the RAM 5. If "YES" is outputted, then control goes to a step S311. If "NO" is outputted, then control goes to a step S312. The target macroblock number data MNO of the left target macroblock takes a value if the number exists, and becomes "0" if such number does not exist. This was already described with reference to FIG. 10A.

In the step S311, under control of the motion vector selecting means 16, the RAM control means 8 reads out motion vector data corresponding to the target macroblock number data MNO of the left target macroblock from the residual processing data table TBL1 of the RAM 5. The thus read out motion vector data is supplied to the motion vector selecting means 16. Then, control goes to the step S350.

In the step S350, motion vector data is selected by the motion vector data selecting routine. Then, control goes to the step S312. The motion vector used herein are the motion vector data shown by the pointer P1 and the motion vector data of the right over macroblock read out at the step S311.

In the step S312, the motion vector selecting means 16 determines whether or not there is target macroblock number data MNO corresponding to the right target block within the target macroblock number data MNO of the surrounding target macroblocks supplied from the RAM 5. If "YES" is outputted, then control goes to a step S313. If "NO" is outputted, then control goes to the step 314. The target macroblock number data MNO of the right target macroblock takes a value if the number exists, and becomes "0" if such number does not exist. This was already described with reference to FIG. 10A.

In the step S313, under control of the motion vector selecting means 16, the RAM control means 8 reads out motion vector data corresponding to the target macroblock number data MNO of the right target macroblock from the residual processing data table TBL1 of the RAM 5. The thus read out motion vector data is supplied to the motion vector selecting means 16. Then, control goes to the step S350.

In the step S350, motion vector data is selected by the motion vector data selecting routine. Then, control goes to a step S314. The motion vector data used herein are the motion vector data shown by the pointer P1 and the motion vector data of the right target macroblock read out at the step S313.

In the step S314, the motion vector selecting means 16 determines whether or not there is target macroblock number data MNO corresponding to the lower left target macroblock within the target macroblock number data MNO of the surrounding target macroblocks supplied from the RAM 5. If "YES" is outputted, then control goes to a step S315. If "NO" is outputted, then control goes to the step S316. The target macroblock number data MNO of the lower left target macroblock takes a value if the number exists, and becomes "0" if such number does not exist. This was already described with reference to FIG. 10A.

In the step S315, under control of the motion vector selecting means 16, the RAM control means 8 reads out motion vector data corresponding to the target macroblock number data MNO of the lower left target macroblock from the residual processing data table TBL1 of the RAM 5. The thus read out motion vector data is supplied to the motion vector selecting means 16. Then, control goes to the step S350.

In the step S350, motion vector data is selected by the motion vector data selecting routine. Then, control goes to a step S316. The motion vector data used herein are the motion vector data shown by the pointer P1 and the motion vector data of the lower left target macroblock read out at the step S315.

In the step S316, the motion vector selecting means 16 determines whether or not there is target macroblock number data MNO corresponding to the just under target macroblock within the target macroblock number data MNO of the surrounding target macroblocks supplied from the RAM 5. If "YES" is outputted, then control goes to a step S317. If "NO" is outputted, then control goes to the step S318. The target macroblock number data MNO of the just under target macroblock takes a value if the number exists, and becomes "0" if such number does not exist. This was already described with reference to FIG. 10A.

In the step S317, under control of the motion vector selecting means 16, the RAM control means 8 reads out motion vector data corresponding to the target macroblock number data MNO of the just under target macroblock from the residual processing data table TBL1 of the RAM 5. The thus read out motion vector data is supplied to the motion vector selecting means 16. Then, control goes to the step S350.

In the step S350, motion vector data is selected by the motion vector data selecting routine. Then, control goes to a step S318. The motion vector data used herein are the motion vector data shown by the pointer P1 and the motion vector data of the just under target macroblock read out at the step S317.

In the step S318, the motion vector selecting means 16 determines whether or not there is target macroblock number data MNO corresponding to the lower right target macroblock within the target macroblock number data MNO of the surrounding target macroblocks supplied from the RAM 5. If "YES" is outputted, then control goes to a step S317. If "NO" is outputted, then control goes to the step S320. The target macroblock number data MNO of the lower right target macroblock takes a value if the number exists, and becomes "0" if such number does not exist. This was already described with reference to FIG. 10A.

In the step S319, under control of the motion vector selecting means 16, the RAM control means 8 reads out motion vector data corresponding to the target macroblock number data MNO of the lower right target macroblock from the residual processing data table TBL1 of the RAM 5. The thus read out motion vector data is supplied to the motion vector selecting means 16. Then, control goes to the step S350.

In the step S350, motion vector data is selected by the motion vector data selecting routine. Then, control goes to the step S320. The motion vector data used herein are the motion vector data shown by the pointer P1 and the motion vector data of the lower right target macroblock read out at the step S319.

In the step S320, the motion vector selecting means 16 adds "1" to the pointer P1 indicative of the motion vector data, and supplies a new pointer data P1 with "1" added thereto to the RAM 5. The pointer data P1 supplied to the RAM 5 is stored in the predetermined area of the RAM 5 in response to the write/read control signal from the RAM control means 8. Control goes to a step S321.

In the step S321, under control of the judging means 17, the RAM control means 8 reads out the pointer data P1 indicative of the motion vector data from the RAM 5. The thus read out pointer data P1 is supplied to the judging means 17. The judging means 17 judges whether or not the pointer data P1 supplied from the RAM 5 is greater than "14". If "YES" is outputted, then control goes-to a step S322. If "NO" is outputted, control goes back to the step S303 of the flowchart shown in FIG. 19.

In the step S322, under control of the motion vector selecting means 16, the RAM control means 8 reads out coincidence number data Veq indicative of the coincidence motion vector obtained with respect to four motion vector data. The thus read four coincidence number data Veq are supplied to the motion vector selecting means 16. The motion vector selecting means 16 selects the maximum coincidence number data Veq from the four coincidence number data supplied from the RAM 5, and supplies the selected coincidence number data Veq to the judging means 17. Control goes to a step S323.

In the step S323, the judging means 17 judges whether there are more than two coincidence number data from the vector selecting means 16. If "YES" is outputted, then control goes to a step S325. If "NO" is outputted, then control goes to a step S324.

In the step S324, the vector selecting means 16 selects the motion vector data corresponding to the maximum coincidence number data Veq selected at the step S322. Then, control goes to a step S400.

In the step S325, under control of the motion vector selecting means 16, the RAM control means 8 reads out differential total value data TV corresponding to the coincidence number data Veq. More than two differential total value data TV thus read out are supplied to the motion vector selecting means 16. The motion vector selecting means 16 selects the minimum differential total value data TV from more than two differential total value data TV supplied from the RAM 5, selects the coincidence number data corresponding to the selected differential total value data TV, and also selects motion vector data corresponding to the coincidence number data Veq. Then, the motion vector selecting means 16 supplies the selected motion vector data to the address calculating means 13. When the above processing is finished, control goes to a step S400.

In the step S400, the telescopic search area TSA is set by the telescopic search area TSA setting processing routine. Thereafter, control goes to a step S450.

In the step S450, the telescopic search processing is executed by the telescopic search processing routine. Then, control goes to a step S500.

In the step S500, telescopic search processing data are generated by the telescopic search processing data generating processing routine. Thereafter, control goes to a step S599 of the flowchart of the main routine shown in FIG. 11. In the step S500, although the area within the reference frame memory 323 is the telescopic search area TSA, the content of the processing is the same as that of the residual processing generating data generating processing routine at the step S150 of the flowchart of the main routine shown in FIG. 11. Therefore, the telescopic search processing data generating processing routine and its description are replaced with the flowcharts of the residual processing data generating processing routine and description shown in FIGS. 17 and 18.

A control operation based on the motion vector data search routine shown in FIG. 19 will be described with reference to FIGS. 22 and 23.

Figure 22:
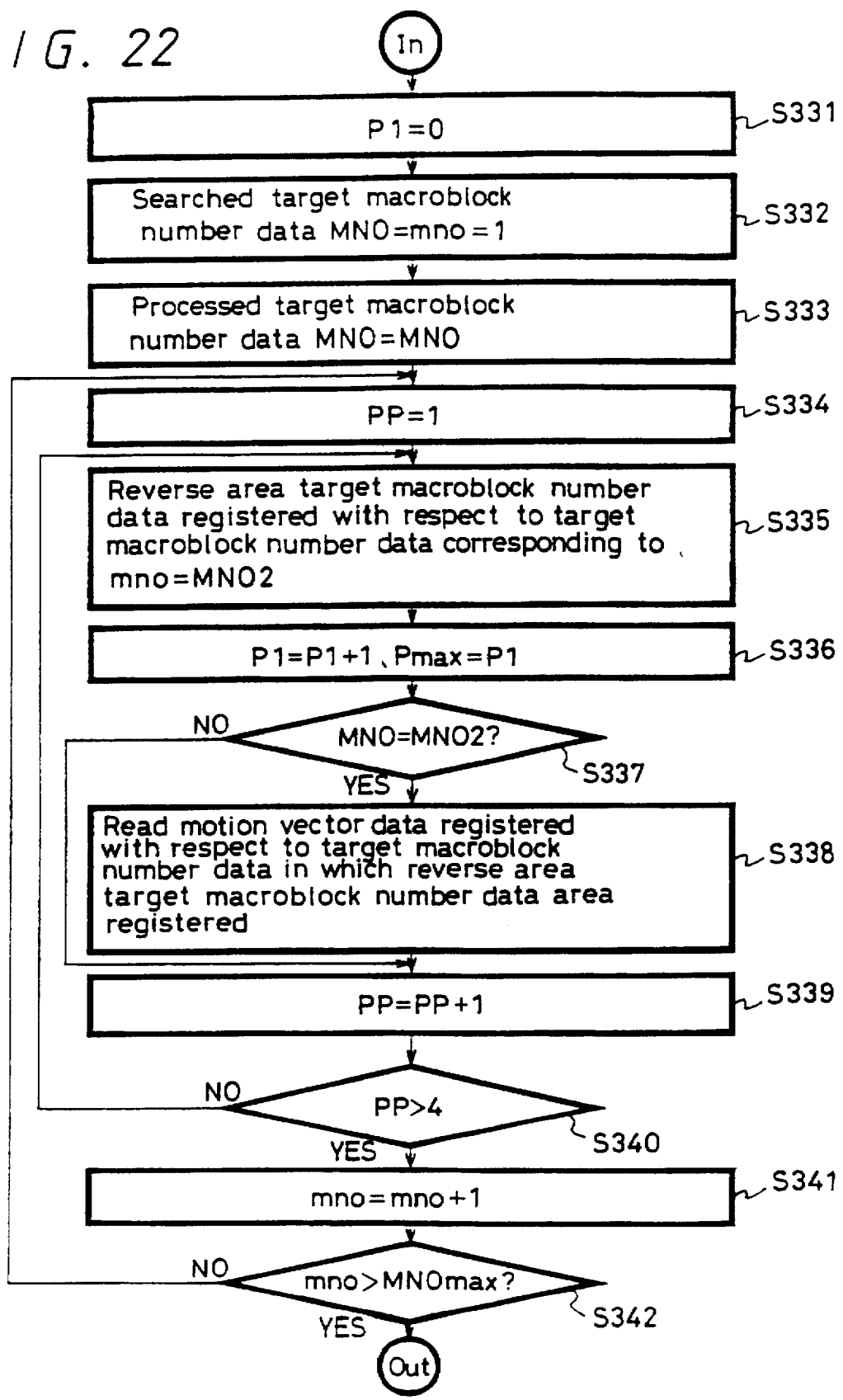
FIG. 22 is a flowchart used to explain a control operation based on a motion vector data search routine at step S330 in the flowchart of the residual processing routine shown in FIG. 19.

FIG. 22 is a flowchart showing the motion vector data search routine of the step S330 shown in FIG. 19.

In a step S331, the motion vector selecting means 16 supplies the pointer P1 indicative of the motion vector data of value "0" to the RAM 5. This pointer data P1 is stored in the predetermined area of the RAM 5 in response to the write/read control signal from the RAM control means 8. Then, control goes to a step S332.

In the step S332, the motion vector selecting means 16 supplies search object target macroblock number data mno of value "1" to the RAM 5. This search object target macroblock number data mno is stored in the predetermined area of the RAM 5 in response to the write/read control signal from the RAM control means 8. Then, control goes to a step S333.

In the step S333, under control of the vector selecting means 16, the RAM control means 8 copies the target macroblock number data MNO stored in the predetermined area of the RAM 5 to the area of processed object target macroblock data MNO saved in other area of the RAM 5. Then, control goes to a step S334.

In the step S334, the motion vector selecting means 16 supplies a pointer PP indicative of the reverse area target macroblock number data of the reverse area target macroblock of value "1" to the RAM 5. This pointer PP is stored in the predetermined area of the RAM 5 in response to the write/read control signal from the RAM control means B. Then, control goes to a step S335.

In the step S335, under control of the motion vector selecting means 16, the RAM control means 8 reads out the search object target macroblock number data mno and the pointer data PP from the RAM 5. The thus readout search object target macroblock number data mno and pointer data PP are supplied to the motion vector selecting means 16. When the motion vector selecting means 16 recognizes the contents of the search object target macroblock number data mno and the pointer data PP supplied from the RAM 5, the motion vector selecting means 16 controls the RAM control means 8. Under control of the motion vector selecting means 16, the RAM control means 8 reads out reverse area target macroblock number data corresponding to the pointer data PP from the reverse area target macroblock number data registered on the residual processing data table TBL1 with respect to the target macroblock number data of the same value as that of the search object target macroblock number data mno, and stores the reverse area target macroblock number data in the RAM 5 at its storage area of the reverse area target macroblock number data MNO2. Then, control goes to a step S336.

In the step S336, under control of the motion vector selecting means 16, the RAM control means 8 reads out the processed target macroblock number data MNO and the reverse area target macroblock number data MNO2 from the RAM 5. These data are supplied to the judging means 17. The judging means 17 judges whether or not the processed target macroblock number data MNO and the reverse area target macroblock number data MNO2 are equal to each other. If "EYES" is outputted, then control goes to step S337. If "NO" is outputted, then control goes to a step S339.

When "YES" is outputted at the step S336, the motion vector data registered with respect to the target macroblock number data of the target macroblock in which the reverse area target macroblock number data are registered can be used as nominated motion vector data used when the telescopic search area is set because the reverse target macroblock number data of the same value as that of the target macroblock number data of the target macroblock to be processed are registered.

In the step S337, under control of the motion vector selecting means 16, the RAM control means 8 reads out the pointer data P1 indicative of motion vector data from the RAM 5. The pointer data P1 read out from the RAM 5 is supplied to the motion vector selecting means 16. The motion vector selecting means 16 adds "1" to the pointer data P1, and supplies the pointer data P1 with "1" added thereto to the RAM 5. Simultaneously, the motion vector selecting means 16 controls the RAM control means 8. Under control of the motion vector selecting means 16, the RAM control means 8 supplies the write/read control signal to the RAM 5, whereby the pointer data P1 from the motion vector selecting means 16 is stored in the RAM 5 at its storage area of the pointer data P1 and at its storage area of a maximum pointer data Pmax. Then, control goes to a step S338.

The reason that the value of pointer data P1 is stored in the storage area of Pmax on the storage area of the RAM 5 is used to determine at the step S321 of FIG. 21 whether or not the processing on all nominated motion vector data is ended.

In step S338, under control of the motion vector selecting means 16, the RAM control means 8 reads out motion vector data registered on the residual processing data table TBL1 with respect to the target macroblock number data of the same value as that of the searched target macroblock number data mno, and stores the motion vector data in the RAM 5 at its area used to select motion vector. Then, control goes to a step S339.

In the step S339, under control of the motion vector selecting means 16, the RAM 8 reads out the pointer data PP from the RAM 5. The pointer data PP read out from the RAM 5 is supplied to the motion vector selecting means 16. The motion vector selecting means 16 adds "1" to the pointer data PP read out from the RAM 5 and supplies the pointer data PP with "1" added thereto to the RAM 5. Also, the motion vector selecting means 16 controls the RAM control means 8. The RAM control means 8 supplies, under control of the motion vector selecting means 16, the read/write control signal to the RAM 5, and stores the pointer data PP from the motion vector selecting means 16 in the RAM 5 at its storage area of the pointer data PP. Thereafter, control goes to a step S340.

In the step S340, under control of the motion vector selecting means 16, the RAM control means 8 reads out the pointer data PP from the RAM 5. The pointer data PP read out from the RAM 5 is supplied to the judging means 17. The judging means 17 determines whether or not the pointer data PP read out from the RAM 5 is greater than "14". If "YES" is outputted, then the processing goes to as step S341. If "NO" is outputted, then control goes to a step S335. As earlier noted, the four reverse area target macroblock number data are registered with respect to the target macroblock number data of one target macroblock. Therefore, the above judgement is made in order to process all the reverse area target macroblock number data registered on the residual processing data table TBL1 of the RAM 5 with respect to the target macroblock number data of one target macroblock.

In the step S341, under control of the motion vector selecting means 16, the RAM control means 8 reads out searched target macroblock number data mno from the RAM 5. The searched target macroblock number data mno read out from the RAM 5 is supplied to the motion vector selecting means 16. The motion vector selecting means 16 adds "1" to the searched target macroblock number data mno read out from the RAM 5, and supplies the searched target macroblock number data mno with "1" added thereto to the RAM 5. Also, the motion vector selecting means 16 controls the RAM control means 8. Under control of the motion vector selecting means 16, the RAM control means 8 supplies the write/read control signal to the RAM 5, whereby the searched target macroblock number data mno from the motion vector selecting means 16 is stored in the corresponding area of the RAM 5. Control goes to a step S342.

In the step S342, under control of the motion vector selecting means 16, the RAM control means 8 reads out the searched target macroblock number data mno and the maximum value data MNOmax of the target macroblock number data from the RAM 5. These data are supplied to the judging means 17. The judging means 17 determines whether or not the searched target macroblock number data mno is greater than the maximum value data MNOmax of the target macroblock number data. If "YES" is outputted, then this motion vector selecting routine is ended, and control goes t the step S301 of the residual processing routine shown in FIG. 19. If "NO" is outputted, then control goes back to the step S334.

FIG. 23 shows an example of motion vector data obtained from the above data search routine and which is stored in the RAM 5 in the form of a table. One motion vector data is selected from all motion vector data shown in FIG. 23 in the steps S322 to S325 of the flowchart shown in FIG. 21.

In FIG. 23, MVx (x, y) ... represent nominated motion vector data searched by the processing based on the above motion vector search routine. Motion vector data stored in the table will hereinafter be referred to as "nominated motion vector data".

TVx ... represent total values of differences between the motion vector data MVx (x, y) and motion vector data registered on the residual processing data table in response to target macroblock number data of surrounding target macroblocks encircling the target macroblocks indicated by the processed target macroblock number data.

Veqx ... the number of total value data of small differences of differences between the motion vector data MV1x (x, y) and the motion vector data registered on the residual processing data table in response to the target macroblock number data of the surrounding macroblocks encircling the target macroblocks indicated by the processed target macroblock number data, i.e., the above-mentioned coincidence number data.

In this embodiment, when one motion vector data is selected from all motion vector data searched by the motion vector data search routine, coincidences between target macroblocks indicated by the target macroblock number data from which the motion vector data is selected and a number of target macroblocks surrounding the target macroblock are evaluated, respectively. This evaluation is effected on all target macroblocks in which the motion vector data are registered. Then, evaluated values are obtained with respect to the motion vector data, respectively, and motion vector data with best evaluated value, i.e., with best coincidence relative to the motion vector data of the surrounding target macroblock is selected. This selected motion vector data is used to set the very small telescopic search area TSA.

A control operation based on the motion vector data selecting routines shown in FIGS. 19 to 21 will be described with reference to FIGS. 23 to 25.

FIGS. 23 to 25 are flowcharts used to explain a control operation based on the motion vector data selecting routine of the step S350 of the residual processing routine shown in FIGS. 19 to 21. For convenience sake of explanation, this routine is referred to as a motion vector data selecting routine, and the final selection of motion vector data is executed in the steps S322 to S325 of the flowchart shown in FIG. 21. Although not described in the steps S322 to S325 on the basis of the contents of the RAM which will be described below, the residual processing routines shown in the form of flowcharts in FIGS. 19 to 21 is higher than the motion vector data selecting routine in hierarchy.

In the motion vector selecting routine which will be described below, data for selecting the motion vector data is generated in the step S322 to S325 in the flowchart of FIG. 21. Further, in FIGS. 19 to 21, a number of steps S350 serving as the motion vector data selecting routine are illustrated. However, the contents of processing in the steps S350 are the same and are different only in the surrounding target macroblocks which are to be compared.

In a step S351, under control of the motion vector selecting means 16, the RAM control means 8 reads out the motion vector data MV (x, y) corresponding to the pointer P1 from the nominated motion vector data registered on the table formed on the RAM 5. The motion vector data MV (x, y) read out from the RAM 5 is supplied to the motion vector selecting means 16. Then, control goes to a step S352.

In the step S352, the motion vector selecting means 16 stores the motion vector data MVx supplied from the RAM 5 as horizontal motion vector data MVh1. Then, control goes to a step S353.

In the step S353, the motion vector selecting means 16 stores the motion vector data MVy supplied from the RAM 5 as vertical motion vector data MVv1. Then, control goes to a step S354.

In the step S354, the motion vector selecting means 16 stores the motion vector data MVx of the target macroblocks of upper let, right over, upper right, left, right, lower left, just under or lower right of the target macroblocks already read out at the steps S305, S307, S309, S311, S313, S315, S317 or S319 as horizontal direction motion vector data MVh2. Then, control goes to a step S355.

In the step S355, the motion vector selecting means 16 stores the motion vector data MVy of the target macroblocks of upper let, right over, upper right, left, right, lower left, just under or lower right of the target macroblocks already read out at the steps S305, S307, S309, S311, S313, S315, S317 or S319 as horizontal direction motion vector data MVv2. Then, control goes to a step S356.

In the step S356, the motion vector selecting means 16 subtracts the motion vector data MVh1 from the motion vector data MVh2, and obtains horizontal direction motion vector difference data HV by changing the subtracted result into an absolute value. Then, control goes to a step S357.

In the step S357, the motion vector selecting means 16 subtracts the motion vector data MVv1 from the motion vector data MVv2, and obtains horizontal direction motion vector difference data VV by changing the subtracted result into an absolute value. Then, control goes to a step S358 in a flowchart of FIG. 24.

In the step S358, the motion vector selecting means 166 obtains difference total value data TV by adding the horizontal direction motion vector difference data HV obtained at the step S356 and the vertical direction motion vector difference data VV, and supplies the difference total value data TV to the judging means 17. Then, control goes to a step S359.

In the step S359, the judging means 17 determines whether or not the difference total value data TV supplied from the motion vector selecting means 16 is "0". If "YES" is outputted, then control goes to a step S368 of a flowchart shown in FIG. 25. If "NO" is outputted, then control goes to a step S360.

In the step S360, the judging means 17 determines whether or not the difference total value data TV supplied from the motion vector selecting means 16 is "1". If "YES" is outputted, then control goes to the step S368 of the flowchart shown in FIG. 25. If "NO" is outputted, then control goes to a step S361.

In the step S361, the judging means 17 determines whether or not the difference total value data TV supplied from the motion vector selecting means 16 is "2". If "YES" is outputted, then control goes to the step S368 of the flowchart shown in FIG. 25. If "NO" is outputted, then control goes to a step S362.

In the step S362, the judging means 17 determines whether or not the difference total value data TV supplied from the motion vector selecting means 16 is "3". If "YES" is outputted, then control goes to the step S368 of the flowchart shown in FIG. 25. If "NO" is outputted, then control goes to a step S363.

In the step S363, the judging means 17 determines whether or not the difference total value data TV supplied from the motion vector selecting means 16 is "14". If "YES" is outputted, then control goes to the step S368 of the flowchart shown in FIG. 25. If "NO" is outputted, then control goes to a step S364.

In the step S364, the judging means 17 determines whether or not the difference total value data TV supplied from the motion vector selecting means 16 is "5". If "YES" is outputted, then control goes to the step S368 of the flowchart shown in FIG. 25. If "NO" is outputted, then control goes to a step S365.

In the step S365, the judging means 17 determines whether or not the difference total value data TV supplied from the motion vector selecting means 16 is "6". If "YES" is outputted, then control goes to the step S368 of FIG. 25. If "NO" is outputted, then control goes to a step S366 of FIG. 25.

In the step S366, the judging means 17 determines whether or not the difference total value data TV supplied from the motion vector selecting means 16 is "7". If "YES" is outputted, then control goes to the step S368. If "NO" is outputted, then control goes to a step S367.

In the step S367, the judging means 17 determines whether or not the difference total value data TV supplied from the motion vector selecting means 16 is "8". If "YES" is outputted, then control goes to the step S368. If "NO" is outputted, then control goes to a step S369.

In the step S368, the judging means 17 supplies data indicating that the value of the difference total value data TV ranges from "0" to "8". Therefore, the motion vector selecting means 16 adds "1" to the coincidence number data Veq, and control goes to a step S369.

In the step S369, the motion vector selecting means 16 supplies the coincidence number data Veq obtained at the step S368 and the difference total value data TV obtained at the step S358 to the RAM 5 together with the motion vector data MV (x, y) shown by the pointer P1. Further, under control of the motion vector selecting means 16, the RAM control means 8 supplied the write/read control signal to the RAM 5, whereby the coincidence number data Veq, the difference total value data TV and the motion vector data MV (x, y) are stored in the RAM 5 at its storage area of the above table. Then, this motion vector selecting routine is ended, and control goes to the steps S306, S308, S310, S312, S314, S316, S318 or S320 of the flowcharts shown in FIGS. 19 to 21.

The nominated motion vector data registered on the table of the RAM 5 are compared with the motion vector data of the surrounding target macroblocks of the processed target macroblock by a series of processings from the steps S304 to S320 in the flowcharts shown in FIGS. 19 to 21 to thereby evaluate a coincidence between the motion vector data and the surrounding motion vector data. The resultant evaluated results are the contents of the RAM 19 shown in FIG. 23.

Specifically, when "YES" is outputted at the step S321 in the flowchart shown in FIG. 21, the evaluation executed by comparing the nominated motion vector data and the motion vector data of the surrounding target macroblocks of the processed target macroblock has already ended. Therefore, as shown in FIG. 23, nominated motion vector data MVn (x, y), . . . , difference total value data TVn, . . . , corresponding to these nominated motion vector data MVn (x, y), and coincidence number data Veqn, . . . , are stored in the RAM 5, respectively.

As earlier noted, the motion vector selecting means 16 selects maximum coincidence number data Veqn, . . . , from the coincidence number data veqn stored in the RAM 5, and selects motion vector data MV (x, y) corresponding to the selected coincidence number data Veq, . . .

When there are more than two maximum coincidence number data Veq, the motion vector selecting means 16 selects the minimum difference total value data TV from the difference total value data TV1 to TV4, and selects the motion vector data MV (x, y) corresponding to the difference total value data TV.

After the optimum motion vector data suitable for setting the telescopic search area TSA corresponding to the target macroblock to be processed has been obtained, the telescopic search area TSA is set.

A telescopic macroblock pattern in the telescopic search area TSA and telescopic macroblock table will be described with reference to FIGS. 26A and 26B.

FIG. 26A is a diagram used to explain a manner in which the telescopic search area TSA is set by use of the motion vector data selected in the above-mentioned motion vector selecting routine. FIG. 26B shows an example of a telescopic macroblock data table TBL3 comprising telescopic macroblock number data TMNO of all telescopic macroblocks within the set telescopic search area TSA and start address data Tad (x, y) of telescopic macroblocks corresponding to the telescopic macroblock number data TMNO.

FIG. 26A will be described first. An upper left corner of the reference macroblock in the reference frame memory 321 and which is the same position as that of the target macroblock from which the motion vector data is selected in the motion vector selecting routine is set to a starting point to obtain an address of the position indicated by the selected motion vector data, and the thus obtained address is an address of the upper left corner of the reference macroblock. This reference macroblock is a macroblock shown hatched in FIG. 26A. The telescopic search area TSA is set such that the reference macroblock shown hatched in the reference frame memory 321 is located at the center of the telescopic search area TSA. When telescopic macroblocks are sequentially set within the set telescopic search area TSA, in the vertical direction, the position shown by a broken line block BV1 becomes a border to set the telescopic macroblock. In the horizontal direction, the position shown by a broken line block BH1 becomes the border to set the telescopic macroblock. The setting of the telescopic search area TSA will be described more in detail in the item R.

Referring to FIG. 26B, the telescopic macroblock table TBL3 comprising the telescopic macroblock number data TMNO of telescopic macroblocks sequentially set within the thus set telescopic search area TSA and the start address data TAD (x, y) of the telescopic macroblocks will be described.

The telescopic macroblock table TBL3 is a table used to control address of the address generating circuit 333 when a differential absolute value sum is calculated in motion detection. The telescopic macroblock number data TMNO are already stored in the telescopic macroblock table TBL3 when the telescopic macroblock table TBL3 is stored in the ROM 4 as an editor because the number of telescopic macroblocks provided within the telescopic search area TSA is known in advance.

The telescopic macroblock table TBL3 is stored in the ROM 4 as the editor, and read out from the ROM 4 and stored in the RAM 5 when the motion detecting circuit is turned on. The telescopic macroblock number data TMNO given within the telescopic search area TSA set on the frame image data set to the reference frame are stored in the storage area of the telescopic macroblock number data TMNO of the telescopic macroblock table TBL3 stored in the RAM 5. The start address data TAD (x, y) of the telescopic macroblock indicated by the value of the telescopic macroblock number data TMNO is stored in the storage area of the start address data TAD (x, y) of the telescopic macroblock. Since the telescopic search area TSA is changed each time the processed target macroblock is changed, the contents of the telescopic macroblock table TBL3 are changed accordingly.

A control operation based on the telescopic search area setting processing routine shown in FIG. 21 will be described with reference to FIGS. 27 and 28.

FIGS. 27 and 28 are flowcharts used to explain the control operation based on a telescopic search area setting processing routine at a step S400 of the flowchart shown in FIG. 21.

In a step S401, the address calculating means 13 calculates address data ad (x, y) of the macroblock located at the position shown by the motion vector data supplied from the motion vector calculating means 14. Then, control goes to a step S402.

In the step S402, under control of the address calculating means 13, the RAM control means 8 reads out the horizontal direction disatance data Tx from the RAM 5 and supplies the same to the address calculating means 13. The address calculating means 13 obtains horizontal address data Tadh1 of upper left corner of the telescopic search area TSA by subtracting the horizontal direction distance data Tx from the horizontal direction address data adx of the macroblock. Then, control goes to a step S403.

In the step S403, under control of the address calculating means 13, the RAM control means 8 reads out vertical direction distance data Ty from the RAM 5 and supplies the same to the address calculating means 13. The address calculating means 13 obtains vertical address data Tadv1 of upper left corner of the telescopic search area TSA by subtracting the vertical direction distance data Ty from vertical address data ady of the macroblock. Then, control goes to a step S404.

The distance data Tx is a distance from the left and right borders of the macroblock to the border of the telescopic search area TSA at the unit of pixels. The distance data Ty is a distance from the upper and lower borders of the macroblock to the border of the telescopic search area TSA at the unit of pixels.

In the step S404, the address calculating means 13 obtains horizontal address data Tadh2 of upper right corner of the telescopic search area TSA by adding the value twice the horizontal direction distance data Ty to the horizontal address data adx of the macroblock, and supplies this horizontal address data Tadh2 to the judging means 17. Then, control goes to a step S405.

In the step S405, the address calculating means 13 obtains vertical address data Tadv2 of upper right corner of the telescopic search area TSA by setting the vertical address data Tadv1 obtained at the step S403 to vertical address data Tadv2 of upper right corner of the telescopic search area TSA. Then, control goes to a step S406.

In the step S406, the address calculating means 13 obtains horizontal address data Tadh3 of lower left corner of the telescopic search area TSA by setting the horizontal address data Tadh1 obtained at the step s402 to the horizontal address data Tadh3 of lower left corner of the telescopic search area TSA. Then, control goes to a step S407.

In the step S407, the address calculating means 13 obtains vertical address data Tadv3 of lower left corner of the telescopic search area TSA by adding the value twice the vertical direction distance data Ty to the vertical direction address data ady of the macroblock, and supplied this vertical address data Tadv3 to the judging means 17. Then, control goes to a step S408.

In the step S408, the address calculating means 13 obtains horizontal address data Tadv4 of lower right corner of telescopic search area TSA by setting the horizontal address data Tadh2 obtained at the step S400 to horizontal address data Tadh4 of lower right corner of the telescopic search area TSA. Then, control goes to a step S409.

In the step S409, the address calculating means 13 obtains vertical address data Tadv4 of lower right corner of the telescopic search area TSA by setting the vertical address data Tadv3 obtained at the step S407 to vertical address data Tadv4 of lower right corner of the telescopic search area TSA. Then, control goes to a step S410.

In the step S410, the address calculating means 13 sets the horizontal and vertical address data Tadh1 and Tadv1 of lower left corner of the telescopic search area TSA to start address data TSSad (x, y) of the telescopic search area TSA and the horizontal and vertical address data Tadh4 and Tadv4 of the telescopic search area TSA to ending address data TSEad (x, y) of the telescopic search area TSA, and supplies them to the RAM 5. Then, the RAM control means 8 supplies the write/read control signal to the RAM 5, whereby the start address data TSSad (x, y) and the ending address data TSEad (x, y) of the telescopic search area TSA are stored in predetermined storage areas of the RAM 5. Then, control goes to a step S411.

In the step S411, the address calculating means 13 sets vertical address data Tadx of telescopic macroblock within the telescopic search area TSA to horizontal address data Tadh1 of lower left corner of the telescopic search area TSA. Then, control goes to a step S412.

In the step S412, the address calculating means 13 sets vertical address data Tady of telescopic macroblock within the telescopic search area TSA to horizontal address data Tadh1 of upper left corner of the telescopic search area TSA. Then, control goes to a step S413.

In the step S413, the address calculating means 13 supplies horizontal and vertical address data Tad (x, y) of the telescopic macroblock located within the telescopic search area TSA obtained at the step S411 and S412 to the RAM 5. The RAM control means 8 supplies the write/read control signal including address data indicative of the storage area of the telescopic macroblock table TBL3 to the RAM 5 under control of the address calculating means 13, whereby the horizontal and vertical address data Tad (x, y) of the telescopic macroblock from the address calculating means 13 are registered on the telescopic macroblock table TBL3 of the RAM 5. Then, control goes to a step S414.

In the step S414, the address calculating means 13 adds "1" to the horizontal address data Tadx of the telescopic macroblock and supplies new horizontal address data Tadx to the judging means 17. Then, control goes to a step S415. This processing is an increment of horizontal address.

In the step S415, the judging means 17 subtracts "32" from the horizontal address data Tadh2 previously supplied from the address calculating means 13, and determines whether or not the horizontal address data Tadx from the address calculating means 13 is greater than the subtracted result. If "YES" is outputted, then control goes to a step S416. If "NO" is outputted, then control goes back to the step 413. In the step S415, the processing is executed such that the telescopic macroblock set within the telescopic search area TSA may not cross the horizontal-direction border BH1 shown in FIG. 26.

In the step S416, the address calculating means 13 sets the horizontal address data Tadx of the telescopic macroblock to horizontal address data Tadh1 of upper left corner of the telescopic search area TSA. Then, control goes to a step S417.

In the step S417, the address calculating means 13 adds "1" to vertical address data Tady of telescopic macroblock, and supplies resultant new horizontal address data Tady to the judging means 17. Then, control goes to a step S418. This processing is an increment of vertical address.

In the step S418, the judging means 17 subtracts "32" from the vertical address data Tadv3 previously supplied from the address calculating means 13, and determines whether or not the vertical address data Tady from the address calculating means 13 is greater than the subtracted result. If "YES" is outputted, this telescopic search area setting processing routine is ended, and control goes to a step S450 serving as the telescopic search processing routine shown in FIG. 21. If "NO" is outputted, then control goes back to the step S413. In the step S418, the processing is carried out such that the telescopic macroblock set within the telescopic search area TSA may not cross the vertical direction border BV1 shown in FIG. 26A.

After the processing based on the telescopic search area setting processing routine has been finished, start address data of all telescopic macroblocks located within the telescopic search area TSA set within the reference frame memory 323 are registered on the telescopic macroblock table TBL3 of the RAM 5.

A control operation based on the telescopic search processing routine shown in FIG. 21 will be described with reference to FIGS. 29 and 30.

FIGS. 29 and 30 are flowcharts used to explain the control operation based on the telescopic search processing routine of the step S450 in the flowchart of the residual processing routine shown in FIG. 21.

In a step S451, the judging means 17 supplies telescopic macroblock number data TMNO of value "1" to the RAM 5. The telescopic macroblock number data TMNO of value "1" is stored in the RAM at its storage area of the telescopic macroblock number data TMNO on the storage space in response to the write/read control signal from the RAM control means 8. Then, control goes to a step S452.

In the step S452, under control of the table control circuit 12, the RAM control means 8 reads out target macroblock number data M (f) from the RAM 5, and reads out horizontal and vertical address data AD (x, y) located at the start of the target macroblock located within the present frame memory 321 corresponding to the target macroblock number data MNO of the same value from the residual processing data table TBL1 stored in the RAM 5. The horizontal and vertical address data AD (x, y) read out from the residual processing data table TBL1 are supplied to the area setting means 15. Then, control goes to a step S453.

In the step S453, the area setting means 15 calculates start horizontal and vertical address data TSSad (x, y) and ending horizontal and vertical address data SEad (x, y) of the telescopic search area TSA to be set on the storage space of the reference frame memory 323. The calculated start horizontal and vertical address data TSSad (x, y) and ending horizontal and vertical address data TSEad (x, y) of the telescopic search area TSA on the storage space of the reference frame memory 323 are supplied to the address calculating means 13. Then, control goes to a step S454.

In the step S454, the RAM control means 8 supplies the write/read control signal including the stored positions of horizontal and vertical address data HAD and VAD on the storage space of the RAM 5 to the RAM 5, whereby the contents of the horizontal and vertical address data HAD, VAD on the storage space of the RAM 5 become the horizontal address data AD (x, y) read out from the RAM 5. Then, control goes to a step S455.

In the step S455, the address calculating means 13 calculates start address data Tad (x, y) of all telescopic macroblocks located within the telescopic search area TSA based on the start horizontal and vertical address data TSSad (x, y) and ending horizontal and vertical address data TSEad (x, y) of the telescopic search area TSA on the storage space of the reference frame memory 323 supplied from the area setting means 15. The thus calculated start address data Tad (x, y) of all the telescopic macroblocks TSA within the telescopic search area TSA are supplied to the RAM 5. The RAM control means 8 supplies address data indicative of the storage area of the telescopic macroblock table TBL3 to the RAM 5, whereby the start address data Tad (x, y) of the telescopic macroblock located within the telescopic search area TSA are sequentially registered on the telescopic macroblock table TBL3 stored in the RAM 5. Then, control goes to a step S456.

In the step S456, the memory control means 10 supplies the horizontal and vertical address data HAD and VAD through the I/O port 6 to the present frame memory 321. Then, control goes to a step S457 of the flowchart shown in FIG. 30.

In the step S457, under control of the address generating control means 11, the RAM control means 8 reads out start address data Tad (x, y) of the telescopic macroblock corresponding to the telescopic macroblock number data TMNO registered on the telescopic macroblock table TBL3 of the RAM 5. The start address data Tad (x, y) of the telescopic macroblock read out from the RAM 5 is supplied through the I/O port 6 to the address generating circuit 333. Then, control moves to a step S458.

The address generating circuit 333 generates horizontal and vertical address data from the thus loaded horizontal and vertical address data Tad (x, y), and supplies the thus generated horizontal and vertical address data to the reference frame memory 323, whereby pixel data of the telescopic macroblock are sequentially read out from the reference frame memory 323. A manner in which the horizontal and vertical address data are generated from the address generating circuit 333 was already described with reference to the flowcharts shown in FIGS. 14 and 15.

In the step S458, the memory control means 10 adds "1" to the horizontal address data HAD. Then, control moves to a step S459.

In the step S459, the judging circuit 17 determines whether or not the horizontal address data HAD is greater than "16". If "YES" is outputted, then control moves to a step S460. If "NO" is outputted, then control moves to a step S464.

In the step S460, the RAM control means 8 supplies the write/read control signal including address data indicative of the stored position of the horizontal address data HAD on the storage space of the RAM 5 to the RAM 5, whereby the content of the horizontal address data HAD on the storage space of the RAM 5 becomes the horizontal address data ADx read out from the residual processing data table TBL1 of the RAM 5. Then, control goes to a step S461.

In the step S461, the memory control means 10 adds "1" to the vertical address data VAD. Then, control goes to a step S462.

In the step S462, the judging circuit 17 determines whether or not the vertical address data VAD is greater than "16". If "YES" is outputted, then control goes to a step S463. If "No" is outputted, then control goes to a step S464.

In the step S463, the judging means 17 adds "1" to the telescopic macroblock number data TMNO read out from the RAM 5 by the RAM control means 8. The telescopic macroblock number data TMNO with "1" added thereto is supplied to the RAM 5, and stored in the write/read control signal from the RAM control means 8. Then, control goes to a step S565.

In the step S464, the memory control means 10 supplies the horizontal and vertical address data HAD and VAD to the present frame memory 321 through the I/O port 6. Then, control goes back to the step S458.

In the step S465, under control of the judging means 17, the RAM control means 8 supplies the write/read control signal including address data indicative of the storage areas of the telescopic macroblock number data TMNO and the maximum value data TMNOmax to the RAM 5, whereby the telescopic macroblock number data TMNO and the maximum value data TMNOmax of the telescopic macroblock number are read out from the RAM 5. The judging means 17 determines whether or not the telescopic macroblock number data TMNO is greater than the maximum value data TMNOmax of the telescopic macroblock number. If "YES" is outputted, this telescopic search routine is ended, and control goes to a telescopic search processing data generating processing routine of the step S500 in the flowchart of the residual processing routine shown in FIG. 21. If "NO" is outputted, control goes back to the step S455 in the flowchart shown in FIG. 29.

As is clear from the above description, when the above processing is executed repeatedly, the pixel data located within one telescopic macroblock of the telescopic search area TSA of the reference frame memory 323 corresponding to the target macroblock are subtracted sequentially from the pixel data of one target macroblock by the adding circuit 324. The subtracted output is converted into the absolute value by the absolute value circuit 325. The differential data in the form of absolute value are accumulated by the adding circuit 326 and the latch circuit 317, and stored in the memory 328 as the differential absolute value sum data. This processing is effected on all telescopic macroblocks of the telescopic search area TSA of the reference frame memory 321 with respect to one target macroblock. Then, the minimum value detecting circuit 329 selects the minimum differential absolute value sum data from the differential absolute value sum data corresponding to all telescopic macroblocks located within the telescopic search area TSA stored in the memory 328. Then, the motion vector detecting circuit 330 generates motion vector data based on the selected differential absolute value sum data, address data of the telescopic macroblock in which the differential absolute value sum data could be obtained and address data of the target macroblock.

In the telescopic processing routine shown in FIGS. 29 and 30, as is clear from the flowchart shown in FIG. 11, if the target macroblock number data MNO is not greater than the maximum value MNomax of the target macroblock number data in a step S599, as shown in a step S601, "1" is added to the target macroblock number data MNO, and control goes back to the step S300, i.e., the telescopic search processing routine shown in FIGS. 29 and 30. In other words, a motion detection is effected on all the target macroblocks of the present frame memory 321 by the telescopic search processing.

After the above processing has been finished, control goes to the telescopic search processing data generating processing routine S500 shown in FIG. 21, whereat telescopic search processing data used when a picture is updated next is generated. Although the name of the routine is different, the content of the processing in the telescopic search data generating routine is the same as that of the residual processing data generating processing routine of the step S150 in the flowchart shown in FIG. 11. In addition, the table used is the residual processing table TBL1 used in the processing of the residual processing data generating processing routine shown in FIG. 11. Therefore, the detailed contents of the flowcharts are the same as those of FIGS. 17 to 19, and need not be described.

Effect of the first embodiment will be described.

As described above, according to this embodiment, when the processing is started or scene change occurs, all target macroblocks of the present frame memory 321 and all reference macroblocks located within the search area SA of relatively wide area set in the reference frame memory 323 are motion-detected by the full search block matching. Taking the position of each target macroblock as the starting point, the reverse area including the macroblock located at the position shown by the reverse motion vector with the same magnitude as that of the motion vector data NV (x, y) obtained with respect tot each target macroblock but with the opposite direction is searched, the target macroblock number data MNO of four target macroblocks contained in this reverse area are registered on the residual processing data table TBL1 as corresponding data of each target macroblock. When the picture is updated and the next processing is started, the motion vector data registered with respect to the target macroblock number data MNO of the target macroblocks in which the reverse area target macroblock number data of the same value as that of the target macroblock number data of the processed target macroblock are registered are read out from the residual processing data table TBL1 as nominated motion vector data. Then, the optimum motion vector data is selected from the thus read out nominated motion vector data. The very small telescopic search area TSA including the macroblock located at the position within the reference frame memory 323 shown by the selected motion vector data is set within the reference frame memory 323. Thereafter, the motion detection is carried out by the processed target macroblock and all the telescopic macroblocks located within the telescopic search area TSA set in the reference frame memory 323.

Therefore, when the object is moving at an equal speed linearly, the position of the object in the next frame image data is predicted before the next frame image data is motion-detected. Then, the next frame image data is motion-detected by the very small telescopic search area selected based on such prediction. Thus, as compared with the conventional motion detection which is continuously carried out by use of the wide search area, the data processing time at the frame unit can be reduced considerably, and the processing can be carried out under the condition that the very small telescopic search area is set at the predicted position. Thus, the motion detection can be carried out at higher accuracy. Therefore, when image data is encoded with a calculation of difference between the macroblock data of present frame and the macroblock data of preceding frame, the most accurate predicted macroblock can be extracted from the image data of preceding frame by motion compensation. Thus, the encoding amount can be decreased, and data can be transmitted or recorded highly efficiently.

Further, according to this embodiment, when one motion vector data is selected from the nominated motion vector data, the nominated motion vector data and the motion vector data of the target macroblocks surrounding the processed target macroblock are compared with each other, and nominated motion vector data closest to the value of the surrounding motion vector data is selected. Therefore, the processing for the processed target macroblock can be executed with reference to the motion vector data of the surrounding target macroblock so that the motion detection can be carried out at higher accuracy.

A control operation based on the motion vector data selecting routine shown in FIG. 21 will be described with reference to FIGS. 31 and 32.

Figure 31:
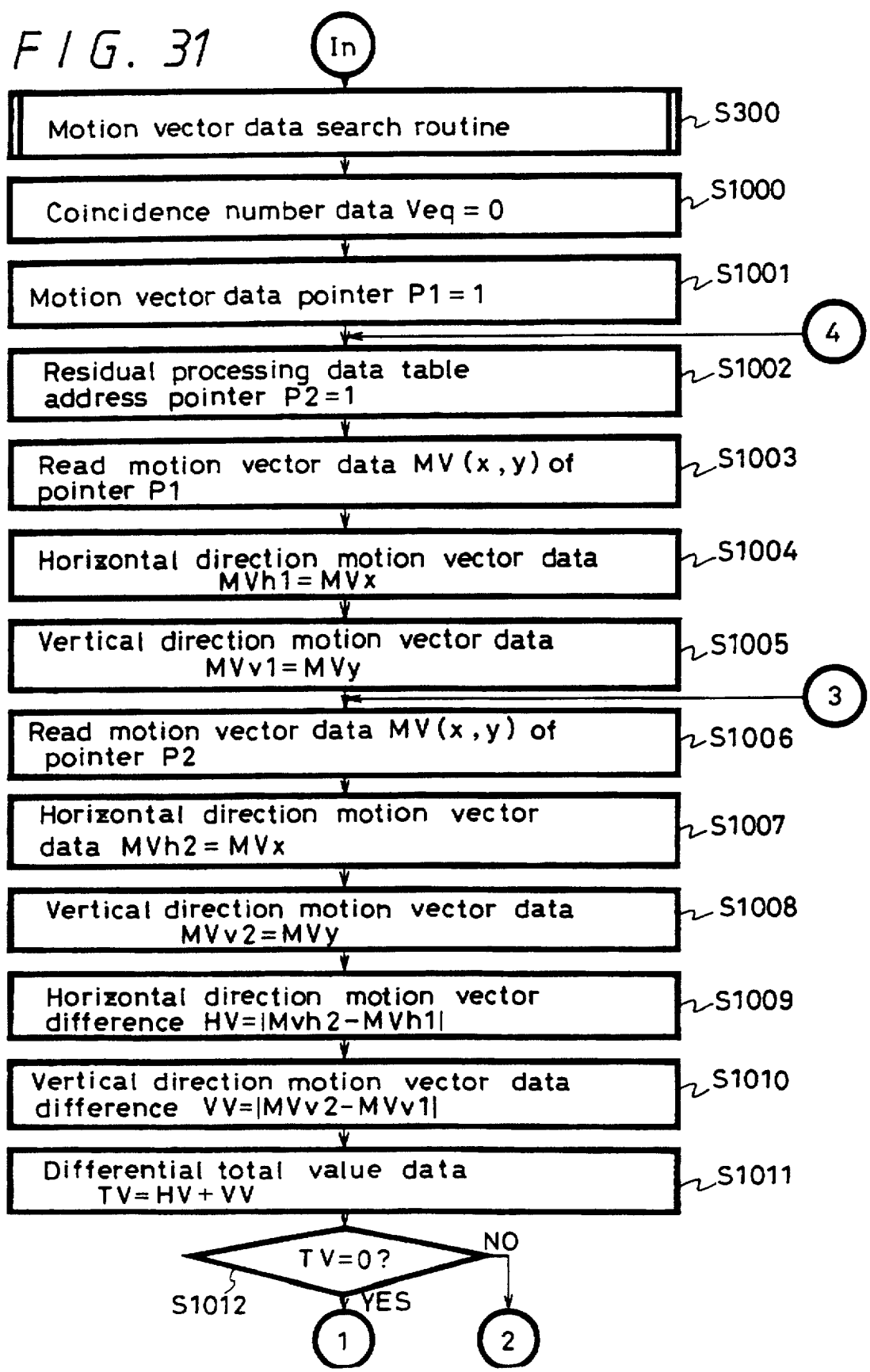
FIG. 31 is a flowchart (second embodiment) used to explain a control operation based on the motion vector data selecting routine shown in FIG. 21.
Figure 32:
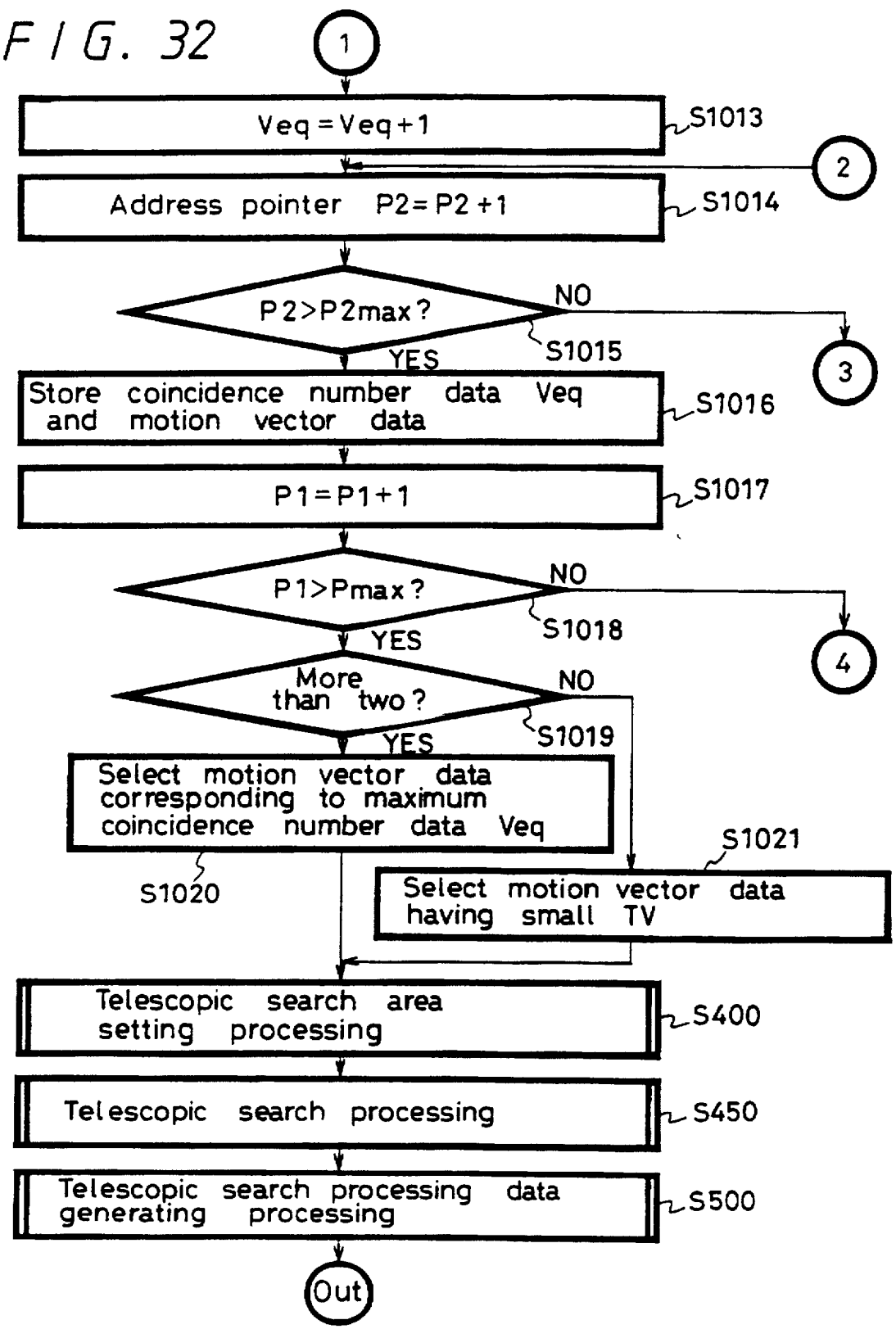
FIG. 32 is a flowchart (second embodiment) used to explain a control operation based on the motion vector data selecting routine shown in FIG. 21.

FIGS. 31 and 32 are flowcharts used to explain other example of the control operation in the residual processing routine S350 shown in FIG. 11. The first and second embodiments differ from each other in control operation of this residual processing routine. In the second embodiment, when optimum motion vector data for setting the telescopic search area TSA is selected from nominated motion vector data, the number of motion vector data with the same value as that of nominated motion vector data registered on the residual processing data table TBL is detected, and nominated motion vector data which are much registered on the residual processing data table TBL are selected.

Incidentally, in the second embodiment, target macroblock number data of the target macroblocks surrounding the processed target macroblock need not be registered on the residual processing data table TBL1 because these data are not used in the second embodiment.

In the step S300, the processing based on the motion vector data search routine is executed, and control goes to a step S1000. The motion vector data search routine at the step S300 is the same as the motion vector data search routine shown in FIG. 22.

In the step S1000, the motion vector selecting means 16 supplies data of value "0" to the RAM 5. Under control of the motion vector selecting means 16, the RAM control means 18 supplies the write/read control signal including address data indicative of the storage area of coincidence number data Veq which indicates the number of coincident motion vector to the RAM 5, whereby the value of the coincidence number data Veq stored in the RAM 5 is set to "0". Then, control goes to a step S1001.

In the step S1001, the motion vector selecting means 16 supplies data of value "1" to the RAM 5. Under control of the motion vector selecting means 16, the RAM control means 8 supplies the write/read control signal including address data indicating the storage area of pointer P1 indicating nominated motion vector data registered on the table of the RAM 5 to the RAM 5, whereby the value of the pointer P1 stored in the RAM 5 is set to "1". Then, control goes to a step S1002.

In the step S1002, the motion vector selecting means 16 supplies data of value "1" to the RAM 5. Under control of the motion vector selecting means 16, the RAM control means 8 supplies the write/read control signal including address data indicative of the storage area of the address pointer P2 of the residual processing data table to the RAM 5, whereby the value of the pointer P2 stored in the RAM 5 is set to "1". Then, control moves to a step S1003.

In the step S1003, under control of the motion vector selecting means 16, the RAM control means 8 reads out motion vector data MV (x, y) corresponding to the pointer P1 from the RAM 5. The motion vector data MV (x, y) read out from the RAM 5 is supplied to the motion vector selecting means 16. Then, control goes to a step S1004.

In the step S1004, the motion vector selecting means 16 stores the motion vector data MVx supplied from the RAM 5 as horizontal motion vector data MVh1. Then, control goes to a step S1005.

In the step S1005, the vector selecting means 16 stores the motion vector data MVy supplied from the RAM 5 as vertical motion vector data MVv1. Then, control goes to a step S1006.

In the step S1006, under control of the table control means 16, the RAM control means 8 reads out the motion vector data MV (x, y) corresponding to the pointer P2 from the residual processing data table TBL1 of the RAM 5, and supplies the motion vector data MV (x, y) read out from the RAM 5 to the vector selecting means 16. Then, control proceeds to a step S1007.

In the step S1007, the vector selecting means 16 stores the motion vector data MVx supplied from the RAM 5 as horizontal motion vector data MVh2. Then, control goes to a step S1008.

In the step S1008, the vector selecting means 16 stores the motion vector data MVy supplied from the RAM 5 as vertical motion vector data MVv2. Then, control goes to a step S1009.

In the step S1009, the vector selecting means 16 subtracts the motion vector data MVh1 from the motion vector data MVh2, changes a subtracted result into an absolute value, and obtains horizontal direction motion vector differential data HV. Then, control goes to a step S1010.

In the step S1010, the vector selecting means 16 subtracts the motion vector data MVv1 from the motion vector data MVv2, changes a subtracted result into an absolute value, and obtains horizontal direction motion vector differential data VV. Then, control goes to a step S1011.

In the step S1011, the vector selecting means 16 obtains differential total value data TV by adding the horizontal direction motion vector differential data HV obtained at the step S1009 and the vertical direction motion vector differential data W obtained at the step S1010, and supplies the differential total value data TV to the judging means 17. Then, control goes to a step S1012.

In the step S1012, the judging means 1 determines whether or not the differential total value data TV supplied from the vector selecting means 16 is "0". If "YES" is outputted, then control goes to a step S1013 in the flowchart shown in FIG. 32. If "NO" is outputted, then control goes to a step S1014 in the flowchart shown in FIG. 32.

In the step S1013, the judging means 17 supplies data indicating that the differential total value data TV is "0" to the vector selecting means 16, whereby the vector selecting means 16 adds "1" to the coincidence number data Veq. Then, control goes to the step S1014.

In the step S1014, the vector selecting means 16 adds "1" to the address pointer P2 to the residual processing data table TBL, and supplies a resultant address pointer P2 to the judging means 17. Then, control goes to a step S1015.

In the step S1015, the judging means 17 determines whether or not the address pointer data P2 from the vector selecting means 16 is larger than the maximum value data P2max of the address pointer. If "YES" is outputted, then control goes to a step S1016. If "NO" is outputted, then control goes back to the step S1005 in the flowchart shown in FIG. 31.

In the step S1016, the vector selecting means 16 supplies the coincidence number data Veq obtained at the step S1013 and the differential total value data TV obtained at the step S1011 to the RAM 5 together with the motion vector data MV (x, y) shown by the pointer P1. Under control of the vector selecting means 16, the RAM control means 1 supplies the write/read control signal to the RAM 5, whereby the coincidence number data Veq, the differential total value data TV and the motion vector data MV (x, y) are stored in the predetermined storage areas of the RAM 5. Then, control goes to a step S1017.

In the step S1017, the vector selecting means 16 adds "1" to the pointer P1, and supplies a resultant address pointer P1 to the judging means 17. Then, control goes to a step S1018.

In the step S1018, the judging means 17 determines whether or not the address pointer data P1 from the vector selecting means 16 is greater than the pointer maximum value data Pmax. If "YES" is outputted, then control goes to a step S1019. If "NO" is outputted, then control goes back to the step S1002 of the flowchart shown in FIG. 31.

In the step S1019, the judging means 17 determines whether or not the coincidence number data Veq from the vector selecting means 16 is more than 2. If "YES" is outputted, then control goes to a step S1020. If "NO" is outputted, then control goes to a step S1021.

In the step S1020, the vector selecting means 16 selects motion vector data corresponding to the maximum coincidence number data Veq. Then, control goes to the step S400.

In the step S1021, under control of the vector selecting means 16, the RAM control means reads out the differential total value data corresponding to the coincidence number data Veq from the RAM 5. More than two read out differential total value data TV are supplied to the motion vector selecting means 16. The motion vector selecting means 16 selects the minimum differential total number data TV from the more than two differential total value data TV supplied thereto from the RAM 5, selects the coincidence number data Veq corresponding to the selected differential total value data TV, and also selects the motion vector data corresponding to the coincidence number data Veq. The motion vector selecting means 16 supplies the selected motion vector data to the address calculating means 13. After the above processing has been ended, control goes to the step s400.

In the step S400, the telescopic search area TSA is set by the telescopic search area setting processing routine. Then, control goes to a step S450. The telescopic search area setting processing routine at the step S400 is the same as the telescopic search area setting processing routine shown in FIGS. 27 and 28.

In the step S450, the telescopic search processing is executed by the telescopic search processing routine. Then, control goes to a step S500. The telescopic search processing routine shown in S450 is the same as the telescopic search processing routine shown in FIGS. 29 and 30.

In the step S500, telescopic search processing data is generated by the telescopic search processing data generating processing routine. Then, control goes to a step S599 in the flowchart shown in FIG. 11. In the step S500, although the area located within the target reference frame memory 321 is the telescopic search area TSA, the content of the processing thereof is the same as that of the residual processing data generating processing routine of the step S150 in the flowchart of the main routine shown in FIG. 11. Therefore, the illustration and description of this telescopic search processing data generating processing routine need not be described and replaced with the flowchart and description of the residual processing data generating processing routine shown in FIGS. 17 and 18.

In the nominated motion vector data, by a series of processing from the steps S1002 to S1021 in the flowcharts shown in FIGS. 31 and 32, the number of the motion vector data of the same value in the motion vector data of all target macroblocks is detected, and coincidence of the motion vector data within the frame is evaluated. The evaluated results are the contents of the RAM shown in FIG. 23.

If "YES" is outputted at the step S1018 in the flowchart shown in FIG. 21, the evaluation by comparing the nominated motion vector data and the motion vector data of all target macroblocks within the frame is finished. Therefore, as shown in FIG. 23, nominated motion vector data MVn, . . . , differential total value data TVn, . . . , corresponding to these nominated motion vector data TVn (x, y), . . . , and coincidence number data Veqn, . . . , are stored in the RAM 5.

As earlier noted, the vector selecting means 16 selects the minimum coincidence number data Veqn, . . . , from the coincidence number data Veq stored in the RAM 5, and selects motion vector data MVn, . . . , corresponding to the selected coincidence number data Vegn, . . .

At that time, when there are more than two maximum coincidence number data Veq, the vector selecting means 16 selects the minimum differential total value data TV from the differential total value data TV, and selects motion vector data MV (x, y) corresponding to the differential total value data TV.

After the optimum motion vector for setting the telescopic search area TSA corresponding to the processed target macroblock has been obtained by the above-mentioned processing, the setting processing of the telescopic search area TSA is executed.

Effects of the second embodiment will be described.

As described above, according to this embodiment, when one motion vector data is selected from the nominated motion vector data, since the number of motion vector data coincident with motion vector data of all macroblocks located within the frame is detected and motion vector data in which the number of motion vector data of the same value within the frame is largest, motion vector data with a highest correlation with the motion vector data of other target macroblock within the frame can be selected. Therefore, the motion vector data obtained when the telescopic search area TSA is set by the selected motion vector data and motion detection is executed by use of such telescopic search area TSA becomes highly accurate. When the motion compensation is carried out by this motion vector data and differential data is obtained by the motion-compensated macroblock and the encoded macroblock, the data amount can be made smallest, and an encoding efficiency can be improved considerably. The above-mentioned effects can be obtained in addition to effects achieved when the motion vector data is selected in the first embodiment.

A third embodiment according to the present invention will be described below.

A concept of control operation based on the residual processing routine shown in FIG. 11 will be described with reference to FIG. 33.

FIG. 33 is a diagram used to explain the concept of the control operation of other example (third embodiment) of the residual processing routine shown in FIG. 11. In the third embodiment, when the optimum motion vector data for setting the telescopic search area TSA is selected from the nominated motion vector data searched with respect to one target macroblock, if n represents future motion detection processing, nominated motion vector data searched with respect to the target macroblock number MNO of the same value registered in the residual processing data table TBL1 generated at n−2 step is used. The above "used" means that optimum motion vector data for setting the telescopic search area TSA is selected from the nominated motion vector data. In order to check past motion vector data, all nominated motion vector data searched by the aforementioned motion vector data search routine also have to be registered on the residual processing data table TBL1, and the residual processing data table TBL1 has to be buffered.

In the third embodiment, the target macroblock number data of the target macroblocks surrounding the processed macroblock need not be registered in the residual processing data table TBL1 because these data are not used in the third embodiment.

FIG. 33 shows outlines of the motion detection processing, the processing for generating the residual processing data table TBL1 by this processing, the processing for buffering the residual processing data table TBLL and the processing for selecting motion vector data by use of the buffered past residual processing data table TBL1. A manner in which motion vector data is selected based on the buffered past residual processing data table TBL1 will be described in the item V with reference to flowcharts of FIGS. 34 to 36.

In the third embodiment, target macroblock number data of target macroblocks surrounding the processed target macroblock need not be registered in the residual processing data table TBL1.

FIG. 33A shows processed frame image data n−1, n, n+1, n+1, n+3 arranged on the time base. If the frame image data n is set to the present frame, then n−1 becomes frame image data of preceding frame, n+1 becomes frame image data of one frame succeeding, n+2 becomes frame image of two-frame succeeding, and n+3 becomes frame image data of three-frame succeeding.

FIG. 33B shows a motion detection processing using the frame image data n−1 to n+3 shown in FIG. 33A.

FIG. 33C shows residual processing data table TBL1 obtained (updated) in the motion detection processing shown in FIG. 33C. The residual processing data table TBL1 is stored in the same area of the same RAM 5 but the content thereof is updated on the time base. Accordingly, a residual processing data table TBL1 obtained when the frame image data n−1 and n are motion-detected is represented by reference numeral T1, a residual processing data table TBL1 obtained when the frame image data n and n+1 are motion-detected is represented by reference numeral T2, a residual processing data table TBL1 obtained when the frame image data n+1 and n+2 are motion-detected is represented by reference numeral T3, and a residual processing data table TBL1 obtained when the frame image data n+2 and n+3 are motion-detected is represented by reference numeral T4. Incidentally, parenthesized reference symbols affixed to the reference symbols T1 to T4 represent areas within the RAM 5.

Specifically, the residual processing data table TBL1 obtained by the motion detection at any time point are always stored in an area Ar1 of the RAM 5. In the following description, these residual processing data table T1 (Ar1) to T4 (ar4) will be referred to as "main residual processing data table" for convenience sake of explanation.

As shown by solid line arrows in broken line ellipses showing motion detections of FIG. 33B using solid-line blocks showing the main residual processing data tables T1 (Ar1) to T4 (Ar4) of FIG. 33C as starting points, the main residual processing data tables T1 (Ar1) to T4 (Ar4) thus obtained are used to set telescopic search areas TSA in the motion detections.

FIG. 33D shows buffering processing executed after the main residual processing data tables T1 (Ar1) to T4 (Ar4) shown in FIG. 33C were generated. The residual processing data tables T1 (Ar1) to T4 (Ar4) thus generated in the buffering processing are stored in the RAM 5.

FIG. 33E shows residual processing data tables stored in the RAM 5 by the buffering processing shown in FIG. 33D. A residual processing data table BT1 (Ar2) results from storing the residual processing data table T1 (Ar1) shown in FIG. 33C in the RAM 5 by the buffering processing. A parenthsized reference symbol Ar2 affixed to BT1 depicts the area in the RAM 5. This residual processing data table TB1 (Ar2) is used to select motion vector data for setting the telescopic search area TSA when the frame image data n+1 and n+2 are motion-detected as shown by bold broken line arrow in FIG. 33E.

A residual processing data table BT2 (Ar3) results from storing the residual processing data table T2 (Ar1) shown in FIG. 33C in the RAM 5 by the buffering processing. A parenthsized reference symbol Ar3 affixed to BT1 depicts the area in the RAM 5. This residual processing data table TB2 (Ar3) is used to select motion vector data for setting the telescopic search area TSA when the frame image data n+2 and n+3 are motion-detected as shown by bold broken line arrow in FIG. 33E.

A residual processing data table BT3 (Ar2) results from storing the residual processing data table T3 (Ar1) shown in FIG. 33C in the RAM 5 by the buffering processing. A parenthsized reference symbol Ar2 affixed to BT1 depicts the area in the RAM 5. This residual processing data table TB3 (Ar2) is used to select motion vector data for setting the telescopic search area TSA when the frame image data n+3 and n+4 are motion-detected as shown by bold broken line arrow in FIG. 33E.

A residual processing data table BT4 (Ar3) results from storing the residual processing data table T4 (Ar1) shown in FIG. 33C in the RAM 5 by the buffering processing. A parenthsized reference symbol Ar3 affixed to BT4 depicts the area in the RAM 5. This residual processing data table TB4 (Ar3) is used to select motion vector data for setting the telescopic search area TSA when the frame image data n+4 and n+5 are motion-detected as shown by bold broken line arrow in FIG. 33E.

In the following description, these residual processing data table TB1 (Ar2), TB2 (Ar3), TB3 (Ar2), TB4 (Ar3) will hereinafter be referred to as "buffering residual processing data table".

As is clear from the above description, the main residual processing data table T1 (Ar1) to T4 (Ar1) are used to check nominated motion vector data which are nominated in setting the telescopic search area TSA used in the motion detection processing. The buffering residual processing data table TB1 (Ar2), TB2 (Ar3), TB3 (Ar2), TB4 (Ar3) are used to check nominated motion vector data registered in response to target macroblock number data of the same number as those of macroblock number data MNO of the processed macroblock in order to select the nominated motion vector data.

Although the main residual processing data table T1 (Ar1) to T4 (Ar1) are constantly stored in the area Ar1 of the RAM 5, the buffering residual processing data table TB1 (Ar2), TB2 (Ar3), TB3 (Ar2), TB4 (Ar3) are alternately stored in the areas Ar2 and Ar3 of the RAM 5. The RAM control means 8 has to access any one of areas Ar2 and Ar3 of the areas Ar2 and Ar3 of the RAM 5. Therefore, there is used memory pointer data MP indicating that the RAM control means 8 has to access which of the areas Ar2 and Ar3. As earlier noted, this memory pointer data MP is stored in the ROM 4 as parameter data PAL and loaded to a predetermined area of the RAM 5 when the motion detecting circuit is turned on. The processing using the memory pointer data MP will be described below.

A control operation based on the residual processing routine shown in FIG. 11 will be described with reference to FIGS. 34 to 36.

Figure 34:
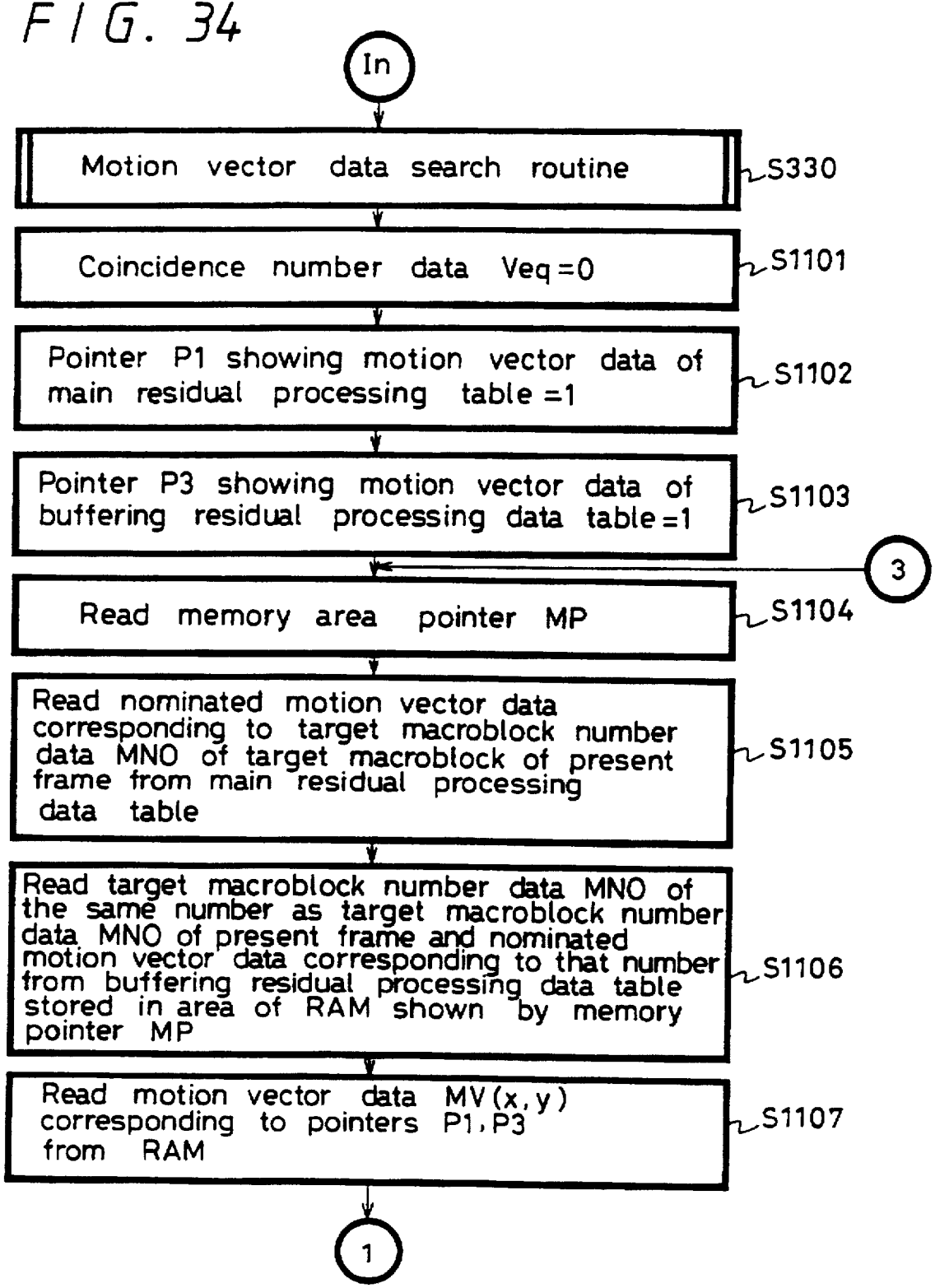
FIG. 34 is a flowchart (third embodiment) used to explain control operation based on the residual processing routine at step S300 in the flowchart of the main routine shown in FIG. 11.
Figure 35:
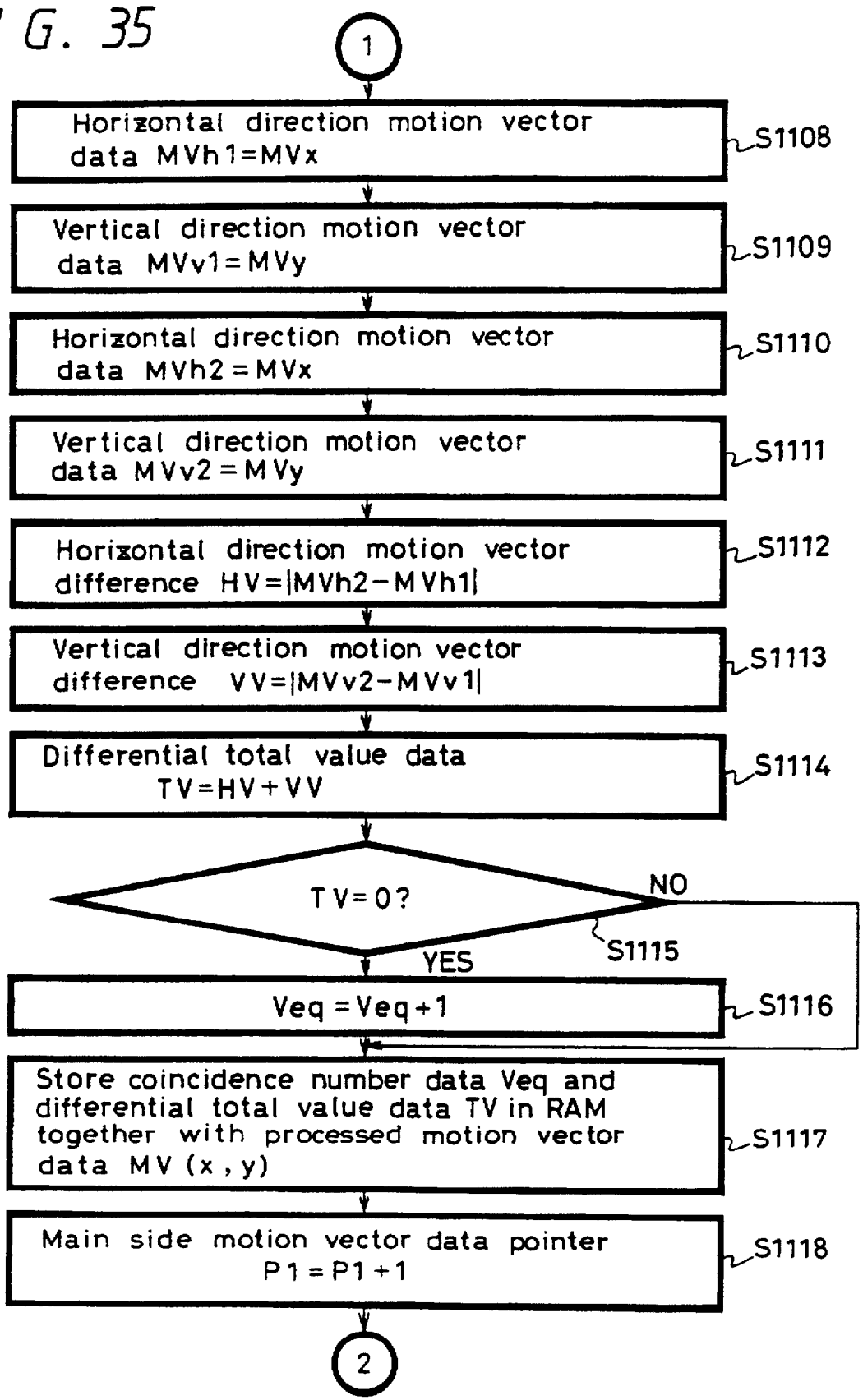
FIG. 35 is a flowchart (third embodiment) used to explain control operation based on the residual processing routine at step S300 in the flowchart of the main routine shown in FIG. 11.
Figure 36:
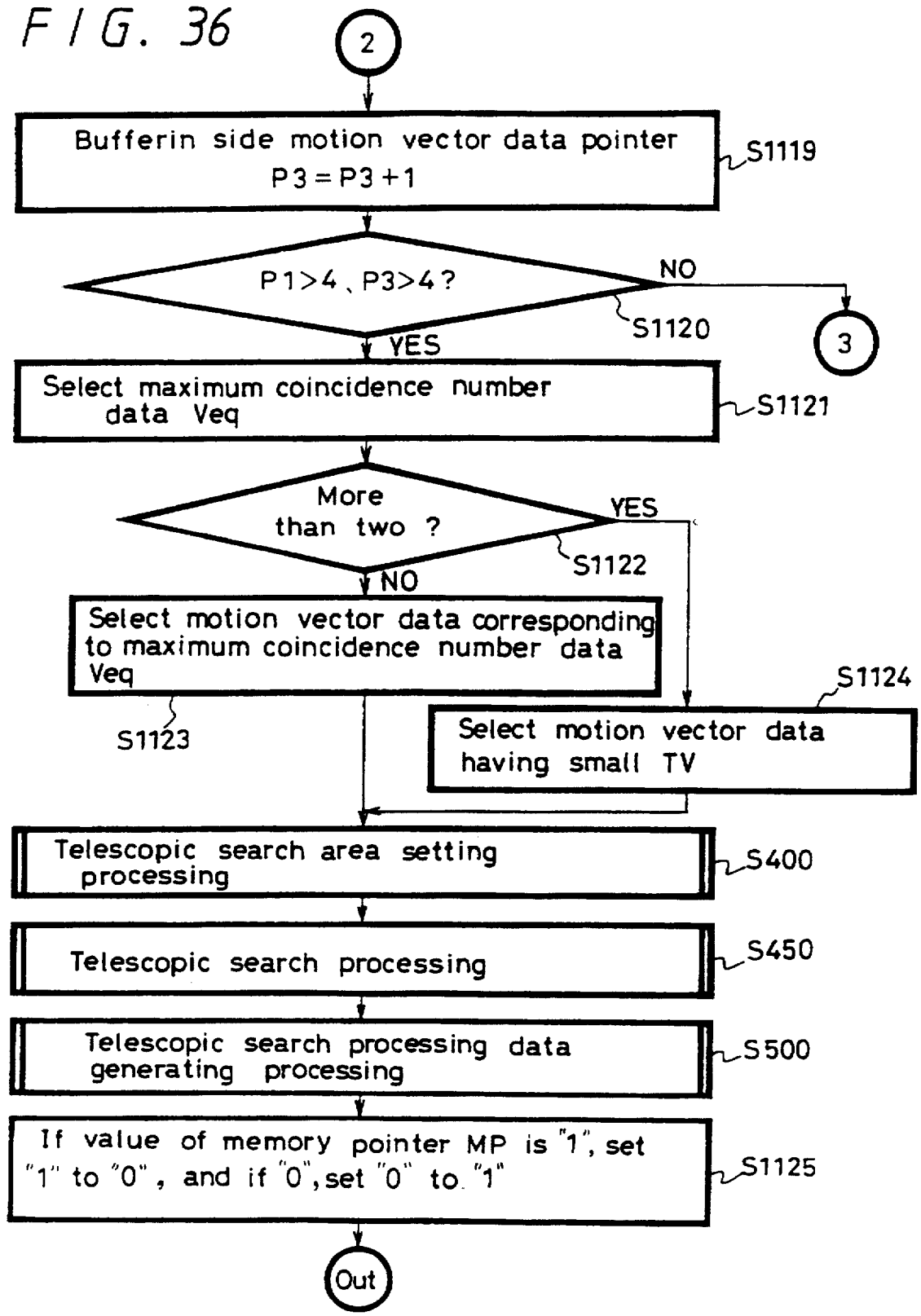
FIG. 36 is a flowchart (third embodiment) used to explain control operation based on the residual processing routine at step S300 in the flowchart of the main routine shown in FIG. 11.

FIGS. 34 to 36 are flowcharts used to explain other example (third embodiment) of the control operation based on the residual processing routine at the step S300 of the flowchart in the main routine shown in FIG. 11. Specifically, FIGS. 34 to 36 are flowcharts used to explain in more detail a manner in which the buffering residual processing data table TB1 (Ar2), TB2 (Ar3), TB3 (Ar2), TB4 (Ar3) are used in the motion vector selecting processing shown in FIG. 33.

In the following description, the main residual processing data table is depicted by TBL1 and the buffering residual processing data table is depicted by TBL2.

In a step S1100, a motion vector data search routine is executed, and control goes to a step S1101. The motion vector data search routine at the step S1100 is the same as the motion vector data search routine shown in FIG. 22.

In the step S1101, the vector selecting means 16 sets the number of motion vector data with values close to each other to "0". Then, control goes to the step S302. The "motion vector data with values close to each other" means that a difference between the values of nominated motion vector data registered on the main residual processing data table TBL1 with respect to the processed target macroblock and values of motion vector data registered on the residual processing data table TBL1 with respect to the target macroblocks surrounding the processed target macroblock is small.

In the step S1102, the vector selecting means 16 supplies pointer data P1 indicative of motion vector data with value "1" to the RAM 5. This pointer data P1 is written in a predetermined area of the RAM 5 in response to the write/read control signal from the RAM control means 8. Then, control goes to a step S1103. This pointer data P1 is pointer data used to read out nominated motion vector data with respect to one target macroblock number data from the main residual processing data table TBL1.

In the step S1103, the vector selecting means 16 supplies pointer data P3 indicative of motion vector data with value "1" to the RAM 5. This pointer data P3 is written in a predetermined area of the RAM 5 in response to the write/read control signal from the RAM control means 8. Then, control goes to a step S1104. This pointer data P3 is pointer data used to read out four nominated motion vector data registered with respect to one target macroblock number data MNO from the buffering residual processing data table TBL2.

In the step S1104, under control of the table control means 12, the RAM control means 8 reads out the memory area pointer data MP from the RAM 5, and the memory area pointer data MP read out from the RAM 5 is supplied to the RAM control means 8. Then, control goes to a step S1105.

In the step S1105, under control of the vector selecting means 16, the RAM control means 8 reads out motion vector data corresponding to the target macroblock of the same number as that of the target macroblock number data MNO of the present frame target macroblock from the main residual processing data table TBL1. The thus read out data are supplied to the vector selecting means 16. Then, control goes to a step S1106.

In the step S1106, under control of the vector selecting means 16, the RAM control means 8 reads out motion vector data corresponding to the target macroblock of the same number as that of the target macroblock number data MNO of the present frame macroblock from the buffering residual processing data table TBL2. The thus read data are supplied to the vector selecting means 16. Then, control goes to a step S1107.

In the step S1107, under control of the vector selecting means 16, the RAM control means 8 reads out motion vector data MV (x, y) corresponding to the pointer data P1 from the main residual processing data table TBL1 of the RAM 5 and also reads out the motion vector data MV (x, y) corresponding to the pointer data P3 from the buffering residual processing data table TBL2. The thus read two motion vector data MV (x, y) are supplied to the vector selecting means 16. Then, control goes to a step S1108.

In order to facilitate the understanding of the present invention, the motion vector data MV (x, y) read out from the main residual processing data table TBL1 of the RAM 5 will be referred to as "main motion vector data", and the motion vector data MV (x, y) read out from the buffering residual processing data table TBL2 of the RAM 5 will be referred to as "buffering motion vector data".

As earlier noted with reference to FIG. 33, there are prepared buffering residual processing data table TBL2 of one step before the present motion detection processing and of two steps before the present motion detection processing, and these two buffering residual processing data tables TBL2 are alternately stored in the two areas of the RAM 5. Therefore, the RAM control means 8 has to select any one of the buffering residual processing data tables TBL2 used in the motion vector data selecting processing. Data used for such selection is the memory pointer data MP read out by the RAM control means 8 under control of the table control means 12 in the step S1104. The content of the memory pointer data MP is rewritten at a step S1124 which will be described later on.

In the step S1108, the vector selecting means 16 stores the main motion vector data MVx supplied from the RAM 5 as horizontal direction main motion vector data MVh1. Then, control goes to a step S1109.

In the step S1109, the vector selecting means 16 stores the main motion vector data MVy supplied from the RAM 5 as vertical direction main motion vector data MVv1. Then, control goes a step S1110.

In the step S1110, the vector selecting means 16 stores the buffering motion vector data MVx supplied from the RAM 5 as horizontal direction buffering motion vector data MVh2. Then, control goes to a step S1111.

In the step S1111, the vector selecting means 16 stores the buffering motion vector data MVy supplied from the RAM 5 as vertical direction buffering motion vector data MVv2. Then, control goes a step S1112.

In the step S1112, the vector selecting means 16 subtracts the main motion vector data MVh1 from the buffering motion vector data MVh2, changes the subtracted result to the absolute value and obtains horizontal direction motion vector differential data HV. Then, control goes to a step S1113.

In the step S1113, the vector selecting means 16 subtracts the main motion vector data MVv1 from the buffering motion vector data MVv2, changes the subtracted result into the absolute value, and obtains vertical direction motion vector differential data VV. Then, control goes to a step S1114.

In the step S1114, the vector selecting means 16 obtains differential total value data TV by adding the horizontal direction motion vector differential data HV obtained at the step S1112 and the vertical direction motion vector differential data VV obtained at the step S1113, and supplies the differential total value data TV to the judging means 17. Then, control goes to a step S1115.

In the step S1115, the judging means 16 determines whether or not the differential total value data TV from the vector selecting means 16 is larger than "0". If "YES" is outputted, then control goes to a step S1116. If "NO" is outputted, then control goes to a step S1117.

In the step S1116, the judging mean 17 supplies the value of differential total value data TV of "0", whereby the vector selecting means 16 adds "1" to the coincidence number data Veq. Then, control goes to a step S1117.

In the step S1117, the vector selecting means 16 supplies the coincidence number data Veq obtained at the step S1116 and the differential total value data TV obtained at the step S1114 to the RAM 5 together with the main motion vector data MV (x, y) shown by the pointer data P1. Under control of the vector selecting means 16, the RAM control means 8 supplies the write/read control signal to the RAM 5, whereby the coincidence number data Veq, the differential total value data TV and the main motion vector data MV (x, y) are stored in the predetermined areas of the RAM 5.

In a step S1118, the vector selecting means 16 adds "1" to the pointer data P1 indicative of the main motion vector data, and supplies new pointer data P1 with "1" added thereto to the RAM 5. The pointer data P1 supplied to the RAM 5 is stored in the predetermined area of the RAM 5 in response to the write/read control signal from the RAM control means 8. Then, control goes to a step S1119.

In the step S1119, the vector selecting means 16 adds "1" to the pointer data P3 indicative of the buffering motion vector data, and supplies new pointer data P3 with "1" added thereto to the RAM 5. The pointer data P3 supplied to the RAM 5 is stored in the predetermined area of the RAM 5 in response to the write/read control signal from the RAM control means 8. Then, control goes to a step S1120.

In the step S1120, under control of the judging means 17, the RAM control means 8 reads out the pointer data P1 indicative of the main motion vector data and the pointer data P3 indicative of the buffering motion vector data from the RAM 5. The pointer data P1 and P3 read out are supplied to the judging means 17. The judging means 17 determines whether or not the pointer data P1 and P3 supplied from the RAM 5 are both greater than "4". If "YES" is outputted, then control goes to a step S1122. If "NO" is outputted, then control goes back to the step S1104 in the flowchart shown in FIG. 34.

In the step S1121, under control of the vector selecting means 16, the RAM control means 8 reads out coincidence number data Veq indicative of the number of coincident motion vector data obtained with respect to nominated motion vector data from the RAM 5. The coincidence number data Veq thus read out are supplied to the vector selecting means 16. The vector selecting means 16 selects the maximum coincidence number data Veq from the coincidence number data supplied from the RAM 5 and supplies the thus selected coincidence number data Veq to the judging means 17. Then, control goes to a step S1122.

In the step S1122, the judging means 17 determines whether or not there are more than two coincidence number data Veq from the vector selecting means 16. If "YES" is outputted, then control goes to a step S1123. If "NO" is outputted, then control goes to a step S1124.

In the step S1123, the vector selecting means 16 selects the main motion vector data corresponding to the maximum coincidence number data Veq selected at the step S1122. Then, control goes to the step S400.

In the step S1124, under control of the vector selecting means 16, the RAM control means 8 reads out differential total value data TV corresponding to the coincidence number data Veq from the RAM 5. More than thus read out two differential total value data TV are supplied to the motion vector selecting means 16. The motion vector selecting means 16 selects the minimum differential total value data from the more than two differential total value data supplied from the RAM 5, selects the coincidence number data Veq corresponding to the selected differential total value data TV, and selects the main motion vector data corresponding to the coincidence number data Veq. Then, the vector selecting means 16 supplies the selected main motion vector data to the address calculating means 13. After the above processing, control goes to the step S400.

In the step S400, the telescopic search area TSA is set by the telescopic search area TSA setting processing routine. Then, control goes to a step S450.

In the step S450, the telescopic search processing is executed by the telescopic search processing routine, and control goes to a step S500.

In the step S500, the telescopic search processing data generating processing is executed by the telescopic search processing data generating processing routine. Control goes to a step S599 of a flowchart of a main routine shown in FIG. 11.

The main motion vector data searched as nominated motion vector data are compared with the buffering motion vector data searched as nominated motion vector data registered with respect to the target macroblock of the past buffering residual processing data table TBL2 by a series of processing from the respective steps in the flowcharts shown in FIGS. 34 to 36, and coincidence between them and the buffering motion vector data of the past target macroblock is evaluated. The evaluated results are contents of the RAM shown in FIG. 19.

If "YES" is outputted at the step S1120 in the flowchart shown in FIG. 36, then the evaluation by comparing the main motion vector data searched as the nominated motion vector data and the buffering motion vector data of the target macroblock of the buffering residual processing data table TBL2 searched as the nominated motion vector data has been finished. Therefore, as shown in FIG. 23, main motion vector data MVn (x, y), . . . , serving as the nominated motion vector data, differential total value data TVn, . . . , and coincidence number data Veqn, . . . , corresponding to these main motion vector data MVn (x, y) are stored in the RAM 5. The case that there are more than two maximum coincidence number data Veq was already described with reference to the flowchart of FIG. 21 and need not be described. If such description is replaced with the description of this embodiment, "motion vector data" is replaced with "main motion vector data".

As described above, after the optimum motion vector data for setting the telescopic search area TSA corresponding to the target macroblock to be processed has been obtained, the setting processing for setting the telescopic search area TSA is executed.

Effects of the third embodiment will be described. When one motion vector data is selected from the nominated motion vector data, since the number of the nominated motion vector data coincident with the nominated motion vector data registered on the past residual processing data table TBL2 is detected and nominated motion vector data with highest coincidence is selected, motion vector data with a correlation with respect to the moving state of the moving object within the past frame can be selected. Therefore, the motion vector data in which the telescopic search area TSA is set by use of the selected motion vector data and the motion detection is carried out by use of such telescopic search area TSA becomes accurate considerably. When a motion compensation is executed by this motion vector data and a difference is obtained based on the motion-compensated macroblock and the encoded macroblock, the data amount can be made smallest, and the encoding efficiency can be improved considerably. The above-mentioned effects can be achieved in addition to the effects achieved when the motion vector is selected in the first embodiment.

The effects in the second embodiment differ from those of the third embodiment are as follows: In the second embodiment, since the motion vector data of all the target macroblocks of the residual processing data table TBL1 obtained by the motion detection processing of one step before are used, this is referred to as "motion detection between two frames". On the other hand, in the third embodiment, as shown in FIG. 33, nominated motion vector data of two steps before are used. Accordingly, when one motion vector data is selected from the nominated motion vector data, since nominated motion vector data are compared with the nominated motion vector data registered on the residual processing data table TBL1 of two steps before, the number of the processing steps of the third embodiment is smaller than that of the second embodiment and the third embodiment is more advantageous from a time standpoint.

However, in the second embodiment, when one motion vector data is selected from the nominated motion vector data, the nominated motion vector data are compared with the motion vector data of all target macroblocks located within the residual processing data table TBL. Therefore, from a standpoint of detection accuracy limited to the two frames, the second embodiment is more advantageous from an accuracy standpoint.

On the other hand, according to the third embodiment, when one motion vector data is selected from the nominated motion vector data, the motion vector data are compared with the nominated motion vector data -registered on the residual processing data table TBL1 obtained in the motion detection of two steps before. Therefore, from a standpoint of detection accuracy limited to the three frames, the third embodiment is more advantageous from an accuracy standpoint.

A fourth embodiment will be described.

A control operation based on the residual processing routine shown in FIG. 11 will be described with reference to FIGS. 37 and 38.

Figure 37:
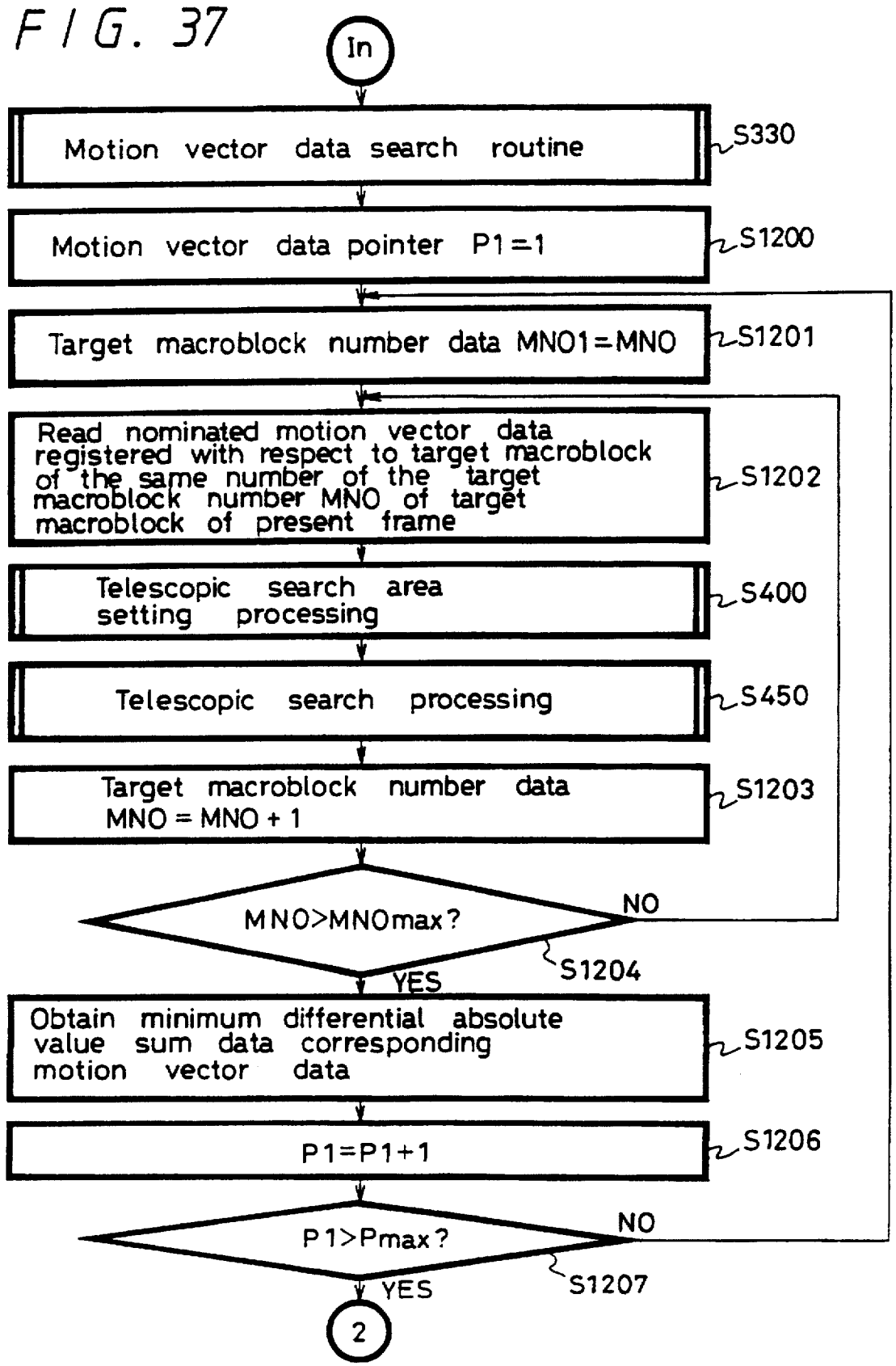
FIG. 37 is a flowchart (fourth embodiment) used to explain control operation based on the residual processing routine at step S300 in the flowchart of the main routine shown in FIG. 11.
Figure 38:
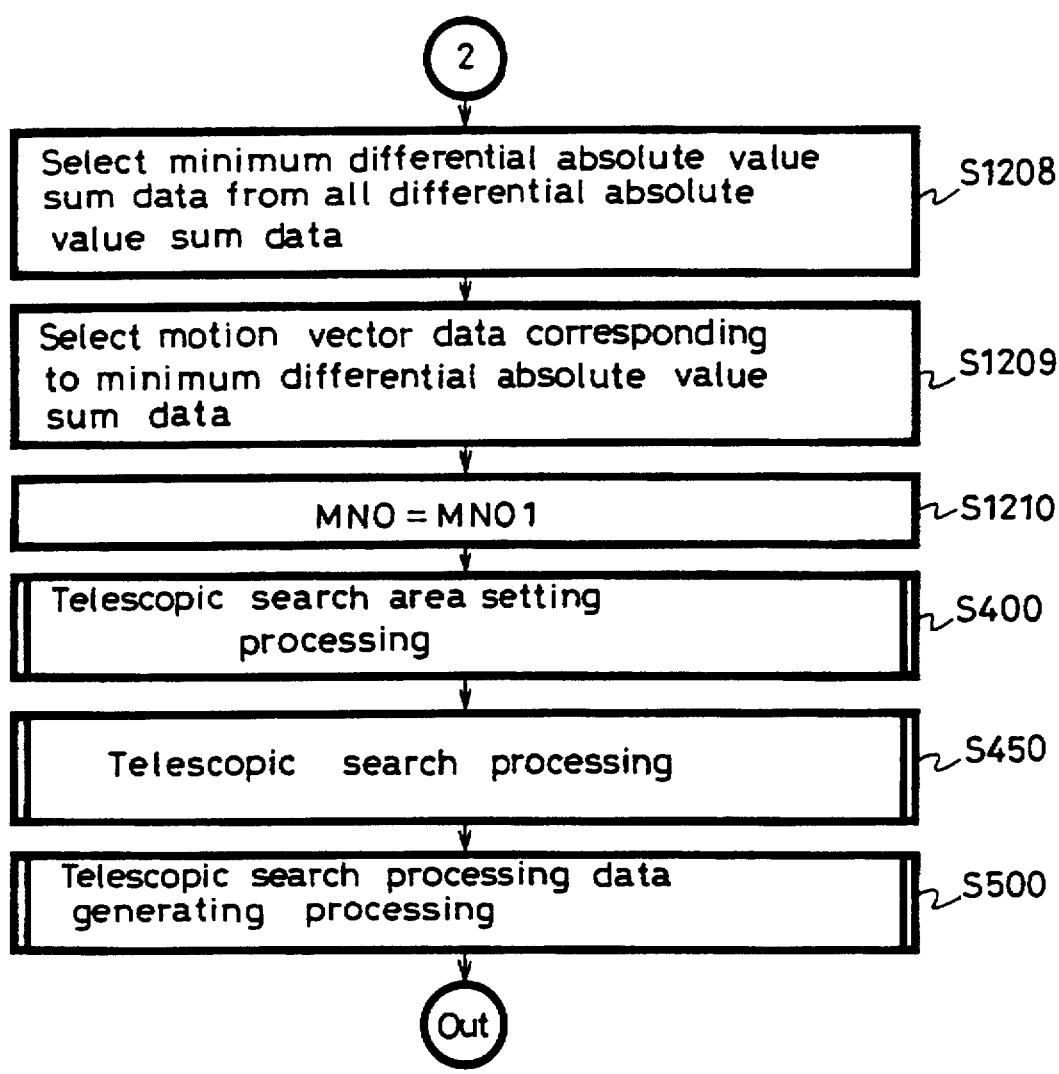
FIG. 38 is a flowchart (fourth embodiment) used to explain control operation based on the residual processing routine at step S300 in the flowchart of the main routine shown in FIG. 11.

FIGS. 37 and 38 are flowcharts used to explain other example (fourth embodiment) of control operation based on the residual processing routine shown in FIGS. 19 to 21. The first and fourth embodiments differ from each other in control operation based on the residual processing routine. In the third to three embodiments, the optimum motion vector data for setting the telescopic search area TSA is selected from the nominated motion vector data based on the results obtained when the nominated motion vector data are evaluated variously. However, in the fourth embodiment, telescopic search areas are sequentially set based on the nominated motion vector data and the motion detection processing is executed by the set telescopic search areas. Then, a motion vector detecting circuit 330 selects resultant motion vector data based on minimum differential absolute value sum data of N minimum differential absolute value sum data obtained when the motion detection is executed N times by the telescopic search area, address data of the telescopic macroblock in which absolute value data could be obtained and address data of target macroblock.

In the fourth embodiment, target macroblock number data of target macroblocks surrounding the processed target macroblock need not be registered in the residual processing data table TBL1. Further, in the fourth embodiment, the coincidence number data Veq and the differential total value data TV need not be registered on the table shown in FIG. 23. These data are not used in the fourth embodiment.

In a step S330, the processing based on the motion vector data search routine is executed, and control goes to a step S1200. The motion vector data search routine at the step S330 is the same as the motion vector data search routine shown in FIG. 22.

In the step S1200, the vector selecting means 16 supplied the pointer data P1 indicative of the motion vector data of "1" to the RAM 5. This pointer data P1 is stored in the predetermined area of the RAM 5 in response to the write/read control signal from the RAM control means 8. Then, control goes to a step S1201. The pointer data P1 is pointer data used to read out the nominated motion vector data searched by the motion vector data search routine.

In the step S1201, under control of the table control means 12, the RAM control means 8 reads target macroblock number data MNO from the RAM 5. The target macroblock number data MNO read out from the RAM 5 is supplied to the table control means 12. The table control means 12 obtains the target macroblock number data MNO based on the target macroblock number data MNO supplied from the RAM 5 and stores the value of the target macroblock number data MNO as MNO1. Then, control goes to a step S1202.

In the step S1202, under control of the vector selecting means 16, the RAM control means 8 reads out the nominated motion vector data indicated by the pointer data P1. The nominated motion vector data read out is supplied to the address calculating means 13 as the selected motion vector data. Then, control goes to the step S400.

In the step S400, the telescopic search area TSA is set by the telescopic search area TSA setting processing routine. Then, control goes to the step S450.

In the step S450, the telescopic search processing is carried out by the telescopic search processing routine. Then, control goes to as step S1203.

In the step S1203, the table control means 12 adds "1" to the target macroblock number data MNO. Then, control goes to a step S1204.

In the step S1204, under control of the judging means 17, the RAM control means 8 supplies the write/read control means including address data indicating storage areas of the target macroblock number data MNO and maximum value data MNOmax of the target macroblock, whereby the target macroblock number data MNO and the maximum value data MNOmax of the target macroblock number are read out from the RAM 5. The judging means 17 determines whether or not the target macroblock number data MNO is greater than the maximum value data MNOmax of the target macroblock number. If "YES" is outputted, then control goes to a step S1205. If "NO" is outputted, then control goes back to the step S1202.

In the step S1205, under control of the vector selecting means 16, the minimum value detecting means 329 supplies minimum differential absolute value sum data through the I/O port 6 and bus 3 to the RAM 5. On the other hand, under control of the vector selecting means 16, the RAM control means 8 supplied the write/read control signal to the RAM 5, whereby the minimum differential absolute value sum data supplied to the RAM 5 is stored in the predetermined area of the RAM 5. Under control of the vector selecting means 16, the motion vector detecting means 330 supplies the minimum differential absolute value sum data, address data of the telescopic macroblock in which the differential absolute value sum data could be obtained and the motion vector data based on the address data of the target macroblock though the I/O port 6 and the bus 3 to the RAM 5.

On the other hand, under control of the vector selecting means 16, the RAM control means 8 supplied the write/read control signal to the RAM 5, whereby the motion vector data supplied to the RAM 5 is stored in the predetermined area of the RAM 5. Incidentally, the motion vector data is not outputted from the output terminal 331 under control of the motion vector selecting means 16. Then, control goes to a step S1206. The motion vector thus obtained is used to select one motion vector data from the nominated motion vector data.

In the step S1206, the vector selecting means 16 adds "1" to the pointer data PI indicative of the motion vector data and supplies new pointer data P1 with "1" added thereto to the RAM 5. The pointer data P1 supplied to the RAM 5 is stored in the predetermined area of the RAM 5 in response to the write/read control signal from the RAM control means 8. Then, control goes to a step S1207.

In the step S1207, under control of the judging means 17, the RAM control mean 8 reads out the pointer data P1 indicative of the motion vector data from the RAM 5, and the thus read out pointer data P1 is supplied to the judging means 17. The judging means 17 determines whether or not the pointer data PI supplied from the RAM 5 is greater than the Pmax. If "YES" is outputted, then control goes to a step S1207 in the flowchart shown in FIG. 38. If "NO" is outputted, then a control goes to a step S1201.

As is clear from the description of S1207, in this residual processing routine, telescopic search areas TSA are set in the reference frame memory 323 by use of the nominated motion vector data shown in FIG. 23. A motion detection is effected on the target macroblock of the present frame memory 321 and the telescopic macroblocks located within the N telescopic search areas TSA and N minimum differential absolute value data and N motion vector data corresponding to the N minimum differential absolute value sum data are obtained.

In the step S1208, under control of the vector selecting means 16, the RAM control means 8 reads out N minimum differential absolute value sum data and N motion vector data corresponding to the N differential absolute value sum data from the RAM 5. The N minimum differential absolute value sum data and the N motion vector data corresponding to the N minimum differential absolute value sum data read out from the RAM 5 are supplied to the vector selecting means 16. The vector selecting means 16 selects the minimum differential absolute value sum data from the N minimum differential absolute value sum data supplied from the RAM 5 and stores the thus selected minimum differential absolute value sum data. Then, control goes to a step S1209.

In the step S1209, the vector selecting means 16 selects the minimum differential absolute value sum data thus selected at the step S1208, address data of the telescopic macroblock in which the differential absolute sum value data could be obtained and motion vector data based on the address data of the target macroblock. Then, the vector selecting means 16 supplies the selected motion vector to the calculating means 13. Then, control goes to a step S1210.

In the step S1210, the table control means 12 supplies the stored macroblock number data MN01 to the RAM 5. Under control of the table control means 12, the RAM control means 8 supplies the write/read control signal including address data indicative of the area in which the macroblock number data MNO should be stored to the RAM 5, whereby the target macroblock number data MNO becomes the content of the target macroblock number data MN01 obtained at the time this routine is started. After the above-mentioned processing, control goes to the step S400. The reason that the value of the target macroblock number data MNO1 is set to the value of the target macroblock number is similar to that in the residual processing data generating processing routine in the flowcharts shown in FIG. 17 and 18.

In the step S400, the telescopic search area TSA is set by the telescopic search area TSA setting processing routine. Then, control goes to the step S450.

In the step S450, the telescopic search processing is executed by the telescopic search processing routine. Then, control goes to a step S500.

In the step S500, the telescopic search processing data is generated by the telescopic search processing data generating processing routine. Then, control goes to a step S599 in the flowchart of the main routine shown in FIG. 11. In the step S500, although the processed area of the reference frame memory 323 is the telescopic search area TSA, the content of the processing thereof is the same as that of the residual processing data generating processing routine of the step S150 in the flowchart of the main routine shown in FIG. 11. Therefore, the illustration and description of the telescopic search processing data generating processing routine are replaced with the flowcharts and description of the residual processing data generating processing routine shown in FIGS. 17 and 18.

Effects of the fourth embodiment will be described below.

As described above, according to this embodiment, the telescopic search areas TSA are set in the reference frame memory 323 by the nominated motion vector data shown in FIG. 23, the motion detection is sequentially effected on the target macroblock of the present frame memory 321 and the telescopic macroblocks located within the N telescopic search area TSA. There are obtained N minimum differential absolute value sum data and N motion vector data corresponding to the N minimum differential absolute value sum data. The minimum differential absolute value sum data is selected from the N minimum differential absolute value sum value data, and the selected differential absolute value sum data, address data of the telescopic macroblock in which the above differential absolute value sum data could be obtained and the motion vector data based on the address data of the target macroblock are selected. Therefore, the motion vector data with small residual value can be selected reliably.

Accordingly, the motion vector data which results from setting the telescopic search areas TSA using the selected motion vector data and executing a motion detection by use of the telescopic search areas TSA becomes more accurate compared with the processing in the first, second and third embodiments. When a motion compensation is carried out by use of this motion vector data and a differential value is obtained by the motion-compensated macroblock and the encoded macroblock, the data amount can be made smallest, thereby improving the encoding efficiency considerably. The above-mentioned effects can be achieved in addition to the effects achieved when the motion vector is selected according to the first embodiment.

In this embodiment, since the motion detection based on the telescopic search processing of N times is executed by use of the motion vector data of the target macroblock within the reverse area, the processing according to the third embodiment is more advantageous from a time standpoint. According to this embodiment, the motion vector data with minimum residual value can be selected reliably, and motion detection with high accuracy can be executed.

A control operation based on the residual processing routine shown in FIG. 11 will be described with reference to FIGS. 39 and 40.

Figure 39:
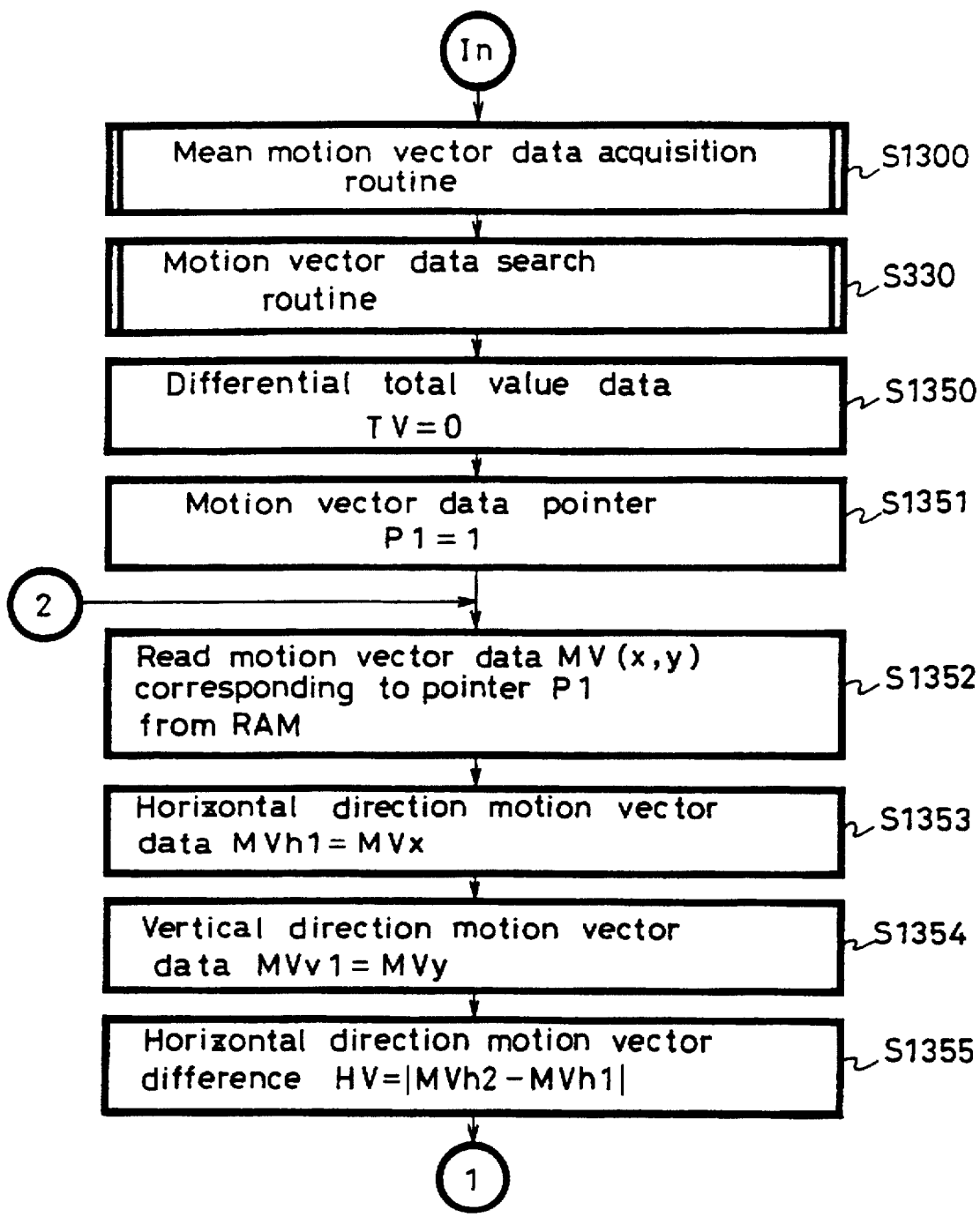
FIG. 39 is a flowchart (fifth embodiment) used to explain control operation based on the residual processing routine at step S300 in the flowchart of the main routine shown in FIG. 11.
Figure 40:
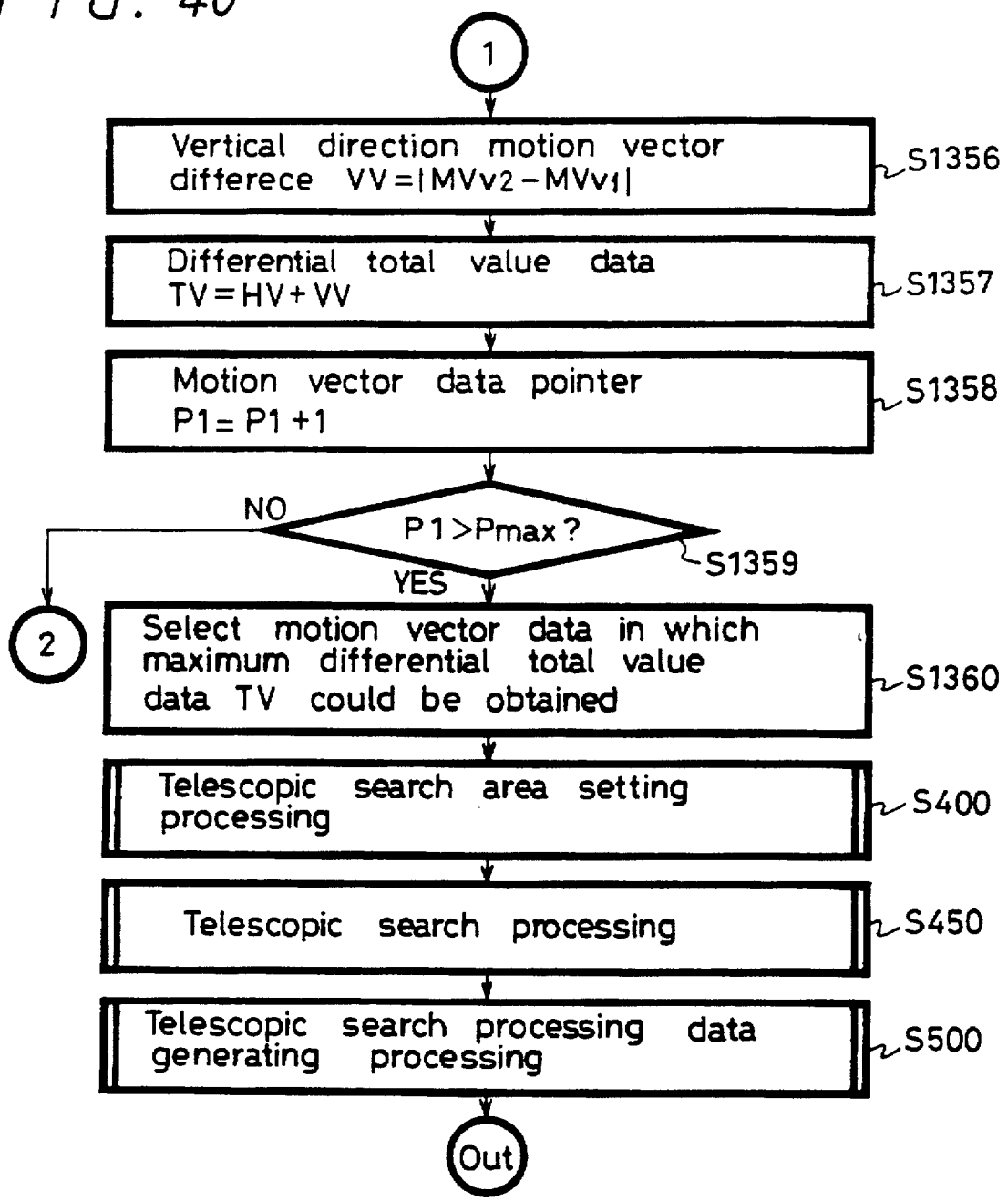
FIG. 40 is a flowchart (fifth embodiment) used to explain control operation based on the residual processing routine at step S300 in the flowchart of the main routine shown in FIG. 11.
Figure 41:
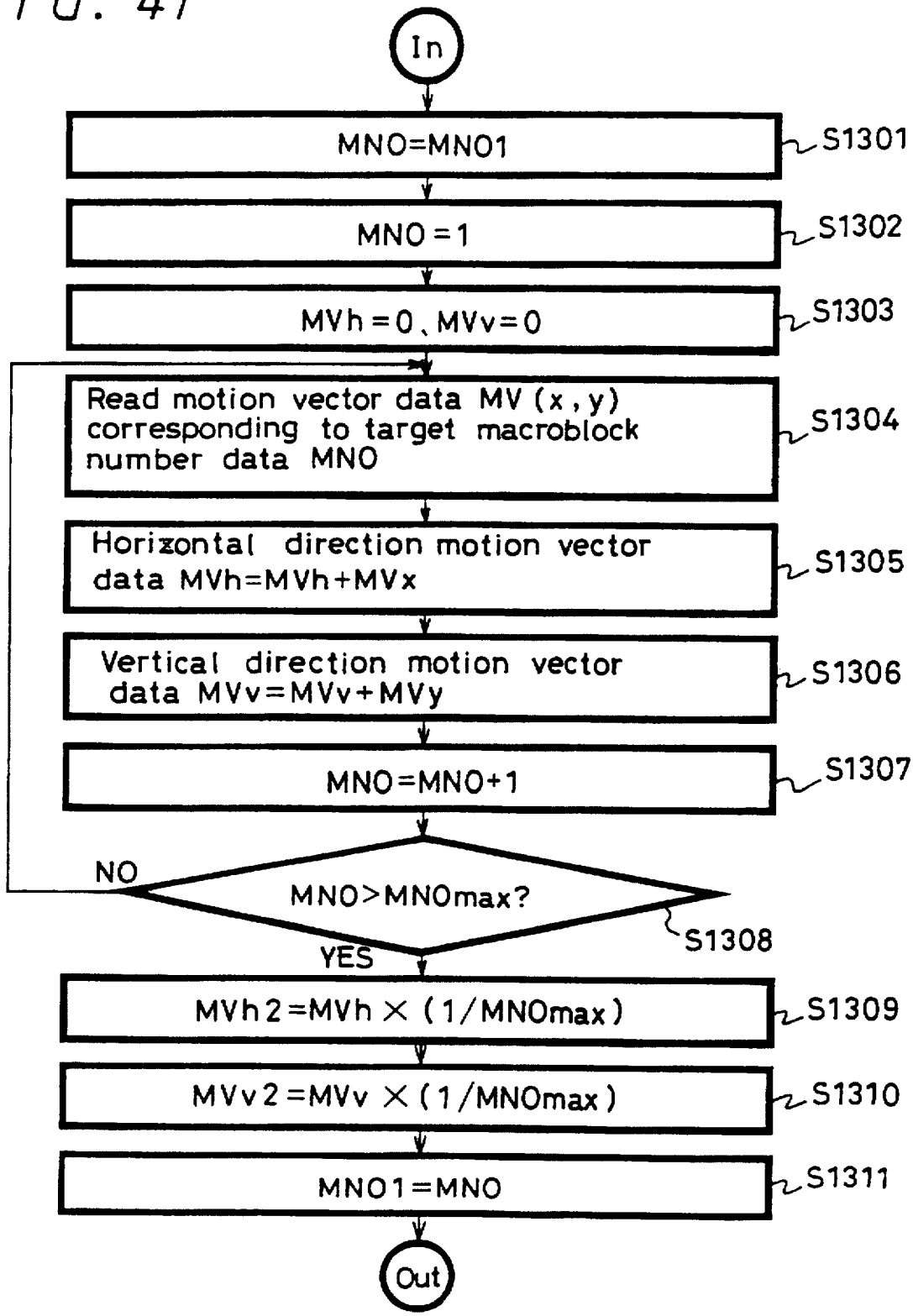
FIG. 41 is a flowchart (fifth embodiment) used to explain control operation based on a mean motion vector data acquisition routine at step S1300 in the flowchart of the residual processing routine shown in FIG. 39.

FIGS. 39 and 40 are flowcharts used to explain the control operation of other example (fifth embodiment) of the residual processing routine shown in FIG. 11. In the fifth embodiment, a mean value of motion vector data in all target macroblocks registered on the residual processing data table TBL1, i.e., mean motion vector data which is a mean value of direction and moving amount is obtained, and nominated motion vector data closest to the means motion vector data is selected from the nominated motion vector data.

In the fifth embodiment, target macroblock number data of target macroblocks surrounding a processed target macroblock need not be registered in the residual processing data table TBL1. Further, in the fifth embodiment, the differential total value data TV need not be registered on the table shown in FIG. 23 because these data are not used in the fifth embodiment.

In a step S1300, the processing bas ed on a mean motion vector data acquisition routine is executed. Then, control goes to the step S330. This mean motion vector data acquisition routine will be described more fully later on with reference to FIG. 41.

In the step S330, the processing based on the motion vector search routine is executed. Then, control goes to a step S1350. The motion vector data search routine at the step S330 is the same as the motion vector data search routine shown in FIG. 22.

In the step S1350, the vector selecting means 16 supplies the data of "0" to the RAM 5. Under control of the vector selecting means 16, the RAM control means supplies the write/read control signal including address data indicating the whole storage area of the differential total value data TV, whereby the values of all differential total value data TV stored in the RAM 5 are set to "0". Then, control goes to a step S1351. The number of the storage areas of the differential total value data is Pmax which is the number of nominated motion vector data. The processing in the step S1350 is to initialize the storage area of the differential total value data.

In the step S1351, the vector selecting means 16 supplied the data of "1" to the RAM 5. Under control of the vector selecting means 16, the RAM control means supplies the write/read control signal including address data indicating the storage area of the address pointer data P1 of the residual processing data table, whereby the value of the pointer data P1 stored in the RAM 5 is set to "1". Then, control goes to a step S1352.

In the step S1352, under control of the vector selecting means 16, the RAM control means 8 reads out motion vector data MV (x, y) corresponding to the pointer data P1 from nominated motion vector data registered on the table of the RAM 5. The motion vector data MV (x, y) read out from the RAM 5 is supplied to the vector selecting means 16. Then, control goes to a step S1353.

In the step S1353, the vector selecting means 16 stores the motion vector data MVx supplied from the RAM 5 as horizontal motion vector data MVh1. Then, control goes to a step S1354.

In the step S1354, the vector selecting means 16 stores the motion vector data MVy supplied from the RAM 5 as vertical motion vector data MVv1. Then, control goes to a step S1355.

In the step S1355, the vector selecting means 16 subtracts the motion vector data MVh1 from the mean motion vector data MVh2, changes the subtracted result to the absolute value, and obtains horizontal direction motion vector differential data HV. Then, control goes to a step S1356 in the flowchart shown in FIG. 40.

In the step S1356, the vector selecting means 16 subtracts the motion vector data MVv1 from the mean motion vector data MVv2, changes the subtracted result into the absolute value, and obtains vertical direction motion vector differential data VV. Then, control goes to a step S1357.

In the step S1357, the vector selecting means 16 obtains the differential total value data TV by adding the horizontal direction motion vector differential data HV obtained at the step S1355 and the vertical direction motion vector differential data VV obtained at the step S1356, and supplies the differential total value data TV to the judging means 17. Then, control goes to a step S1358.

In the step S1358, the vector selecting means 16 add "1" to the pointer data P1 indicative of motion vector data, and supplies new pointer data with "1" added thereto to the RAM 5. The pointer data P1 supplied to the RAM 5 is stored in the predetermined area of the RAM 5 in response to the write/read control signal from the RAM control means 8. Then, control goes to a step S1359.

In the step S1359, under control of the judging means 17, the RAM control means 8 reads out the pointer data P1 indicative of the motion vector data. The pointer data P1 read out from the RAM 5 is supplied to the judging means 17. The judging means 17 determines whether or not the pointer data P1 supplied from the RAM 5 is greater than Pmax. If "YES" is outputted, then control goes to a step S1360. If "NO" is outputted, then control goes back to the step S1352 in the flowchart shown in FIG. 39.

As is clear from the description of the step S1362, in the residual processing routine, the differential total values of mean motion vector data are obtained with respect to the Pmax nominated motion vector data, and nominated motion vector data with minimum differential total value is selected. Then, the telescopic search areas TSA is set in the reference frame memory 323 by using the selected motion vector data, and a motion detection is sequentially effected on the target macroblock of the present frame memory 321 and the telescopic macroblock located within the telescopic search area TSA. Then, motion vector data is obtained based on the motion-detected result.

In the step S400, the telescopic search area TSA is set by the telescopic search area TSA setting processing routine. Then, control goes to the step S450.

In the step S450, the telescopic search processing is executed by the telescopic search processing routine.

In the step S500, the telescopic search processing data is generated by the telescopic search processing data generating processing routine. Then, control goes to a step S599 in the flowchart of the main routine shown in FIG. 11. In the step S500, although the area located within the target reference frame memory 323 is the telescopic search area TSA, the content of the processing thereof is the same as that of the residual processing data generating processing routine at the step S150 in the flowchart of the main routine shown in FIG. 11. Therefore, the illustration and description of the telescopic search processing data generating processing routine are replaced with the flowcharts and description of the residual processing data generating processing routine shown in FIGS. 17 and 18.

As the nominated motion vector data, there is detected motion vector data which is closest to the mean motion vector data from the nominated motion vector data by a series of processing from the steps S1351 to S1360. As a result, a coincidence within the frames of the motion vector data is evaluated. The evaluated result is the content of the RAM shown in FIG. 23. However, in the fifth embodiment, the coincidence number data Veq is not used but only the differential total value data is used.

Specifically, in the step S1359 of the flowchart shown in FIG. 40, if "YES" is outputted, then the evaluation by comparing the nominated motion vector data and the mean motion vector data was already finished. Therefore, as shown in FIG. 23, nominated motion vector data MVn, . . . , and differential total value data TVn, . . . , corresponding to these nominated motion vector data MVn (x, y) are stored in the RAM 5.

As earlier noted, the vector selecting means 16 selects the maximum differential total value data TVn, . . . from the differential total value data TVn stored in the RAM 5, and selects the motion vector data MVn, . . . , corresponding to the selected differential total value data TVn, . . .

After the optimum motion vector data for setting the telescopic search area TSA corresponding to the processed target macroblock has been obtained by the above-mentioned processing, the setting processing of the telescopic search area TSA is executed.

A control operation based on the mean motion vector data acquisition routine shown in FIG. 39 will be described with reference to FIG. 41.

FIG. 41 is a flowchart used to explain the operation based on the mean motion vector data acquisition routine of the step S1300 in the flowchart shown in FIG. 39.

In a step S1301, under control of the table control means 12, the RAM control means 8 reads out the target macroblock number data MNO from the RAM 5. The target macroblock number data MNO read out from the RAM 5 is supplied to the table control means 12. The table control means 12 obtains the target macroblock number data MNO based on the target macroblock number data MNO supplied from the RAM 5 and stores the value of the target macroblock number data MNO as MNO1. Then, control goes to a step S1302.

In the step S1302, the vector selecting means 16 supplies the data of "1" to the RAM 5. Under control of the vector selecting means 16, the RAM control means 8 supplies the read/write control signal including address data indicating the storage area of the target macroblock number data MNO to the RAM 5, whereby target macroblock number data MNO of value "1" is stored in the RAM 5. Then, control goes to a step S1303.

In the step S1303, the vector selecting means 16 supplies data of "0" to the RAM 5. Under control of the vector selecting means 16, the RAM control means 8 supplies the read/write control signal including address data indicating the storage area of the horizontal motion vector data MVh and the vertical motion vector data MVb to the RAM 5, whereby "0" is stored in the RAM 5 at its storage areas of the horizontal and vertical motion vector data MVh and MVv. Then, control goes to a step S1304.

In the step S1304, under control of the vector selecting means 16, the RAM control means 8 reads out the target macroblock number data MNO from the RAM 5. The target macroblock number data MNO read out from the RAM 5 is supplied to the table control means 12. When the table control means recognizes the target macroblock number data MNO supplied from the RAM 5, the table control means 12 controls the RAM control means 8 such that motion vector data MV (x, y) registered with respect to the target macroblock number data MNO from the residual processing data table TBL1 of the RAM 5. The motion vector data MV (x, y) read out from the RAM 5 is supplied to the vector selecting means 16. Then, control goes to a step S1305.

In the step S1305, under control of the vector selecting means 16, the RAM control means 8 reads out the horizontal direction motion vector data MVh from the RAM 5. The horizontal direction motion vector data MVh read out from the RAM 5 is supplied to the vector selecting means 16. The vector selecting means adds the horizontal direction motion vector data MVh and the motion vector data MVx and supplies an added result to the RAM 5 and controls the RAM control means 8. Under control of the vector selecting means 16, the RAM control means 8 supplies the read/write control signal including address data indicating the storage area of the horizontal direction motion vector data MVh to the RAM 5, whereby the horizontal direction motion vector data MVh from the vector selecting means 16 is stored in the RAM 5. Then, control goes to a step S1306.

In the step S1306, under control of the vector selecting means 16, the RAM control means 8 reads out vertical direction motion vector data MVv from the RAM 5. The thus read vertical direction motion vector data MVv is supplied to the vector selecting means 16. The vector selecting means 16 adds the vertical direction motion vector data MVv and the motion vector data MVy, supplies an added result to the RAM 5 and controls the RAM control means 8. Under control of the vector selecting means 16, the RAM control means 8 supplies the read/write control signal including address data indicating the storage area of the vertical direction motion vector data MVv to the RAM 5, whereby the vertical direction motion vector data MVv from the vector selecting means 16 is stored in the RAM 5. Then, control goes to a step S1307.

In the step S1307, under control of the vector selecting means 16, the RAM control means 8 reads out the target macroblock number data MNO from the RAM 5. The thus read target macroblock number data MNO is supplied to the vector selecting means 16. The vector selecting means 16 adds "1" to the target macroblock number data MNO, supplies the target macroblock number data MNO with "1" added thereto to the RAM 5 and control the RAM control means 8. Under control of the vector selecting means 16, the RAM control means 8 supplies the read/write control signal including address data of the storage area of the target macroblock number data MNO to the RAM 5, whereby the target macroblock number data MNO from the vector selecting means 16 is stored in the RAM 5. Then, control goes to a step S1308.

In the step S1308, under control of the judging means 17, the RAM control means 8 reads out the target macroblock number data MNO from the RAM 5. The target macroblock number data MNO read out from the RAM 5 is supplied to the judging means 17. The judging means 17 determines whether or not the target macroblock number data MNO from the RAM 5 is greater than the maximum value data MNOmax of the target macroblock number data. If "YES" is outputted, then control goes to a step S1309. If "NO" is outputted, then control goes back to the step S1304.

In the step S1309, under control of the vector selecting means 16, the RAM control means 8 reads out the horizontal direction motion vector data MVh from the RAM 5. The thus read out horizontal direction motion vector data MVh is supplied to the vector selecting means 16. The vector selecting means 16 obtains a mean value of the horizontal direction motion vector data MVh by multiplying the horizontal motion vector data MVh from the RAM 5 with the maximum value data MNOmax of 1/target macroblock number data, supplied this mean value data MVh to the RAM 5, and controls the RAM control means 8. Under control of the vector selecting means 16, the RAM control means 8 supplies the read/write control signal including address data indicating the storage area of the horizontal direction motion vector data MVh2 to the RAM 5, whereby the horizontal direction motion vector data MVh is stored in the RAM 5 as the horizontal direction motion vector data MVh2. Then, control goes to a step S1310.

In the step S1310, under control of the vector selecting means 16, the RAM control means 8 reads out the vertical direction motion vector data MVv from the RAM 5. The thus read out horizontal direction motion vector data MVv is supplied to the vector selecting means 16. The vector selecting means 16 obtains a mean value of the horizontal direction motion vector data MVv by multiplying the vertical motion vector data MVh from the RAM 5 with the maximum value data MNOmax of 1/target macroblock number data, supplied this mean value data MVv to the RAM 5, and controls the RAM control means 8. Under control of the vector selecting means 16, the RAM control means 8 supplies the read/write control signal including address data indicating the storage area of the horizontal direction motion vector data MVv2 to the RAM 5, whereby the horizontal direction motion vector data MVv is stored in the RAM 5 as the vertical direction motion vector data MVv2. Then, control goes to a step S1311.

In the step S1311, the table control means 12 adds "1" to the target macroblock number data MNO. Then, this mean motion vector data acquisition routine is ended, and control goes to the step S330 of the flowchart shown in FIG. 39.

After the control operation based on the residual processing data generating routine has been finished, control goes to the step S198 in the main routine shown in FIG. 11. If the judging means 17 determines that the processing on all macroblocks of the present frame is ended, control goes to the step S200. In the step S200, the control operation based on the present and reference frame data set routine is executed. Specifically, under control of the memory control means 10, frame image data stored in the present frame memory 321 is moved to the reference frame memory 323 and new image data is stored in the present frame memory 321. The content of the processing at the step S200 is similar to that of the step S50.

Effects of the fifth embodiment will be described.

As described above, according to this embodiment, when one motion vector data is selected from the nominated motion vector data, there are obtained the differential total value data YV of the motion vector data and the mean motion vector data. Then, the motion vector data with the minimum differential total value data is selected. Therefore, motion vector data with largest correlation with motion vector data of other target macroblocks within the frame can be selected. Thus, the motion vector data which results from setting the telescopic search area TSA using the selected motion vector data and executing the motion detection using this telescopic search area TSA becomes very accurate. When the motion compensation is carried out using such motion vector data and a differential value is obtained by the motion-compensated macroblock and the encoded macroblock, the data amount can be made smallest and the encoding efficiency can be improved considerably. The above-mentioned effects can be achieved in addition to the effects achieved when the motion vector data is selected according to the first embodiment.

A control operation based on the residual processing routine shown in FIG. 11 will be described with reference to FIG. 42.

Figure 42:
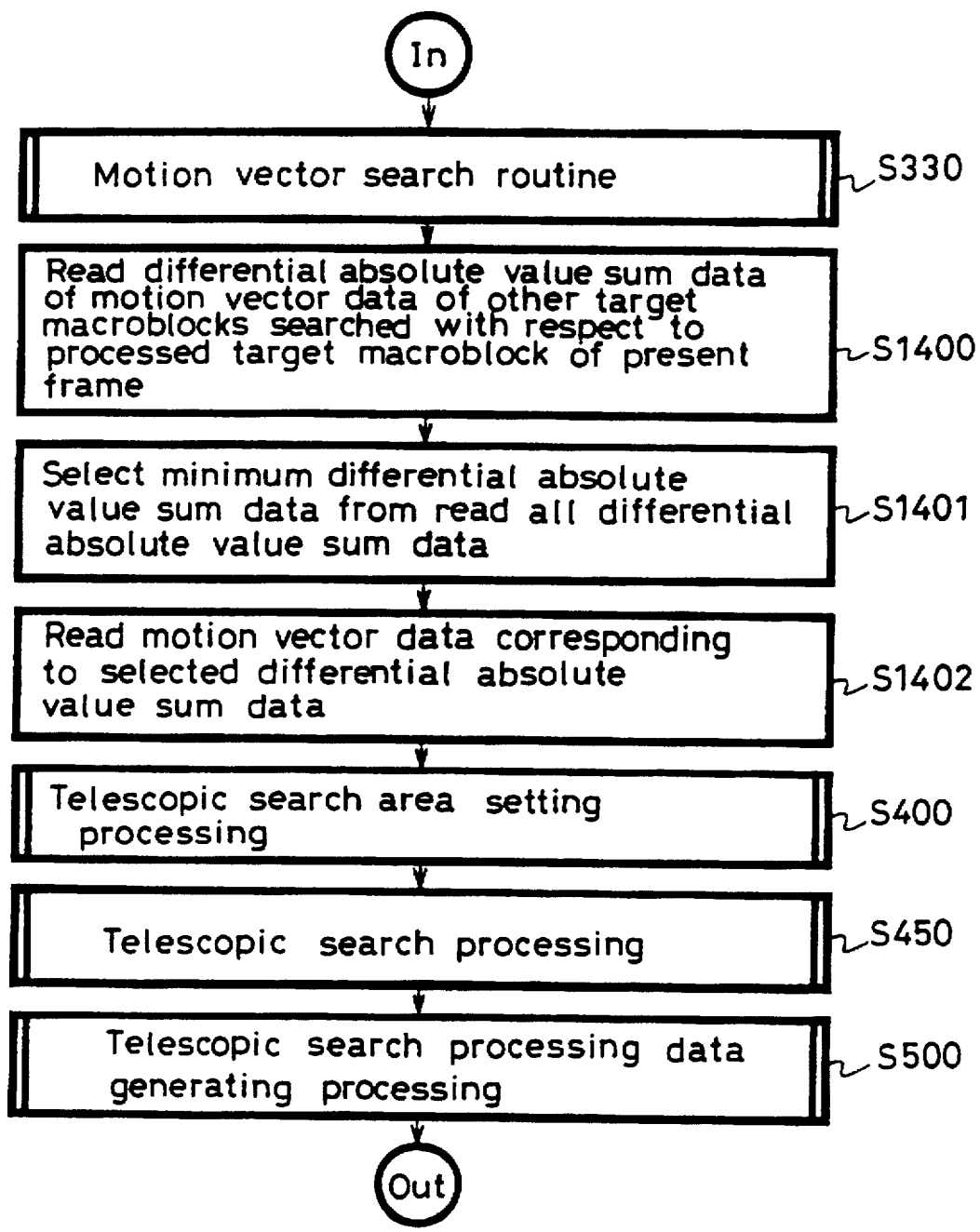
FIG. 42 is a flowchart (sixth embodiment) used to explain a control operation based on the residual processing routine at step S300 in the flowchart of the main routine shown in FIG. 11.

FIG. 42 is a flowchart used to explain the control operation of other example (sixth embodiment) of the residual processing routine shown in FIG. 11. In the sixth embodiment, a minimum residual value is calculated with respect to the target macroblock. Motion vector data are obtained based on address data in which such minimum residual value could be obtained and address data of the target macroblock. When the motion vector data is registered on the residual processing data table TBL1, this minimum residual value also is registered, and motion vector data in which the minimum residual value is registered is selected from all nominated motion vector data obtained by the motion vector data search routine.

In the sixth embodiment, the target macroblock number data of the target macroblocks surrounding the processed target macroblock need not be registered on the residual processing data table TBL1. Further, in this sixth embodiment, the coincidence number data Veq and the differential total value data TV need not be registered on the table shown in FIG. 23 because these data are not used in the sixth embodiment.

In the step S330, the processing based on the motion vector data search routine is executed, and control goes to a step S1400.

In the step S1400, under control of the table control means 12, the RAM control means 8 reads out residual value data registered with respect to the target macroblock number data of the target macroblock in which the registered motion vector data are set to the nominated motion vector data from the residual processing data table TBL1 of the RAM 5, and stores this residual value data in the table (see FIG. 23) of the RAM 5 at its storage area of corresponding nominated motion vector data. Then, control goes to a step S1401.

In the step S1401, under control of the vector selecting means 16, the RAM control means 8 read out sequentially residual value data from the RAM 5. The residual value data sequentially read out from the RAM 5 are sequentially supplied to the vector selecting means 16. The vector selecting means 16 finally selects one residual value data by executing Pmax times indicating the number of nominated motion vector data the processing in which the first residual value data supplied from the RAM 5 and the next residual value data are compared and smaller residual value data is selected, this selected residual value data is compared with next residual value data from the RAM 5 and smaller residual value data is selected. Then, control goes to a step S1402.

In the step S1402, under control of the vector selecting means 16, the RAM control means 8 reads out motion vector data corresponding to the residual value data selected by the vector selecting means 16 at the step S1402 from the table of the RAM 5. The motion vector data read out from the RAM 5 is supplied to the vector selecting means 16. The vector selecting means 16 supplies the motion vector data supplied from the RAM 5 to the address calculating means 13. Then, control goes to the step S400.

In the step S400, the telescopic search area TSA is set by the telescopic search area TSA setting processing routine. Then, control goes to the step S450.

In the step S450, the telescopic search processing is executed by the telescopic search processing routine. Then, control goes to the step S500.

In the step S500, the telescopic search processing data is generated by the telescopic search processing data generating processing routine. Then, control goes to the step S599 in the flowchart of the main routine shown in FIG. 11. In this step S500, although the area of the processed reference frame memory 323 is the telescopic search area TSA, the content of the processing is the same as that of the residual processing data generating processing routine in the step S150 in the flowchart shown in FIG. 11. Therefore, the illustration and description of this telescopic search processing data generating processing routine are replaced with the flowcharts and description of the residual processing data generating processing routine shown in FIGS. 17 and 18.

As the nominated motion vector data, there is detected motion vector data which is closest to the mean motion vector data from the nominated motion vector data by a series of processing from the steps S1401 to S1402. As a result, a coincidence within the frames of the motion vector data is evaluated. The evaluated result is the content of the RAM shown in FIG. 23. However, in the sixth embodiment, the coincidence number data Veq and the differential total value data are not used but instead, the residual value data are registered in response to the nominated motion vector data.

After the optimum motion vector data for setting the telescopic search area TSA corresponding to the processed target macroblock has been obtained by the above-mentioned processing, the setting processing of the telescopic search area TSA is executed.

Effects of the sixth embodiment will be described.

As described above, according to this embodiment, when one motion vector data is selected from the nominated motion vector data, there is selected the motion vector data with minimum residual value from the motion vector data. Therefore, motion vector data with largest correlation with motion vector data of other target macroblocks within the frame can be selected. Thus, the motion vector data which results from setting the telescopic search area TSA using the selected motion vector data and executing the motion detection using this telescopic search area TSA becomes very accurate. When the motion compensation is carried out using such motion vector data and a differential value is obtained by the motion-compensated macroblock and the encoded macroblock, the data amount can be made smallest and the encoding efficiency can be improved considerably. Further, since the motion vector data can be selected by the simple processing in which the residual value data obtained by the block matching processing are compared with each other, the processing can be executed at a higher speed than those in the first to fifth embodiments. The above-mentioned effects can be achieved in addition to the effects achieved when the motion vector data is selected according to the first embodiment.

A first modified example will be described.

While the reverse area is formed of four target macroblocks in the first to sixth embodiments, the present invention is not limited thereto and the number of the target macroblocks may of course be changed freely in accordance with the size of the moving object or the like. When this number is changed, numerical value parameter Pmax (used in comparison of P1) in the flowcharts used in the first to fourth embodiments may be set to the changed numerical values and the capacity of the RAM 5 may be changed to the corresponding capacity. In this case, it is needless to say that the number of the target macroblock number data MNO registered on the residual processing data tables TBL1 and TBL2 may equal to the above numerical value.

Since the number of the target macroblocks of the reverse area can be varied in accordance with the size of the moving object, an optimum motion detection can be constantly executed based on the size of the moving object.

A second modified example will be described.

Various processing in the first to sixth embodiments can be executed fully and may be properly switched by a mode selection signal or the like from the outside. In that case, in the flowchart of the main routine, there may be provided a judgement routine in which the content of the mode selection signal from the outside may be judged and the content of the processing may be properly switched based on the judged result. If so, then based on user format or determined format, e.g., recording format or communication format, optimum processing can be carried out, and the apparatus can expand the mode. In other words, in the descriptions of the first to sixth embodiments, merits of the respective processing are different from an accuracy standpoint and from a time stand point. Therefore, when the encoding apparatus using a motion detection mounted on one apparatus is given the function for properly switching the above processing, the apparatus can cope with user's demands and determined items of the format.

FIG. 43 shows a motion decoder in which the motion detecting circuit shown in FIG. 9 is mounted.

In the motion encoder shown in FIG. 43, a frame memory 202 is set to a frame memory of present frame, a frame memory 201 is set to a frame memory of a future frame, and a frame memory 203 is set to a frame memory of past frame.

In this case, when the frame image data of future frame stored in the frame memory 201 and the frame image data of present frame stored in the frame memory 202 are motion-detected, the frame image data stored in the frame memory 202 is set to frame image data of reference frame, and frame image data stored in the frame memory 201 is set to the frame image data of present frame. When the frame image data of present frame stored in the frame memory 202 and the frame image data of past frame stored in the frame memory 203 are motion-detected, the frame image data stored in the frame memory 203 is set to frame image data of reference frame, and frame image data stored in the frame memory 202 is set to the frame image data of present frame.

Accordingly, when frame image data of nth frame and frame image data of n−1th frame are motion-detected, the present frame memory 321 shown in FIG. 9 corresponds to the frame memory 202 in the motion encoder shown in FIG. 43, and the reference frame memory 323 shown in FIG. 9 corresponds to the frame memory 203 of the motion encoder shown in FIG. 43. When nth frame image data and n+1th frame image data are motion-detected, the present frame memory 321 shown in FIG. 9 corresponds to the frame memory 201 of the motion encoder shown in FIG. 23, and the reference frame memory 323 shown in FIG. 9 corresponds to the frame memory 202 of the motion encoder shown in FIG. 43.

As shown in FIG. 43, the motion encoder comprises frame memories 201, 202, 203 for sequentially storing image data supplied from an input terminal 200, a selector 204 for selectively outputting respective outputs of the frame memories 201, 202, 203 based on a control signal from a system controller 226, an adding circuit 207 for calculating difference between a motion detection block for obtaining motion vector data by motion detection, a motion compensation block for executing motion compensation based on the motion vector data calculated in the motion detection block, macroblock data of 16 lines×16 pixels from the selector 204 and motion-compensated macroblock data of 16 lines×16 pixels from the motion compensation block, an inter/intra judgement circuit 208 for selecting the macroblock data from the selector 204 and the differential data from the adding circuit 207, a switch 209 for selecting the macroblock data from the selector 204 or the differential data from the adding circuit 207, and a system controller 226 for controlling a compressing and encoding block for compressing and encoding the output from the switch 209 and the above respective elements.

If image data are sequentially inputted to the input terminal 200, the inputted image data are sequentially stored in the frame memory 201, image data read out from the frame memory 201 during the next frame period are sequentially stored in the frame memory 202 and image data read out from the frame memory 203 during the next frame period are sequentially stored in the frame memory 203, then after a time of three frames are passed, first frame image data is stored in the frame memory 203, second frame image data is stored in the frame memory 202 and third frame image data is stored in the frame memory 201, respectively. Accordingly, if the output from the frame memory 201 is set to the image data of present frame, then the output of the frame memory 201 becomes frame image data of future frame, and the output of the frame memory 203 becomes the image data of the past frame. The output of the macroblock unit of the frame memory 201 will hereinafter be referred to as "macroblock data of present frame", and the output of the macroblock unit of the frame memory 203 will hereinafter be referred to as "macroblock data of preceding frame".

The compressing and encoding block comprises a DCT (discrete cosine transform) circuit 210 from transforming macroblock data or differential data from the switch 209 from a DC component to a high-order AC component at the block unit of 8 lines×8 pixels, a quantizing circuit 211 for quantizing coefficient data from the DCT circuit 210 at a predetermined quantization step size, a VLC (variable length code) encoder 212 for variable-length-coding the coefficient data from the quantizing circuit 211 in a suitable method such as run length coding or Huffman coding, and an encoding circuit 213 for encoding the variable-length-coded data from the VLC encoder 212 in the form of a product code by addition of inner parity and outer parity for recording or transmission.

The motion detection block comprises a motion detection block 205 for obtaining motion vector data by motion-detecting macroblock data of succeeding frame from the frame memory 201 and the macroblock data of present frame from the frame memory 202, and a motion detecting circuit 206 for obtaining motion vector data by motion-detecting macroblock data of preceding frame from the frame memory 203 and macroblock data of present frame from the frame memory 202.

The motion compensating block comprises an inverse quantizing circuit 215 for obtaining coefficient data of the DCT circuit for inverse-quantizing the coefficient data from the quantizing circuit 211, an IDCT (inverse discrete cosine transform) circuit 216 for transforming the coefficient data from the inverse quantizing circuit 215 to original macroblock data or differential data, an adding circuit 217 for adding the output from the IDCT circuit 216 and the motion-compensated macroblock data, a switch 218 for supplying the output from the adding circuit 217 and the output from the IDCT circuit 216 to a frame memory 219 based on a switching control signal from the inter/intra judgement circuit 208, the frame memory 219 for storing the output from the switch 218 in the storage area, a frame memory 221 for sequentially storing the macroblock data read out from the frame memory 219, a motion compensating circuit 220 for selecting proper macroblock data from the frame data stored in the frame memory 219 based on the motion vector data from the motion detecting circuit 205 and outputting the selected macroblock data as motion-compensated macroblock data, a motion compensating circuit 222 for selecting proper macroblock data from the frame data stored in the frame memory 221 based on the motion vector data from the motion detecting circuit 206 and outputting the selected macroblock data as motion-compensated macroblock data, a weighting circuit 203 for weighting the motion-compensated macroblock data with a weighting amount corresponding to a time distance of the present frame, a synthesizing circuit 224 for synthesizing the two macroblock data weighted by the weighting circuit 223, and a switch 225 for selectively outputting the motion-compensated macroblock data from the motion compensating circuit 220, the motion-compensated macroblock data from the motion compensating circuit 222, and the synthesized macroblock data from the synthesizing circuit 224 based on the switching control signal from the system controller 226.

The inter/intra judgement circuit 203 compares the macroblock data from the selector 204 and a dispersed value of the differential data from the adding circuit 207 and selects a smaller dispersed value.

The motion compensating circuit 220 motion-compensates macroblock data of succeeding (future) frame of the macroblock of the frame outputted from the selector 204. The motion compensating circuit 222 motion-compensates macroblock data of preceding (past) frame of the macroblock data of the frame outputted from the selector 204. The weighting circuit 223 and the synthesizing circuit 224 weights and synthesizes the motion-compensated two macroblock data from the motion compensating circuits 220 and 222 to thereby motion-compensate preceding and succeeding macroblock data of the macroblock data of the frame outputted from the selector 204. This is equivalent to the processing in which synthesized macroblock data of two motion-compensated macroblock data is obtained.

Macroblock data of frame sequentially outputted from the selector 204 are encoded by calculating a difference between them and any output from the above three systems, i.e., motion-compensated macroblock data. Differential data from the adding circuit 270 is interframe differential data and interframe differential data is encoded, which is referred to as "interframe coding". The output from the selector 204 is encoded as it is, and referred to as "intraframe coding".

Image data of frames outputted from the selector 204 and encoded are referred to I picture, B picture and P picture in accordance with the encoded form.

I picture is encoded image data of one frame composed of intraframe-coded data of macroblock data of present frame outputted from the selector 204. The encoding is the encoding executed by the DCT circuit 210, the quantizing circuit 211 and the VLC encoder 212. Accordingly, in the case of I picture, under control of the inter/intra judgement circuit 208, movable contacts c of the switches 209 and 218 are constantly connected to fixed contacts a. The "present frame" means macroblock data of frame outputted from the selector 204 and encoded (intraframe-coded) as it is or encoded (interframe-coded) by calculating a difference.

P picture is encoded image data of one frame composing data which results from encoding (interframe-encoding) differential data between motion-compensated macroblock data of I or P picture which becomes preceding frame of the macroblock data of present frame and data which result from intraframe-encoding the macroblock data of present frame. However, when the P picture is generated, the motion vector data for motion-compensating the image data of I picture is obtained by image data to be encoded as P picture and image data preceding this image data as seen from the order in which they are inputted to the motion encoder.

B picture is data which results from encoding (interframe-encoding) differential data between the macroblock data of present frame outputted from the selector 204 and macroblock data of the following six kinds.

Two kinds of macroblock data within the six kinds of macroblock data are macroblock data of present frame outputted from the selector 204 and motion-compensated macroblock data of I or P picture which becomes a preceding frame relative to the macroblock data of present frame. Two kinds of macroblock data within the remaining four kinds of macroblock data are the macroblock data of present frame outputted from the selector 204 and the motion-compensated macroblock data of I or P picture which becomes a succeeding frame relative to the macroblock data of present frame. The remaining two kinds of macroblock data are interpolation macroblock data generated from the I picture which becomes a preceding frame relative to the macroblock data of the present frame outputted from the selector 204 and interpolation macroblock data generated from P picture which becomes a preceding frame relative to the macroblock data of present frame outputted from the selector 204 and a P picture which becomes a succeeding frame.

As is clear from the above description, the P picture contains data encoded by image data of other frames than the present frame, i.e., interframe-encoded data. The B picture is composed of only interframe-encoded data and cannot be encoded alone. As is conventional, a plurality of relating pictures are formed as one GOP (Group Of Picture), and image data is processed at the unit of GOP.

In general, GOP comprises 1 or a plurality of I pictures and zero or a plurality of non-I pictures. For convenience sake of explanation, let it be assumed that one GOP comprises I picture, P picture and two B pictures.

In the following description, B picture is obtained by calculating a difference between image data preceding and succeeding B picture, and P picture is obtained from the I picture. In actual practice, upon encoding, the macroblock data with highest encoding efficiency is selected from the macroblock data compensated by forward motion compensation, interpolation motion compensation and backward motion compensation. upon decoding, the same motion compensation is executed at the unit of macroblock. In other words, differential data within B picture results from subtracting motion-compensated macroblock data motion-compensated by any one of forward motion compensation, interpolation motion compensation and backward motion compensation from the macroblock data to be encoded. Differential data within one P picture results from subtracting motion-compensated macroblock data motion-compensated by any one of forward motion compensation and backward motion compensation from the macroblock data to be encoded.

The devices on which this motion encoder can be mounted may be, for example, recording side of digital VTR (video tape recorder), data transmission side in data transmission system such as teleconference system or television telephone system, recording side of magneto-optical disk drive, recording side of silicon disk drive, recording side of CD-R disk drive, recording side of hard disk drive, CD-ROM manufacturing system (stamper manufacturing machine, etc.), personal computer or work station.

When this motion encoder is mounted on the device, the motion encoder should preferably be formed as an integrated circuit to provide one-chip encoder. If so, then when this motion encoder is mounted on any of the above devices, the device can be miniaturized and reduced in weight. Also, a space factor in the device can be improved as compared with the case that the motion encoder is mounted on the substrate.

In the form that the motion encoder is mounted on the personal computer and work station, such motion encoder can be mounted on a hardware, e.g., CPU board as one-chip encoder. However, considering that the operation clock of the CPU becomes higher at speed and multi-task (although the work station is already multi-tasked) of OS (operating system) is advanced recently, the functional block portion shown in FIG. 9 may be realized by a software, and other hardware portions may be mounted on the board. Then, this board may be attached to an extended slot of personal computer or work station. In that case, the above hardware portion should preferably mounted on the video capture board.

The case that "moving object is moving at an equal speed in the same direction" was already described. As earlier noted in the first to sixth embodiments, the reverse area comprises four reverse area target macroblocks, and motion vector data registered with respect to respective target macroblock number data of all target macroblocks in which at least one of reverse area target macroblocks of the four reverse area target macroblocks becomes the same value as that of the target macroblock number data of the processed target macroblock are set to the nominated motion vector data. Then, the optimum motion vector data is selected from the nominated motion vector data. Therefore, it can be easily understood that the present invention is not limited to the case that "moving object is moving at an equal speed in the same direction". If the moving speed or direction of the moving object is varied at every frame, then the number of the target macroblock of the reverse area may be increased, the past buffering residual processing data table TBL2 described in the third embodiment may be replaced with the further old one or the processing in the first to sixth embodiments may be combined, achieving the same action and effects.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method of detecting a motion in image information, comprising the steps of:

(a) establishing a first search area to search for a reference block in agreement with the contents of a block in question, corresponding to the position of the block in question in a present frame, in a reference frame whose position precedes or follows, in time, the position of the present frame;

(b) detecting agreement between the contents of the block in question in the present frame and the contents of the reference block in said first search area in said reference frame for thereby determining first motion vector data;

(c) predicting a position, in a following frame, of the block in question in said present frame based on second motion vector data which are of the same size as and in the opposite direction to the first motion vector data determined in said step (b);

(d) detecting positional information of the block in question in an inclusive region which includes the block in the position predicted in said step (c);

(e) registering, in a table, the first motion vector data determined in said step (b) as registered motion vector data of the block in question in the present frame, and also registering, in the table, the positional information of the block in question detected in said step (d) as related to the block in question which is to be processed in said step (b);

(f) deciding whether the process of determining the first motion vector data with respect to all blocks in question in the present frame is finished or not;

(g) updating the contents of the present frame with contents whose position precedes or follows, in time, the position of the contents of the present frame, and updating the contents of said reference frame with at least the contents of the present frame, if the process of determining the first motion vector data with respect to all blocks in question in the present frame is decided as being finished in said step (f);

(h) reading the registered motion vector data, updated in said step (g), related to the block in question which is to be processed in said step (b) in the present frame as candidate motion vector data from said table, and selecting optimum motion vector data from said candidate motion vector data;

(i) establishing a second search area smaller in size than said first search area in said reference frame updated in said step (g) based on the optimum motion vector data selected in said step (h), and detecting agreement between the block in question in the present frame and a reference block in said second search area in said reference frame for thereby determining third motion vector data; and (j) determining positional information of the block in question in said inclusive region used in establishing said second search area in said step (i) based on the third motion vector data detected in said step (i), and registering said positional information in said table for thereby updating the contents of the table.

2. A method according to claim 1, wherein said step (j) comprises the steps of:

(k) predicting a position, in a following frame, of the block in question based on reverse motion vector data which are of the same size as and in the opposite direction to the third motion vector data detected in said step (i);

(l) detecting positional information of the block in question in an inclusive region which includes the block in the position predicted in said step (k);

(m) registering, in the table, the positional information of the block in question determined in said step (l) as related to the information of the block in question which is to be processed, for thereby updating the contents of the table; and (n) deciding whether the process of determining the first motion vector data with respect to all blocks in question in the present frame is finished or not.

3. A method according to claim 2, wherein said step (m) comprises the step of:

(o) if the process of determining the first motion vector data with respect to all blocks in question in the present frame is decided as being finished in said step (n), deciding whether or not there is a scene change representing a large rate of change between an image of the present frame and a new input image which is updated into a present frame in said step (g), and proceeding to said step (a) if there is a scene change.

4. A method according to claim 1, wherein said step (h) comprises the step of:

(k) detecting, among the candidate motion vector data, candidate motion vector data closest to respective registered motion vector data of a plurality of blocks in question around the block in question which is processed, and selecting the detected candidate motion vector data as motion vector data for use in said step (i).

5. A method according to claim 1, wherein said step (h) comprises the step of:

(k) detecting, among the candidate motion vector data, candidate motion vector data contained in registered motion vector data which are registered in respective tables with respect to all blocks in question which are processed, and selecting the detected candidate motion vector data as motion vector data for use in said step (i).

6. A method according to claim 1, wherein said step (e) comprises the step of:

(k) registering respective candidate motion vector data of blocks in question in said table; and wherein said step (h) comprises the step of:

(l) detecting, among the candidate motion vector data of the block in question which is to be processed in the present frame, candidate motion vector data, two steps before the present time, closest to the candidate motion vector data registered in the table, and selecting the detected candidate motion vector data as motion vector data for use in said step (i).

7. A method according to claim 1, wherein said step (h) comprises the step of:

(k) establishing said second search area successively in reference frames using said candidate motion vector data, successively detecting agreement between the block in question in the present frame and a reference block in the second search area established in the reference frames, comparing results of detected agreement, and selecting candidate motion vector data whose result has a smallest error as motion vector data for use in said step (i).

8. A method according to claim 1, wherein said step (h) comprises the step of:

(k) determining average motion vector data representing an average value of all registered motion vector data registered in the table, detecting candidate motion vector data closest to the determined average motion vector data, and selecting the detected candidate motion vector data as motion vector data for use in said step (i).

9. A method according to claim 1, wherein said step (e) comprises the step of:

(k) registering agreement information indicative of degrees of agreement detected in the step (b) between the reference block and the block in question in the table; and wherein said step (h) comprises the step of:

(l) detecting, among the candidate motion vector data of the block in question which is to be processed in the present frame, candidate motion vector data corresponding to the agreement information registered in said table and indicating the highest degree of agreement, and selecting the detected candidate motion vector data as motion vector data for use in said step (i).

10. An apparatus for detecting motion of image information, comprising:

a present frame memory for storing frame image data of a present frame;

a reference frame memory for storing a reference frame whose position precedes or follows, in time, the position of the present frame;

differential absolute sum calculating means for determining an absolute sum of a differential between pixel data of a block in question in said present frame memory and pixel data of a reference block in a first search area of said reference frame memory or a second search area thereof which is smaller in size than said first search area;

minimum value detecting means for detecting smallest differential absolute sum data of a plurality differential absolute sum data determined by said differential absolute sum calculating means and corresponding to the number of reference blocks in the first or second search area;

motion vector detecting means for detecting motion vector data based on the smallest differential absolute sum data from said minimum value detecting means; and control means for controlling said present frame memory, said reference frame memory, said differential absolute sum calculating means, said minimum value detecting means, and said motion vector detecting means;

said control means comprising:

area establishing means for establishing a first search area or a second search area smaller in size than said first search area in said reference frame memory, corresponding to the block in question in the frame image data stored in said present frame memory;

reference frame memory control means for controlling said present frame memory and said reference frame memory to effect motion detection with the block in question and the reference block in said first search area established in said reference frame memory at a start of a processing sequence, and controlling said present frame memory and said reference frame memory to effect motion detection with the block in question which has been updated and the reference block in said second search area established in said reference frame memory after the processing sequence;

holding means for holding, as a table, identification information identifying the block in question in said present frame memory and motion vector data obtained as a result of said motion detection;

vector calculating means for determining reverse motion vector data which are of the same size as and in the opposite direction to the motion vector data obtained as a result of said motion detection;

address calculating means for calculating addresses in an inclusive region including a block at a position indicated by the said reverse motion vector data determined by said vector calculating means, starting from the position of the block in question, and calculating addresses of a plurality of blocks in question which are included in the inclusive region;

table control means for registering, in said table, the identification information corresponding to the addresses, calculated by said address calculating means, of the blocks in question included in said inclusive region, and controlling inputting and outputting of information registered in said table;

decision means for deciding whether a process according to the motion detection has been carried out with respect to all blocks in question in a frame; and vector selecting means for selecting registered motion vector data optimum for establishing said second search area, among registered motion vector data of all blocks in question which are registered in said table which contains the same identification information as identification information identifying the block in question in said inclusive region, when said area establishing means establishes a second search area in said reference frame memory, corresponding to the block in question in the frame image data, after the process according to the motion detection is decided as having been carried out with respect to all blocks in question in a frame by said decision means and the contents of the present frame memory and the reference frame memory are updated.

11. An apparatus according to claim 10, wherein said table contains information registered with respect to all blocks in question in at least one frame, said information comprising:

block-in-question number data indicative of the block in question;

address data in the present frame memory of the block in question;

block-in-question number data indicative of a plurality of blocks in question included in the inclusive region, which include a block in a position indicated by reverse motion vector data which are of the same size as and in the opposite direction to the motion vector data produced as a result of the motion detection effected on the block in question; and motion vector data produced as a result of the motion detection effected on the block in question.

12. A method of encoding image information, comprising the steps of:

(a) establishing a first search area to search for a reference block in agreement with the contents of a block in question, corresponding to the position of the block in question in a present frame, in a reference frame whose position precedes or follows, in time, the position of the present frame to be encoded;

(b) detecting agreement between the contents of the block in question in the present frame to be encoded and the contents of the reference block in said first search area in said reference frame for thereby determining first motion vector data;

(c) predicting a position, in a following frame, of the block in question in said present frame based on second motion vector data which are of the same size as and in the opposite direction to the first motion vector data determined in said step (b);

(d) detecting positional information of the block in question in an inclusive region which includes the block in the position predicted in said step (c);

(e) registering, in a table, the first motion vector data determined in said step (b) as registered motion vector data of the block in question in the present frame, and also registering, in the table, the positional information of the block in question detected in said step (d) as related to the block in question which is to be processed in said step (b);

(f) deciding whether the process of determining the first motion vector data with respect to all blocks in question in the present frame is finished or not;

(g) updating the contents of the present frame with contents whose position precedes or follows, in time, the position of the contents of the present frame, and updating the contents of said reference frame with at least the contents of the present frame, if the process of determining the first motion vector data with respect to all blocks in question in the present frame is decided as being finished in said step (f);

(h) reading the registered motion vector data, updated in said step (g), related to the block in question which is to be processed in said step (b) in the present frame to be encoded as candidate motion vector data from said table, and selecting optimum motion vector data from said candidate motion vector data;

(i) establishing a second search area smaller in size than said first search area in said reference frame updated in said step (g) based on the optimum motion vector data selected in said step (h), and detecting agreement between the block in question in the present frame and a reference block in said second search area in said reference frame for thereby determining third motion vector data;

(j) determining positional information of the block in question in said inclusive region used in establishing said second search area in said step (i) based on the third motion vector data detected in said step (i), and registering said positional information in said table for thereby updating the contents of the table;

(k) extracting a reference block in the reference frame based on said first motion vector data determined in said step (b) or said third motion vector data detected in said step (i), and determining a differential between the extracted reference block and the block in question which is to be encoded; and (l) encoding differential data determined in said step (k).

13. A method according to claim 12, wherein said step (j) comprises the steps of:

(m) predicting a position, in a following frame, of the block in question based on reverse motion vector data which are of the same size as and in the opposite direction to the third motion vector data detected in said step (i);

(n) detecting positional information of the block in question in an inclusive region which includes the block in the position predicted in said step (m);

(o) registering, in the table, the positional information of the block in question determined in said step (n) as related to the information of the block in question which is to be processed, for thereby updating the contents of the table; and (p) deciding whether the process of determining the first motion vector data with respect to all blocks in question in the present frame is finished or not.

14. A method according to claim 13, wherein said step (o) comprises the step of:

(q) if the process of determining the first motion vector data with respect to all blocks in question in the present frame is decided as being finished in said step (p), deciding whether or not there is a scene change representing a large rate of change between an image of the present frame and a new input image which is updated into a present frame in said step (g), and proceeding to said step (a) if there is a scene change.

15. A method according to claim 12, wherein said step (h) comprises the step of:

(m) detecting, among the candidate motion vector data, candidate motion vector data closest to respective registered motion vector data of a plurality of blocks in question around the block in question which is processed, and selecting the detected candidate motion vector data as motion vector data for use in said step (i).

16. A method according to claim 12, wherein said step (h) comprises the step of:

(m) detecting, among the candidate motion vector data, candidate motion vector data contained in registered motion vector data which are registered in respective tables with respect to all blocks in question which are processed, and selecting the detected candidate motion vector data as motion vector data for use in said step (i).

17. A method according to claim 12, wherein said step (e) comprises the step of:

(m) registering respective candidate motion vector data of blocks in question in said table; and wherein said step (h) comprises the step of:

(n) detecting, among the candidate motion vector data of the block in question which is to be processed in the present frame, candidate motion vector data, two steps before the present time, closest to the candidate motion vector data registered in the table, and selecting the detected candidate motion vector data as motion vector data for use in said step (i).

18. A method according to claim 12, wherein said step (h) comprises the step of:

(m) establishing said second search area successively in reference frames using said candidate motion vector data, successively detecting agreement between the block in question in the present frame and a reference block in the second search area established in the reference frames, comparing results of detected agreement, and selecting candidate motion vector data whose result has a smallest error as motion vector data for use in said step (i).

19. A method according to claim 12, wherein said step (h) comprises the step of:

(m) determining average motion vector data representing an average value of all registered motion vector data registered in the table, detecting candidate motion vector data closest to the determined average motion vector data, and selecting the detected candidate motion vector data as motion vector data for use in said step (i).

20. A method according to claim 12, wherein said step (e) comprises the step of:

(m) registering agreement information indicative of degrees of agreement detected in the step (b) between the reference block and the block in question in the table; and wherein said step (h) comprises the step of:

(n) detecting, among the candidate motion vector data of the block in question which is to be processed in the present frame, candidate motion vector data corresponding to the agreement information registered in said table and indicating the highest degree of agreement, and selecting the detected candidate motion vector data as motion vector data for use in said step (i).

21. An apparatus for encoding image information, comprising:

a present frame memory for storing frame image data of a present frame to be encoded;

a reference frame memory for storing a reference frame whose position precedes or follows, in time, the position of the present frame;

differential absolute sum calculating means for determining an absolute sum of a differential between pixel data of a block in question in said present frame memory and pixel data of a reference block in a first search area of said reference frame memory or a second search area thereof which is smaller in size than said first search area;

minimum value detecting means for detecting smallest differential absolute sum data of a plurality differential absolute sum data determined by said differential absolute sum calculating means and corresponding to the number of reference blocks in the first or second search area;

motion vector detecting means for detecting motion vector data based on the smallest differential absolute sum data from said minimum value detecting means; and control means for controlling said present frame memory, said reference frame memory, said differential absolute sum calculating means, said minimum value detecting means, and said motion vector detecting means;

said control means comprising:

area establishing means for establishing a first search area or a second search area smaller in size than said first search area in said reference frame memory, corresponding to the block in question in the frame image data stored in said present frame memory;

reference frame memory control means for controlling said present frame memory and said reference frame memory to effect motion detection with the block in question and the reference block in said first search area established in said reference frame memory at a start of a processing sequence, and controlling said present frame memory and said reference frame memory to effect motion detection with the block in question which has been updated and the reference block in said second search area established in said reference frame memory after the processing sequence;

holding means for holding, as a table, identification information identifying the block in question in said present frame memory and motion vector data obtained as a result of said motion detection;

vector calculating means for determining reverse motion vector data which are of the same size as and in the opposite direction to the motion vector data obtained as a result of said motion detection;

address calculating means for calculating addresses in an inclusive region including a block at a position indicated by the said reverse motion vector data determined by said vector calculating means, starting from the position of the block in question, and calculating addresses of a plurality of blocks in question which are included in the inclusive region;

table control means for registering, in said table, the identification information corresponding to the addresses, calculated by said address calculating means, of the blocks in question included in said inclusive region, and controlling inputting and outputting of information registered in said table;

decision means for deciding whether a process according to the motion detection has been carried out with respect to all blocks in question in a frame;

vector selecting means for selecting registered motion vector data optimum for establishing said second search area, among registered motion vector data of all blocks in question which are registered in said table which contains the same identification information as identification information identifying the block in question in said inclusive region, when said area establishing means establishes a second search area in said reference frame memory, corresponding to the block in question in the frame image data, after the process according to the motion detection is decided as having been carried out with respect to all blocks in question in a frame by said decision means and the contents of the present frame memory and the reference frame memory are updated;

an adder for extracting a reference block in the reference frame based on the motion vector data produced as a result of said motion detection, and determining a differential between the extracted reference block and the block in question which is to be encoded; and an encoder for encoding differential data from said adder.

22. An apparatus according to claim 21, wherein said table contains information registered with respect to all blocks in question in at least one frame, said information comprising:

block-in-question number data indicative of the block in question;

address data in the present frame memory of the block in question;

block-in-question number data indicative of a plurality of blocks in question included in the inclusive region, which include a block in a position indicated by reverse motion vector data which are of the same size as and in the opposite direction to the motion vector data produced as a result of the motion detection effected on the block in question; and motion vector data produced as a result of the motion detection effected on the block in question.

23. A system for transmitting image information, comprising:

a present frame memory for storing frame image data of a present frame to be encoded;

a reference frame memory for storing a reference frame whose position precedes or follows, in time, the position of the present frame;

differential absolute sum calculating means for determining an absolute sum of a differential between pixel data of a block in question in said present frame memory and pixel data of a reference block in a first search area of said reference frame memory or a second search area thereof which is smaller in size than said first search area;

minimum value detecting means for detecting smallest differential absolute sum data of a plurality differential absolute sum data determined by said differential absolute sum calculating means and corresponding to the number of reference blocks in the first or second search area;

motion vector detecting means for detecting motion vector data based on the smallest differential absolute sum data from said minimum value detecting means; and control means for controlling said present frame memory, said reference frame memory, said differential absolute sum calculating means, said minimum value detecting means, and said motion vector detecting means;

said control means comprising:

area establishing means for establishing a first search area or a second search area smaller in size than said first search area in said reference frame memory, corresponding to the block in question in the frame image data stored in said present frame memory;

reference frame memory control means for controlling said present frame memory and said reference frame memory to effect motion detection with the block in question and the reference block in said first search area established in said reference frame memory at a start of a processing sequence, and controlling said present frame memory and said reference frame memory to effect motion detection with the block in question which has been updated and the reference block in said second search area established in said reference frame memory after the processing sequence;

holding means for holding, as a table, identification information identifying the block in question in said present frame memory and motion vector data obtained as a result of said motion detection;

vector calculating means for determining reverse motion vector data which are of the same size as and in the opposite direction to the motion vector data obtained as a result of said motion detection;

address calculating means for calculating addresses in an inclusive region including a block at a position indicated by the said reverse motion vector data determined by said vector calculating means, starting from the position of the block in question, and calculating addresses of a plurality of blocks in question which are included in the inclusive region;

table control means for registering, in said table, the identification information corresponding to the addresses, calculated by said address calculating means, of the blocks in question included in said inclusive region, and controlling inputting and outputting of information registered in said table;

decision means for deciding whether a process according to the motion detection has been carried out with respect to all blocks in question in a frame;

vector selecting means for selecting registered motion vector data optimum for establishing said second search area, among registered motion vector data of all blocks in question which are registered in said table which contains the same identification information as identification information identifying the block in question in said inclusive region, when said area establishing means establishes a second search area in said reference frame memory, corresponding to the block in question in the frame image data, after the process according to the motion detection is decided as having been carried out with respect to all blocks in question in a frame by said decision means and the contents of the present frame memory and the reference frame memory are updated;

an adder for extracting a reference block in the reference frame based on the motion vector data produced as a result of said motion detection, and determining a differential between the extracted reference block and the block in question which is to be encoded;

an encoder for encoding differential data from said adder; and transmitting means for transmitting an encoded output signal from said encoder.

24. A system according to claim 23, wherein said table contains information registered with respect to all blocks in question in at least one frame, said information comprising:

block-in-question number data indicative of the block in question;

address data in the present frame memory of the block in question;

block-in-question number data indicative of a plurality of blocks in question included in the inclusive region, which include a block in a position indicated by reverse motion vector data which are of the same size as and in the opposite direction to the motion vector data produced as a result of the motion detection effected on the block in question; and motion vector data produced as a result of the motion detection effected on the block in question.

25. A system for recording image information, comprising:

a present frame memory for storing frame image data of a present frame to be encoded;

a reference frame memory for storing a reference frame whose position precedes or follows, in time, the position of the present frame;

differential absolute sum calculating means for determining an absolute sum of a differential between pixel data of a block in question in said present frame memory and pixel data of a reference block in a first search area of said reference frame memory or a second search area thereof which is smaller in size than said first search area;

minimum value detecting means for detecting smallest differential absolute sum data of a plurality differential absolute sum data determined by said differential absolute sum calculating means and corresponding to the number of reference blocks in the first or second search area;

motion vector detecting means for detecting motion vector data based on the smallest differential absolute sum data from said minimum value detecting means; and control means for controlling said present frame memory, said reference frame memory, said differential absolute sum calculating means, said minimum value detecting means, and said motion vector detecting means;

said control means comprising:

area establishing means for establishing a first search area or a second search area smaller in size than said first search area in said reference frame memory, corresponding to the block in question in the frame image data stored in said present frame memory;

reference frame memory control means for controlling said present frame memory and said reference frame memory to effect motion detection with the block in question and the reference block in said first search area established in said reference frame memory at a start of a processing sequence, and controlling said present frame memory and said reference frame memory to effect motion detection with the block in question which has been updated and the reference block in said second search area established in said reference frame memory after the processing sequence;

holding means for holding, as a table, identification information identifying the block in question in said present frame memory and motion vector data obtained as a result of said motion detection;

vector calculating means for determining reverse motion vector data which are of the same size as and in the opposite direction to the motion vector data obtained as a result of said motion detection;

address calculating means for calculating addresses in an inclusive region including a block at a position indicated by the said reverse motion vector data determined by said vector calculating means, starting from the position of the block in question, and calculating addresses of a plurality of blocks in question which are included in the inclusive region;

table control means for registering, in said table, the identification information corresponding to the addresses, calculated by said address calculating means, of the blocks in question included in said inclusive region, and controlling inputting and outputting of information registered in said table;

decision means for deciding whether a process according to the motion detection has been carried out with respect to all blocks in question in a frame;

vector selecting means for selecting registered motion vector data optimum for establishing said second search area, among registered motion vector data of all blocks in question which are registered in said table which contains the same identification information as identification information indicative of the block in question as identification information of the block in question in said inclusive region, when said area establishing means establishes a second search area in said reference frame memory, corresponding to the block in question in the frame image data, after the process according to the motion detection is decided as having been carried out with respect to all blocks in question in a frame by said decision means and the contents of the present frame memory and the reference frame memory are updated;

an adder for extracting a reference block in the reference frame based on the motion vector data produced as a result of said motion detection, and determining a differential between the extracted reference block and the block in question which is to be encoded;

an encoder for encoding differential data from said adder; and recording means for recording an encoded output signal from said encoder on a recording medium.

26. An apparatus according to claim 25, wherein said table contains information registered with respect to all blocks in question in at least one frame, said information comprising:

block-in-question number data indicative of the block in question;

address data in the present frame memory of the block in question;

block-in-question number data indicative of a plurality of blocks in question included in the inclusive region, which include a block in a position indicated by reverse motion vector data which are of the same size as and in the opposite direction to the motion vector data produced as a result of the motion detection effected on the block in question; and motion vector data produced as a result of the motion detection effected on the block in question.

27. A method of encoding image information, comprising the steps of:

(a) searching for a predetermined range in a reference frame whose position precedes or follows, in time, the position of a present frame, corresponding to the position of a block in question in the present frame, according to pattern matching to search for a reference block in agreement with the contents of the block in question;

(b) detecting motion vector data depending on a result of a search in said step (a);

(c) encoding the block in question in the present frame using the reference block in the reference frame which is given by the motion vector data detected in said step (b);

(d) compressing image information encoded in said step (c);

(e) quantizing the image information compressed in said step (d); and (f) converting the image information quantized in said step (e) and said motion vector data into a variable-length code;

said step (a) comprising the step of determining a motion vector produced by searching in the vicinity of a direction p-MVn in which a position for obtaining a motion vector MVn is assumed to be present, as an optimum motion vector MVk, on the assumption that a frame at a time Tn is regarded as a present frame V(Tn), a frame at a time T(n−1) preceding the time Tn is regarded as a preceding frame V(Tn−1), a frame at a time T(n+1) following the time Tn is regarded as a following frame V(Tn+1), a ratio of a time interval Tn−T(n−1) to a time interval T(n+1)−T(n) is regarded as m, when a motion vector obtained by searching an arbitrary block MB(Tn) of the present frame V(Tn) in the preceding frame V(Tn−1) is indicated by MVn, i blocks including a position to which a block MB(Tn+1) at the same position as the arbitrary block MB(Tn) in the present frame V(Tn) is moved -m·MVn in the following frame V(Tn+1) are indicated by MBl(Tn)-MBi(Tn), and when the optimum vector MVk is to be determined with respect to a frame V(Tk) at an arbitrary time Tk as an image to be searched, in the blocks MBl(Tn)-MBi(Tn), a ratio of a time interval Tk-T(k-1) to a time interval T(k+1)-T(k) is regarded as p.

28. An apparatus for encoding image information, comprising:

searching means for searching for a predetermined range in a reference frame whose position precedes or follows, in time, the position of a present frame, corresponding to the position of a block in question in the present frame, according to pattern matching to search for a reference block in agreement with the contents of the block in question;

motion vector data detecting means for detecting motion vector data depending on a result of a search effected by said searching means;

encoding means for encoding the block in question in the present frame using the reference block in the reference frame which is given by the motion vector data detected by said motion vector data detecting means;

compressing means for compressing image information encoded by said encoding means;

quantizing means for quantizing the image information compressed by said compressing means; and converting means for converting the image information quantized by said quantizing means and said motion vector data into a variable-length code;

said searching means comprising means for determining a motion vector produced by searching in the vicinity of a direction p·MVn in which a position for obtaining a motion vector MVn is assumed to be present, as an optimum motion vector MVk, on the assumption that a frame at a time Tn is regarded as a present frame V(Tn), a frame at a time T(n-1) preceding the time Tn is regarded as a preceding frame V(Tn-1), a frame at a time T(n+1) following the time Tn is regarded as a following frame V(Tn+1), a ratio of a time interval Tn-T(n-1) to a time interval T(n+1)-T(n) is regarded as m, when a motion vector obtained by searching an arbitrary block MB(Tn) of the present frame V(Tn) in the preceding frame V(Tn-1) is indicated by MVn, i blocks including a position to which a block MB(Tn+1) at the same position as the arbitrary block MB(Tn) in the present frame V(Tn) is moved -m·MVn in the following frame V(Tn+1) are indicated by MBl(Tn)-MBi(Tn), and when the optimum vector MVk is to be determined with respect to a frame V(Tk) at an arbitrary time Tk as an image to be searched, in the blocks MBl(Tn)-MBi(Tn), a ratio of a time interval Tk-T(k-1) to a time interval T(k+1)-T(k) is regarded as p.

29. A recording medium for recording image information which is encoded by the steps of:

(a) searching for a predetermined range in a reference frame, to be encoded and recorded, whose position precedes or follows, in time, the position of a present frame, corresponding to the position of a block in question in the present frame, according to pattern matching to search for a reference block in agreement with the contents of the block in question;

(b) detecting motion vector data depending on a result of a search in said step (a);

(c) encoding the block in question in the present frame using the reference block in the reference frame which is given by the motion vector data detected in said step (b);

(d) compressing image information encoded in said step (c);

(e) quantizing the image information compressed in said step (d); and (f) converting the image information quantized in said step (e) and said motion vector data into a variable-length code;

said step (a) comprising the step of determining a motion vector produced by searching in the vicinity of a direction p·MVn in which a position for obtaining a motion vector MVn is assumed to be present, as an optimum motion vector MVk, on the assumption that a frame at a time Tn is regarded as a present frame V(Tn), a frame at a time T(n-1) preceding the time Tn is regarded as a preceding frame V(Tn-1), a frame at a time T(n+1) following the time Tn is regarded as a following frame V(Tn+1), a ratio of a time interval Tn-T(n-1) to a time interval T(n+1)-T(n) is regarded as m, when a motion vector obtained by searching an arbitrary block MB(Tn) of the present frame V(Tn) in the preceding frame V(Tn-1) is indicated by MVn, i blocks including a position to which a block MB(Tn+1) at the same position as the arbitrary block MB(Tn) in the present frame V(Tn) is moved -m·MVn in the following frame V(Tn+1) are indicated by MBl(Tn)-MBi(Tn), and when the optimum vector MVk is to be determined with respect to a frame V(Tk) at an arbitrary time Tk as an image to be searched, in the blocks MBl(Tn)-MBi(Tn), a ratio of a time interval Tk-T(k-1) to a time interval T(k+1)-T(k) is regarded as p.

* * * * *